(12) United States Patent
    Polychronopoulou et al.

(10) Patent No.: US 12,617,678 B2
(45) Date of Patent: May 5, 2026

(54) CERIA-SUPPORTED CATALYST

(71) Applicants: Khalifa University of Science and Technology, Abu Dhabi (AE); UNIVERSITY OF CYPRUS, Nicosia (CY)

(72) Inventors: Kyriaki Polychronopoulou, Abu Dhabi (AE); Angelos M. Efstathiou, Abu Dhabi (AE); Aseel Gamal Suliman Hussien, Abu Dhabi (AE); Constantinos Damaskinos, Abu Dhabi (AE)

(73) Assignees: Khalifa University of Science and Technology, Abu Dhabi (AE); University of Cyprus, Nicosia (CY)

( * ) Notice: Subject to any disclaimer, the term of this patent is extended or adjusted under 35 U.S.C. 154(b) by 737 days.

(21) Appl. No.: 17/900,374

(22) Filed: Aug. 31, 2022

(65) Prior Publication Data

US 2024/0083747 A1     Mar. 14, 2024

(51) Int. Cl.
     *C01B 3/40*          (2006.01)

(52) U.S. Cl.
     CPC ........ *C01B 3/40* (2013.01); *C01B 2203/0244* (2013.01); *C01B 2203/0261* (2013.01); *C01B 2203/0277* (2013.01); *C01B 2203/1058* (2013.01); *C01B 2203/1082* (2013.01); *C01B 2203/1241* (2013.01)

(58) Field of Classification Search
     CPC .............. C01B 3/40; C01B 2203/0244; C01B 2203/0261; C01B 2203/0277; C01B 2203/1058; C01B 2203/1082; C01B 2203/1241; Y02P 20/52
     See application file for complete search history.

(56) References Cited

PUBLICATIONS

Maitha AlKetbi, Kyriaki Polychronopouloua, Maguy Abi Jaoude, Michalis A. Vasiliades, Victor Sebastiane, Steven J. Hinder, Mark A. Baker, Abdallah F. Zedan, Angelos M. Efstathiou, Cu—Ce—La—Ox as efficient CO oxidation catalysts: Effect of Cu content, Nov. 17, 2019, Applied Surface Science, 505, 144474 (Year: 2019).*

Changjin Tang, Jianchao Li, Xiaojiang Yao, Jingfang Sun, Yuan Cao, Lei Zhang, Fei Gao, Yu Deng, Lin Dong, Mesoporous NiO—CeO2 catalysts for CO oxidation: Nickel content effect and mechanism aspect, Feb. 2, 2015, Applied Catalysis A: General, 494, 77-86 (Year: 2015).*

(Continued)

*Primary Examiner* — Daniel Berns
*Assistant Examiner* — Joshua Maxwell Speer
(74) *Attorney, Agent, or Firm* — Billion & Armitage

(57) ABSTRACT

Embodiments include a ceria-supported catalyst. The ceria-supported catalyst may include the formula: Ni/Ce—X-10Cu—O, wherein X is one or more dopants. Embodiments further include a method of processing a feed stock. The method may include contacting the feed stock with a ceria-supported catalyst, sufficient to generate a product including hydrogen and carbon monoxide; wherein the ceria-supported catalyst has the following formula:

Ni/Ce—X-10Cu—O

, wherein X is one or more dopants. Embodiments further include a method of making a ceria-supported catalyst and other related methods.

9 Claims, 38 Drawing Sheets

(56)        References Cited

PUBLICATIONS

Guilin Zhou, Huiran Liu, Kaikai Cui, Aiping Jia, Gengshen Hu, Zhaojie Jiao, Yunqi Liu, Xianming Zhang, Role of surface Ni and Ce species of Ni/CeO2 catalyst in CO2 methanation, Apr. 30, 2016, Applied Surface Science, 383, 248-252 (Year: 2016).*

Alketbi, Maitha , et al., "Cu—Ce—La—Ox as efficient CO oxidation catalysts: Effect of Cu content", Applied surface science 505 (2020): 144474.

Alkhoori, Ayesha A., et al., "Cu, Sm co-doping effect on the CO oxidation activity of CeO2. A combined experimental and density functional study", Applied Surface Science 521 (2020): 146305.

Al-Swai, Basem M., et al., "Syngas production via methane dry reforming over ceria-magnesia mixed oxide-supported nickel catalysts", Industrial & Engineering Chemistry Research 58.2 (2018): 539-552.

Aramouni, Nicolas Abdel Karim, et al., "Catalyst design for dry reforming of methane: Analysis review", Renewable and Sustainable Energy Reviews 82 (2018): 2570-2585.

Aziz, M. A. A. , et al., "Understanding the role of surface basic sites of catalysts in CO 2 activation in dry reforming of methane: a short review", Catalysis Science & Technology 10.1 (2020): 35-45.

Bernal, S. , et al., "Surface basicity of ceria-supported lanthana. influence of the calcination temperature", Surface and Interface Analysis: An International Journal devoted to the development and application of techniques for the analysis of surfaces, interfaces and thin films 38.4 (2006): 229-233.

Bui, Mai , et al., "Carbon capture and storage (CCS): the way forward", Energy & Environmental Science 11.5 (2018): 1062-1176.

Chen, Qing , et al., "Synthesis of Cu—Ce0. 8Zr0. 2O2 catalyst by ball milling for CO2 reforming of ethanol", Journal of Saudi Chemical Society 23.1 (2019): 111-117.

Damaskinos, Constantinos M., et al., "Dry reforming of methane over Ni/Ce0. 8Ti0. 2O2-σ: The effect of Ni particle size on the carbon pathways studied by transient and isotopic techniques", Applied Catalysis B: Environmental 296 (2021): 120321.

Damaskinos, Constantinos M., et al., "The effect of CeO2 preparation method on the carbon pathways in the dry reforming of methane on Ni/CeO2 studied by transient techniques", Catalysts 9.7 (2019): 621.

Damaskinos, C. M. , et al., "The effect of Ti4+ dopant in the 5 wt% Ni/Ce1-xTixO2-σ catalyst on the carbon bathways of dry reforming of methane studied by various transient and isotopic techniques", Applied Catalysis A: General 579 (2019): 116-129.

Danielis, Maila , et al., "Outstanding methane oxidation performance of palladium-embedded ceria catalysts prepared by a one-step dry ball-milling method", Angewandte Chemie 130.32 (2018): 10369-10373.

Das, Sonali , et al., "Role of lattice oxygen in methane activation on Ni-phyllosilicate@ Ce1-xZrxO2 core-shell catalyst for methane dry reforming: Zr doping effect, mechanism, and kinetic study", Applied Catalysis B: Environmental 290 (2021): 119998.

Debek, Radosiaw , et al., "Influence of Ce/Zr molar ratio on catalytic performance of hydrotalcite-derived catalysts at low temperature CO2 methane reforming", International Journal of Hydrogen Energy 42.37 (2017): 23556-23567.

Gao, Wanlin , et al., "Industrial carbon dioxide capture and utilization: state of the art and future challenges", Chemical Society Reviews 49.23 (2020): 8584-8686.

Ginsburg, Jason M., et al., "Coke formation over a nickel catalyst under methane dry reforming conditions: thermodynamic and kinetic models", Industrial & engineering chemistry research 44.14 (2005): 4846-4854.

Han, Joung Woo, et al., "Uncoupling the size and support effects of Ni catalysts for dry reforming of methane", Applied Catalysis B: Environmental 203 (2017): 625-632.

Hu, Zhenpeng , et al., "Effect of dopants on the energy of oxygen-vacancy formation at the surface of ceria: Local or global?", The Journal of Physical Chemistry C 115.36 (2011): 17898-17909.

Hull, Stephen , et al., "Oxygen vacancy ordering within anion-deficient ceria", Journal of Solid State Chemistry 182.10 (2009): 2815-2821.

Hussien, Aseel GS, et al., "Elucidating the role of La3+/Sm3+ in the carbon paths of dry reforming of methane over Ni/Ce—La (Sm)—Cu—O using transient kinetics and isotopic techniques", Applied Catalysis B: Environmental 304 (2022): 121015.

Jang, Won-Jun , et al., "Metal oxide (MgO, CaO, and La2O3) promoted Ni—Ce0. 8Zr0. 2O2 catalysts for H2 and CO production from two major greenhouse gases", Renewable energy 79 (2015): 91-95.

Kambolis, A. , et al., "Ni/CeO2—ZrO2 catalysts for the dry reforming of methane", Applied Catalysis A: General 377.1-2 (2010): 16-26.

Khan, Ataullah , et al., "Catalytic Activity of Various 5 wt% Ni/Ce0. 5Zr0. 33M0. 1702-σ Catalysts for the CO2 Reforming of CH4 in the Presence and Absence of Steam", Energy & fuels 26.1 (2012): 365-379.

Kuramochi, Takeshi , et al., "Comparative assessment of CO2 capture technologies for carbon-intensive industrial processes", Progress in energy and combustion science 38.1 (2012): 87-112.

Kwon, Ohhun , et al., "Review on exsolution and its driving forces in perovskites", Journal of Physics: Energy 2.3 (2020): 032001.

Lara-García, Hugo A., et al., "Dry reforming of methane over nickel supported on Nd-ceria: enhancement of the catalytic properties and coke resistance", RSC advances 10.55 (2020): 33059-33070.

Loche, Danilo , et al., "Determining the maximum lanthanum incorporation in the fluorite structure of La-doped ceria hanocubes for enhanced redox ability", RSC advances 9.12 (2019): 6745-6751.

Lu, Zhansheng , et al., "Cu-doped ceria: Oxygen vacancy formation made easy", Cu-doped ceria: Oxygen vacancy formation made easy. 510.1-3 (2011): 60-66.

Luisetto, Igor , et al., "Dry reforming of methane over Ni supported on doped CeO2: New insight on the role of dopants for CO2 activation", Journal of CO2 Utilization 30 (2019): 63-78.

Makri, M. M. , et al., "Effect of support composition on the origin and reactivity of carbon formed during dry reforming of methane over 5 wt% Ni/Ce1-xMxO2-σ (M=Zr4+, Pr3+) catalysts", Catalysis Today 259 (2016): 150-164.

Martens, Johan A., et al., "The chemical route to a carbon dioxide neutral world", ChemSusChem 10.6 (2017): 1039-1055.

Montini, Tiziano , et al., "Fundamentals and catalytic applications of CeO2-based materials", Chemical reviews 116.10 (2016): 5987-6041.

Mullins, David R., "The surface chemistry of cerium oxide", Surface Science Reports 70.1 (2015): 42-85.

Naghash, A. R. , et al., "XRD and XPS study of Cu—Ni interactions on reduced copper-nickel-aluminum oxide solid solution catalysts", Chemistry of materials 18.10 (2006): 2480-2488.

Pakhare, Devendra , et al., "A review of dry (CO 2) reforming of methane over noble metal catalysts", Chemical Society Reviews 43.22 (2014): 7813-7837.

Papadopoulou, Christina , et al., "Chapter 3 Utilization of biogas as a renewable carbon source: dry reforming of methane", Catalysis for alternative energy generation (2012): 57-127.

Pino, Lidia , et al., "Ce0. 70La0. 20Ni0. 10O2-σ catalyst for methane dry reforming: Influence of reduction temperature on the catalytic activity and stability", Applied Catalysis B: Environmental 218 (2017): 779-792.

Polychronopoulou, K , et al., "Tailoring the efficiency of an active catalyst for CO abatement through oxidation reaction: The case study of samarium-doped ceria", Journal of environmental chemical engineering 6.1 (2018): 266-280.

Reddy, Lankela H., et al., "A rapid microwave-assisted solution combustion synthesis of CuO promoted Ce02-MxOy (M=Zr, La, Pr and Sm) catalysts for CO oxidation", Applied Catalysis A: General 445 (2012): 297-305.

Sagar, T. V. , et al., "Influence of Solid Solution Formation on the Activity of CeO 2 Supported Ni—Cu Mixed Oxide Catalysts in Dry Reforming of Methane", Catalysis Letters 149 (2019): 2597-2606.

(56) References Cited

PUBLICATIONS

Shah, Parag M., et al., "Ceria-zirconia mixed metal oxides prepared via mechanochemical grinding of carbonates for the total oxidation of propane and naphthalene", Catalysts 9.5 (2019): 475.

Song, Kai , et al., "Effect of alloy composition on catalytic performance and coke-resistance property of Ni—Cu/Mg (Al) O catalysts for dry reforming of methane", Applied Catalysis B: Environmental 239 (2018): 324-333.

Spivey, James J., "Deactivation of reforming catalysts", Fuel Cells: Technologies for fuel processing. Elsevier, 2011. 285-315.

Trovarelli, Alessandro , et al., "Catalysis by Ceria and Related Materials", Catalytic Science Series—vol. 12; 2nd Edition; Imperial College Press; 909 pages.

Vasiliades, M. A. , et al., "Dry reforming of CH4 over NiCo/Ce0.75Zr0. 25O2-σ: The effect of Co on the site activity and carbon pathways studied by transient techniques", Catalysis Communications 149 (2021): 106237.

Wang, Xianqin , et al., "Unusual Physical and Chemical Properties of Cu in Ce1-x Cu x O2 Oxides", The Journal of Physical Chemistry B 109.42 (2005): 19595-19603.

Wolfbeisser, Astrid , et al., "Methane dry reforming over ceria-zirconia supported Ni catalysts", Catalysis Today 277 (2016): 234-245.

Wu, Hongjing , et al., "Bi-and trimetallic Ni catalysts over Al2O3 and Al2O3-MOx (M= Ce or Mg) oxides for methane dry reforming: Au and Pt additive effects", Applied Catalysis B: Environmental 156 (2014): 350-361.

Yu, Kai , et al., "Asymmetric oxygen vacancies: the intrinsic redox active sites in metal oxide catalysts", Advanced Science 7.2 (2020): 1901970.

Zain, Munirah MD , et al., "An overview on conversion technologies to produce value added products from CH4 and CO2 as major biogas constituents", Renewable and Sustainable Energy Reviews 98 (2018): 56-63.

Zhang, Guojie , et al., "A review of CH4CO2 reforming to synthesis gas over Ni-based catalysts in recent years (2010-2017)", International Journal of Hydrogen Energy 43.32 (2018): 15030-15054.

\* cited by examiner

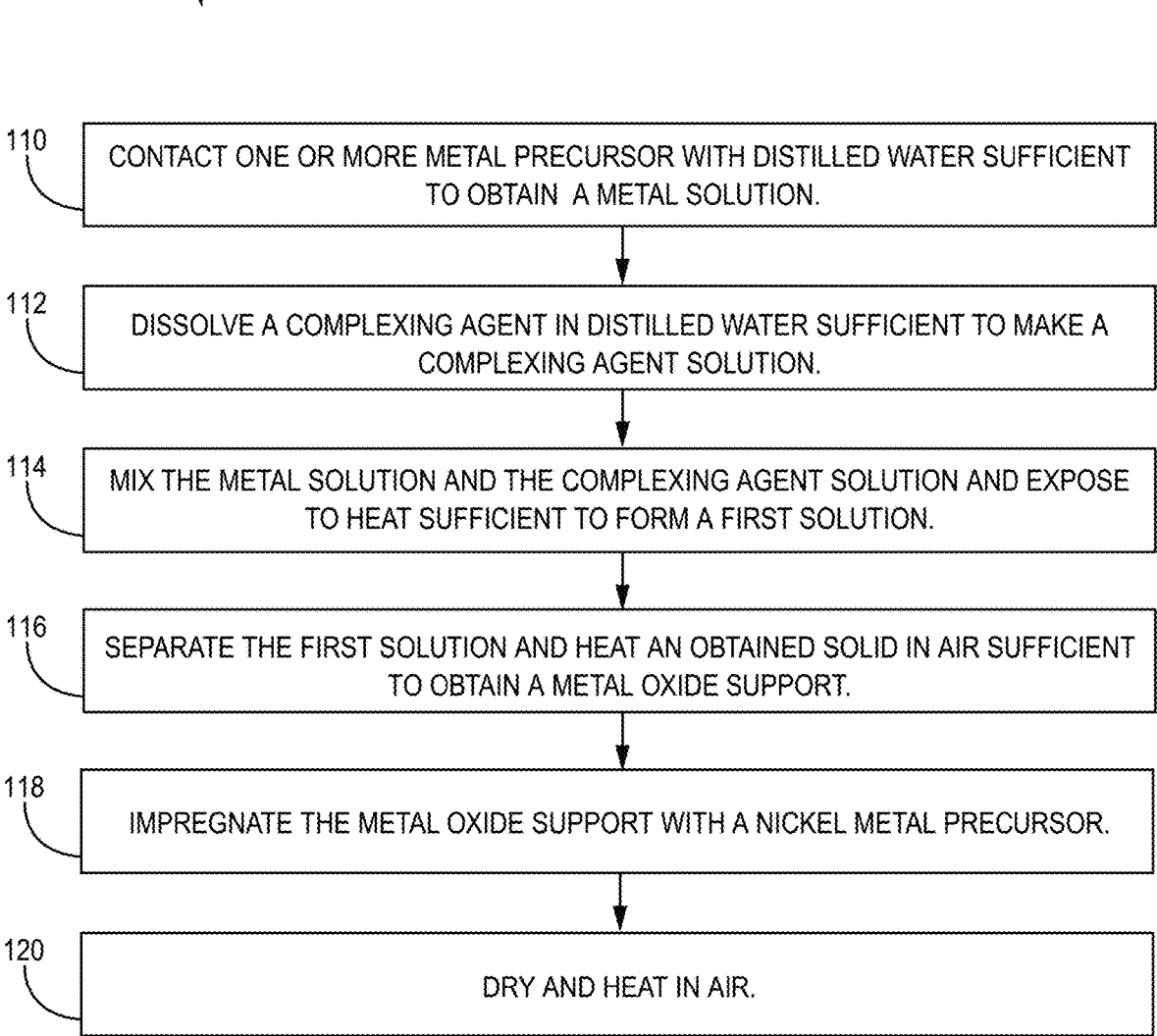

100

110 CONTACT ONE OR MORE METAL PRECURSOR WITH DISTILLED WATER SUFFICIENT TO OBTAIN A METAL SOLUTION.

112 DISSOLVE A COMPLEXING AGENT IN DISTILLED WATER SUFFICIENT TO MAKE A COMPLEXING AGENT SOLUTION.

114 MIX THE METAL SOLUTION AND THE COMPLEXING AGENT SOLUTION AND EXPOSE TO HEAT SUFFICIENT TO FORM A FIRST SOLUTION.

116 SEPARATE THE FIRST SOLUTION AND HEAT AN OBTAINED SOLID IN AIR SUFFICIENT TO OBTAIN A METAL OXIDE SUPPORT.

118 IMPREGNATE THE METAL OXIDE SUPPORT WITH A NICKEL METAL PRECURSOR.

120 DRY AND HEAT IN AIR.

210 | CONTACT A FEED STOCK WITH A CERIA-SUPPORTED CATALYST SUFFICIENT TO GENERATE A PRODUCT INCLUDING HYDROGEN AND CARBON MONOXIDE

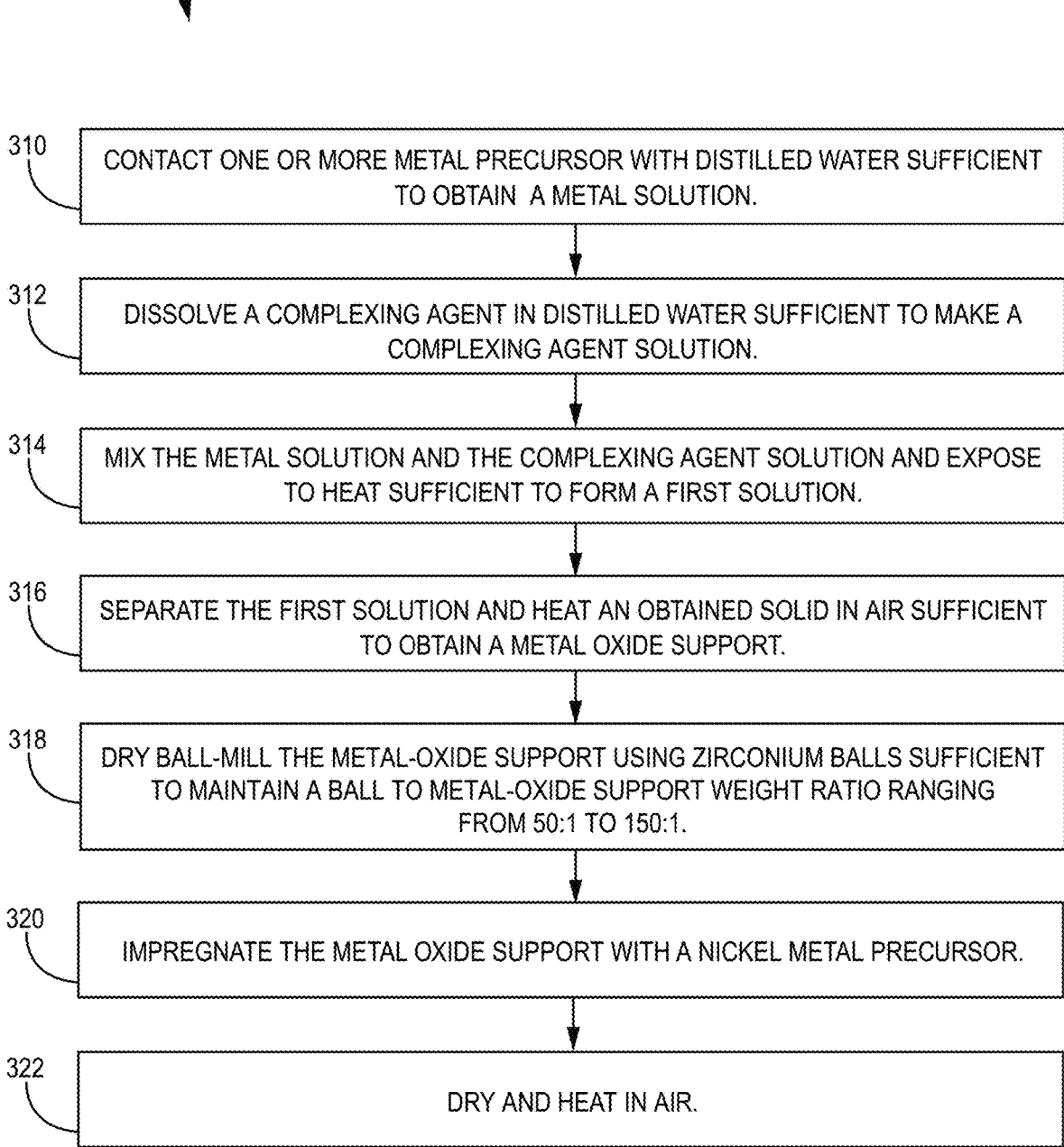

300

310  CONTACT ONE OR MORE METAL PRECURSOR WITH DISTILLED WATER SUFFICIENT TO OBTAIN A METAL SOLUTION.

312  DISSOLVE A COMPLEXING AGENT IN DISTILLED WATER SUFFICIENT TO MAKE A COMPLEXING AGENT SOLUTION.

314  MIX THE METAL SOLUTION AND THE COMPLEXING AGENT SOLUTION AND EXPOSE TO HEAT SUFFICIENT TO FORM A FIRST SOLUTION.

316  SEPARATE THE FIRST SOLUTION AND HEAT AN OBTAINED SOLID IN AIR SUFFICIENT TO OBTAIN A METAL OXIDE SUPPORT.

318  DRY BALL-MILL THE METAL-OXIDE SUPPORT USING ZIRCONIUM BALLS SUFFICIENT TO MAINTAIN A BALL TO METAL-OXIDE SUPPORT WEIGHT RATIO RANGING FROM 50:1 TO 150:1.

320  IMPREGNATE THE METAL OXIDE SUPPORT WITH A NICKEL METAL PRECURSOR.

322  DRY AND HEAT IN AIR.

FIG. 3

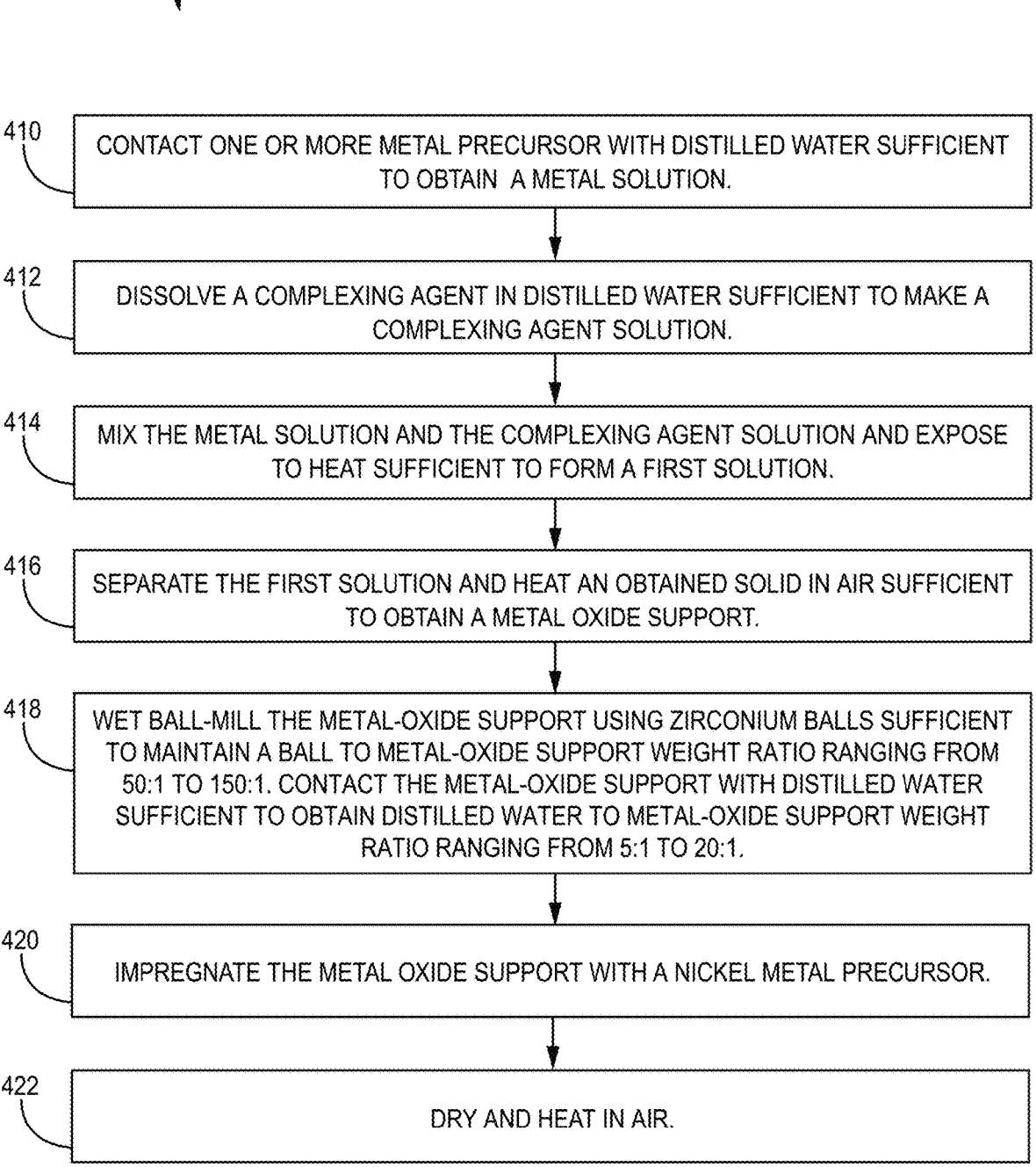

400

410 CONTACT ONE OR MORE METAL PRECURSOR WITH DISTILLED WATER SUFFICIENT TO OBTAIN A METAL SOLUTION.

412 DISSOLVE A COMPLEXING AGENT IN DISTILLED WATER SUFFICIENT TO MAKE A COMPLEXING AGENT SOLUTION.

414 MIX THE METAL SOLUTION AND THE COMPLEXING AGENT SOLUTION AND EXPOSE TO HEAT SUFFICIENT TO FORM A FIRST SOLUTION.

416 SEPARATE THE FIRST SOLUTION AND HEAT AN OBTAINED SOLID IN AIR SUFFICIENT TO OBTAIN A METAL OXIDE SUPPORT.

418 WET BALL-MILL THE METAL-OXIDE SUPPORT USING ZIRCONIUM BALLS SUFFICIENT TO MAINTAIN A BALL TO METAL-OXIDE SUPPORT WEIGHT RATIO RANGING FROM 50:1 TO 150:1. CONTACT THE METAL-OXIDE SUPPORT WITH DISTILLED WATER SUFFICIENT TO OBTAIN DISTILLED WATER TO METAL-OXIDE SUPPORT WEIGHT RATIO RANGING FROM 5:1 TO 20:1.

420 IMPREGNATE THE METAL OXIDE SUPPORT WITH A NICKEL METAL PRECURSOR.

422 DRY AND HEAT IN AIR.

FIG. 4

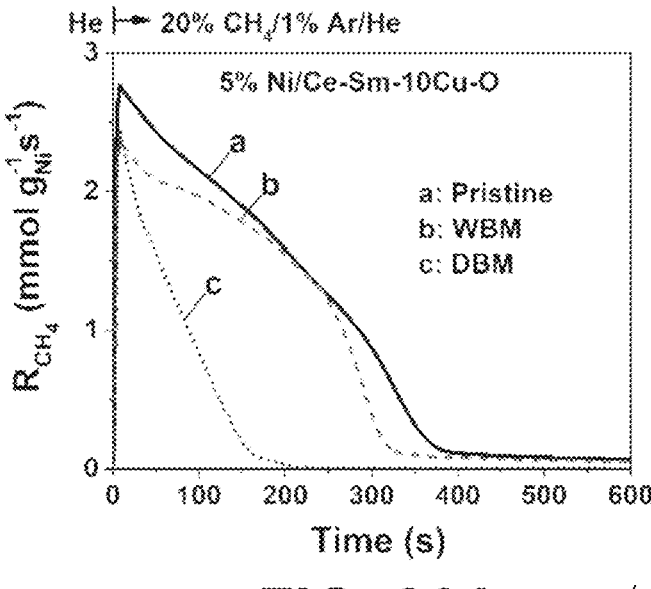
FIG. 26A
FIG. 26B
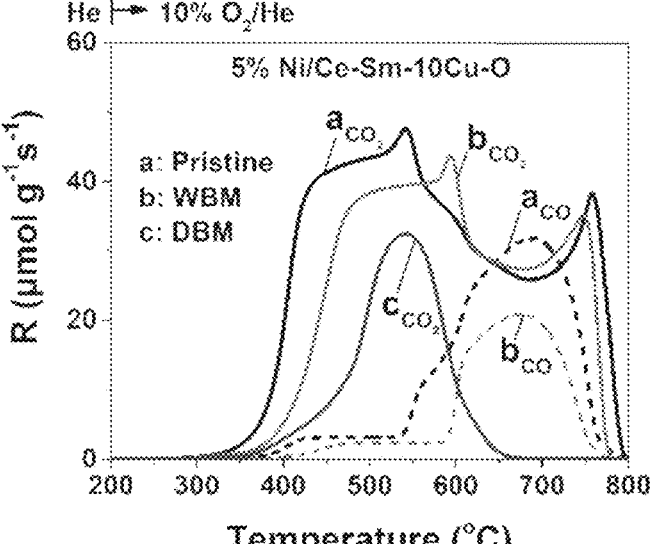
FIG. 26C

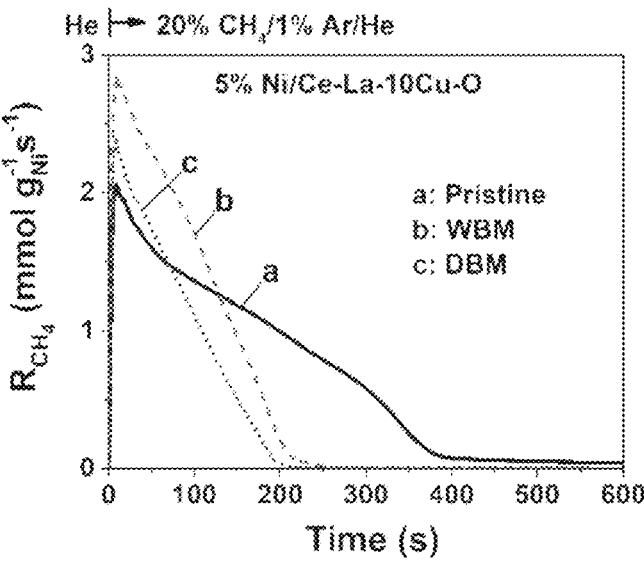
FIG. 27A
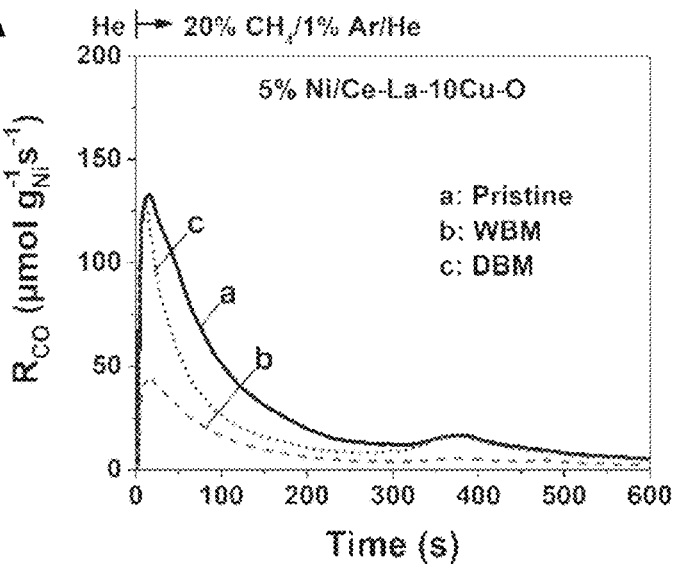
FIG. 27B
FIG. 27C

CERIA-SUPPORTED CATALYST

BACKGROUND

Dry reforming of methane (DRM) is an endothermic reaction that produces synthesis gas with $H_2/CO$ ratio of 1 ($CH_4+CO_2 \leftrightarrow 2\ CO+2\ H_2$; $\Delta H°(298\ K)=+247.3\ kJ\ mol^{-1}$). The produced syngas is eventually used to produce high value-added chemicals and fuel. However, this process has not been industrialized yet due to the absence of a robust catalyst that can resist sintering and carbon formation. These phenomena occur due to the high operational temperature of the reaction and the simultaneous side reactions (methane decomposition and CO disproportionation reaction), respectively.

Ni-based catalysts are an economically feasible alternative to their noble metal-based counterparts. However, they suffer from carbon formation. Hence, it is vital to tailor a coke-free catalyst by carefully choosing the support's composition and the appropriate synthesis method as it greatly affects the catalyst's performance towards DRM. The active carbon formed via methane decomposition route can be gasified to CO via the oxygen atom from the CO2 reactant or the labile oxygen from the reducible (modified) supports such as ceria, which has the ability to easily switch between oxidation states, releasing a lattice oxygen, and subsequently forming an oxygen vacant site. Oxygen vacant sites promote the $CO_2$ dissociation and the gasification of carbon species on the surface. Studies have shown that doping ceria lattice with trivalent atoms promotes the oxygen mobility and basicity

SUMMARY

In one or more aspects of the invention, a ceria-supported catalyst is provided. The ceria-supported catalyst may include the formula: Ni/Ce—X-10Cu—O, wherein X is one or more dopants.

In one or more further aspects of the invention, a method of processing a feed stock is provided. The method may include contacting the feed stock with a ceria-supported catalyst, sufficient to generate a product including hydrogen and carbon monoxide; wherein the ceria-supported catalyst has the following formula: Ni/Ce—X-10Cu—O, wherein X is one or more dopants.

In one or more further aspects of the invention, a method of making a ceria-supported catalyst is provided. The method may include one or more of the following steps: contacting one or more metal precursor with distilled water sufficient to obtain a metal solution; dissolving a complexing agent in distilled water sufficient to make a complexing agent solution; mixing the metal solution and the complexing agent solution and exposing to heat sufficient to form a first solution; separating the first solution and heating an obtained solid in air sufficient to obtain a metal oxide support; impregnating the metal oxide support with a nickel metal precursor; and drying and heating in air; wherein the ceria-supported catalyst has the following formula: Ni/Ce—X-10Cu—O, wherein X is one of La or Sm.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 1 illustrates a flowchart of a method 100 of making a ceria-supported catalyst, according to some embodiments.

FIG. 3 illustrates a flowchart of a method 300 of making and post-processing a ceria-supported catalyst using dry ball milling, according to some embodiments.

FIG. 4 illustrates a flowchart of a method 400 of making and post-processing a ceria-supported catalyst using wet ball milling, according to some embodiments.

FIG. 26A illustrates dynamic evolution rates of $CH_4$ decomposition (mmol $g^{-1}_{Ni}s^{-1}$) obtained after the step-gas concentration switch He→20 vol % $CH_4$/1 vol % Ar/He (t) at 750° C. over the 5 wt % Ni/Ce—Sm-10Cu—O catalysts: (a) Pristine, (b) Wet Ball-Milled (WBM), and (c) Dry Ball-Milled (DBM), according to some embodiments.

FIG. 26B illustrates dynamic evolution rates of CO formation ($\mu$mol $g^{-1}_{Ni}s^{-1}$) obtained after the step-gas concentration switch He→20 vol % $CH_4$/1 vol % Ar/He (t) at 750° C. over the 5 wt % Ni/Ce—Sm-10Cu—O catalysts: (a) Pristine, (b) Wet Ball-Milled (WBM), and (c) Dry Ball-Milled (DBM), according to some embodiments.

FIG. 26C illustrates transient rates of CO and $CO_2$ formation obtained during TPO of carbon formed after 30 min in 20 vol % $CH_4$/He reaction at 750° C. $W_{cat.bed}$=0.02 g catalyst+0.03 g SiC; $F_T$=50 mL $min^{-1}$, according to some embodiments.

FIG. 27A illustrates dynamic evolution rates of $CH_4$ decomposition (mmol $g^{-1}_{Ni}s^{-1}$) obtained after the step-gas concentration switch He→20 vol % $CH_4$/1 vol % Ar/He (t) at 750° C. over the 5 wt % Ni/Ce—La-10Cu—O catalysts: (a) Pristine, (b) Wet Ball-Milled (WBM), and (c) Dry Ball-Milled (DBM), according to some embodiments.

FIG. 27B illustrates dynamic evolution rates of CO formation ($\mu$mol $g^{-1}_{Ni}s^{-1}$) obtained after the step-gas concentration switch He→20 vol % $CH_4$/1 vol % Ar/He (t) at 750° C. over the 5 wt % Ni/Ce—La-10Cu—O catalysts: (a) Pristine, (b) Wet Ball-Milled (WBM), and (c) Dry Ball-Milled (DBM), according to some embodiments.

FIG. 27C illustrates transient rates of $CO_2$ formation obtained during TPO of carbon formed after 30 min in 20 vol % $CH_4$/He reaction at 750° C. $W_{cat.bed}$=0.02 g catalyst+0.03 g SiC; $F_T$=50 mL $min^{-1}$, according to some embodiments.

DETAILED DESCRIPTION

Figure 2:
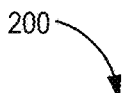
FIG. 2 illustrates a flowchart of a method 200 of using a ceria-supported catalyst, according to some embodiments.

Embodiments of the present disclosure describe a ceria-supported catalyst for catalyzing dry reforming of methane to produce syngas. These ceria-supported catalysts were designed by supporting Ni on a Ce—X-10Cu—O carrier (X=La or Sm). The elemental composition enhances the mobility of carrier lattice oxygen and reduces coking during the dry reforming of methane process, at least in part due to the formation of bimetallic alloy. Post-synthetic modification of the supports improves carbon inhibition during dry reforming of methane while maintaining $CH_4$ and $CO_2$ conversions.

Referring to FIG. 1, a method 100 of making a ceria-supported catalyst is illustrated, according to some embodiments. The method 100 includes the following steps:

STEP 110, CONTACT ONE OR MORE METAL PRE-CURSOR WITH DISTILLED WATER SUFFICIENT TO OBTAIN A METAL SOLUTION, includes contacting one or more metal precursor such as a nitrate salt with distilled water sufficient to obtain a metal solution. Examples of a suitable metal precursor include $Ce(NO_3)_3 \cdot 6H_2O$, $Sm(NO_3)_3 \cdot 6H_2O$, $La(NO_3)_3 \cdot 6H_2O$, and $Cu(NO_3)_3 H_2O$ salts. For example, a suitable metal precursor may include $Ce(NO_3)_3 \cdot 6H_2O$ (99.95%), $Sm(NO_3)_3 \cdot 6H_2O$ (99.95%), $La(NO_3)_3 \cdot 6H_2O$ (99.95%), and $Cu(NO_3)_3 \cdot 3H_2O$ (99.95%) salts. For example, contacting a metal precursor such as a nitrate salt with distilled water of the appropriate molar ratios may obtain Ce and Sm of about 45% atomic % each. In another example, contacting a metal precursor such as a nitrate salt with distilled water of the appropriate molar ratios may obtain Ce and La of about 45% atomic % each;

STEP 112, DISSOLVE A COMPLEXING AGENT IN DISTILLED WATER SUFFICIENT TO MAKE A COMPLEXING AGENT SOLUTION, includes dissolving a complexing agent such as ethylene glycol in distilled water sufficient to make a complexing agent solution. In one example, the complexing agent can be dissolved in distilled water while maintaining a volume ratio ranging from about 0.1:1 to about 20:1 of complexing agent to distilled water. In another example, the complexing agent can be dissolved in distilled water while maintaining a volume ratio ranging from 1:1 to 3:1 of complexing agent to distilled water. In another example, the complexing agent can be dissolved in distilled water while maintaining a 2:1 volume ratio of complexing agent to distilled water;

STEP 114, MIX THE METAL SOLUTION AND THE COMPLEXING AGENT SOLUTION AND EXPOSE TO HEAT SUFFICIENT TO FORM A FIRST SOLUTION, includes mixing the metal solution and the complexing agent solution such as ethylene glycol and exposing and exposing to heat sufficient to form a first solution. In one example, the metal solution and the complexing agent are mixed and exposed to microwave heating. The temperatures of microwave heating could range from about 50° C. to about 300° C. In another example, the metal solution and the complexing agent are mixed and exposed to microwave heating ranging from about 130° C. to about 170° C. Continuous stirring can be applied throughout the mixing and heating process;

STEP 116, SEPARATE THE FIRST SOLUTION AND HEAT AN OBTAINED SOLID IN AIR SUFFICIENT TO OBTAIN A METAL OXIDE SUPPORT, includes separating the first solution and heating an obtained solid in air sufficient to obtain a metal oxide support such as a ceria support. The process of separating the first solution could include centrifuging the solution. In one example, the heating process could include calcining the obtained solid at a temperature above 200° C. In another example, the heating process could include calcining the obtained solid at a temperature ranging from about 400° C. to about 600° C. In yet another example, the heating process could include calcining the obtained solid at 500° C. In one example, the calcining process is completed in approximately 2 to 8 hours. In another example, the calcining process is completed in approximately 6 hours;

STEP 118, IMPREGNATE THE METAL OXIDE SUPPORT WITH A NICKEL METAL PRECURSOR, includes impregnating the metal oxide support with a nickel metal precursor such as $Ni(NO_3)_2 \cdot 6H_2O$. The metal oxide can be in powder form and other nickel metal precursors could be utilized. In one example, a given amount of nickel metal precursor is used corresponding to a desired nominal Ni loading. For example, desired nominal Ni loading may be 1 wt % to 20 wt %. In another example, impregnating the metal oxide support includes using a given amount of nickel metal precursor corresponding to a nominal Ni loading of 5 wt %. Distilled de-ionized water can be used as a solvent. In one example, impregnating the metal oxide support is completed at a temperature range of approximately 30 to 150° C. In another example, impregnating the metal oxide support is completed at a temperature of about 50° C.;

STEP 120, DRY AND HEAT IN AIR, includes drying and heating the obtained solid in air. In one example, the drying is completed at temperatures above 100° C. and the calcining process is completed at temperatures above 200° C. In one example, the drying is completed at 120° C. and the calcining process is completed at 500° C. The calcining process can be completed in approximately 1 to 4 hours. In one example, the calcining process is completed in approximately 2 hours. The supported Ni catalyst can be recalcined after STEP 120. In one example, the supported Ni catalyst can be recalcined at 750° C. for 2 hours. Further, the supported Ni catalyst can be in situ reduced in $H_2$. In one example, the supported Ni Catalyst can be in situ reduced in $H_2$ at 750° C. for 2 hours.

FIG. 2 shows a method 200 of processing a feed stock. The method 200 includes the following steps:

STEP 210, CONTACT A FEED STOCK WITH A CERIA-SUPPORTED CATALYST SUFFICIENT TO GENERATE A PRODUCT INCLUDING HYDROGEN AND CARBON MONOXIDE, includes contacting a feed stock such as methane, carbon dioxide, and/or water with a ceria-supported catalyst sufficient to generate a product including hydrogen and carbon monoxide. Both a metal and support of the catalyst may participate in the reaction. Carbon dioxide may be adsorbed onto the metal-support interface. In one example, methane may be adsorbed onto nickel. Further, methane may be subjected into sequential dehydrogenation steps. These dehydrogenation steps may lead to formation of CHx species. CHx can have any number of x. Adsorbed CHx species may react with adsorbed carbon dioxide leading to production of one or more of hydrogen and carbon monoxide. Hydrogen and carbon monoxide may be in the form of a mixture. In one example, STEP 210 may at least partially occur at temperatures between about 600° C. and about 900° C. In another example, STEP 210 may at least partially occur at temperatures between 700° C. and 800° C. In one example, the ratio of methane and carbon dioxide is 1. This ratio may be less than or greater than 1. The ceria-supported catalyst may be used for dry reforming of methane, reforming of methane, partial oxidation of methane, and autothermal reforming.

FIG. 3 shows a method 300 of making and post-processing a ceria-supported catalyst using dry ball milling (DBM) according to the following steps:

STEP 310, CONTACT ONE OR MORE METAL PRE-CURSOR WITH DISTILLED WATER SUFFICIENT TO OBTAIN A METAL SOLUTION, includes contacting one or more metal precursor such as a nitrate salt with distilled water sufficient to obtain a metal solution. Examples of a suitable metal precursor include $Ce(NO_3)_3 \cdot 6H_2O$, $Sm(NO_3)_3 \cdot 6H_2O$, $La(NO_3)_3 \cdot 6H_2O$, and $Cu(NO_3)3H_2O$ salts. For example, a suitable metal precursor may include $Ce(NO_3)_3 \cdot 6H_2O$ (99.95%), $Sm(NO_3)_3 \cdot 6H_2O$ (99.95%), $La(NO_3)_3 \cdot 6H_2O$ (99.95%), and $Cu(NO_3) \cdot 3H_2O$ (99.95%) salts. For example, contacting a metal precursor such as a nitrate salt with distilled water of the appropriate molar ratios may obtain Ce and Sm of about 45% atomic % each. In another example, contacting a metal precursor such as a nitrate salt with distilled water of the appropriate molar ratios may obtain Ce and La of about 45% atomic % each;

STEP 312, DISSOLVE A COMPLEXING AGENT IN DISTILLED WATER SUFFICIENT TO MAKE A COMPLEXING AGENT SOLUTION, includes dissolving a complexing agent such as ethylene glycol in distilled water sufficient to make a complexing agent solution. In one example, the complexing agent can be dissolved in distilled water while maintaining a volume ratio ranging from 0.1:1 to 20:1 of complexing agent to distilled water. In another example, the complexing agent can be dissolved in distilled water while maintaining a volume ratio ranging from 1:1 to 3:1 of complexing agent to distilled water. In another example, the complexing agent can be dissolved in distilled water while maintaining a 2:1 volume ratio of complexing agent to distilled water;

STEP 314, MIX THE METAL SOLUTION AND THE COMPLEXING AGENT SOLUTION AND EXPOSE TO HEAT SUFFICIENT TO FORM A FIRST SOLUTION, includes mixing the metal solution and the complexing agent solution such as ethylene glycol and exposing and exposing to heat sufficient to form a first solution. In one example, the metal solution and the complexing agent are mixed and exposed to microwave heating. The temperatures of microwave heating could range from about 50 to about 300° C. In another example, the metal solution and the complexing agent are mixed and exposed to microwave heating ranging from about 130° C. to about 170° C. Continuous stirring can be applied throughout the mixing and heating process;

STEP 316, SEPARATE THE FIRST SOLUTION AND HEAT AN OBTAINED SOLID IN AIR SUFFICIENT TO OBTAIN A METAL OXIDE SUPPORT, includes separating the first solution and heating an obtained solid in air sufficient to obtain a metal oxide support such as a ceria support. The process of separating the first solution could include centrifuging the solution. In one example, the heating process could include calcining the obtained solid at a temperature above 200° C. In another example, the heating process could include calcining the obtained solid at 500° C. In one example, the calcining process is completed in approximately 2 to 8 hours. In another example, the calcining process is completed in approximately 6 hours;

STEP 318, DRY BALL-MILL THE METAL-OXIDE SUPPORT USING ZIRCONIUM BALLS SUFFICIENT TO MAINTAIN A BALL TO METAL-OXIDE SUPPORT WEIGHT RATIO RANGING FROM 50:1 TO 150:1, includes dry ball-milling the metal-oxide using zirconium balls and/or stainless steel balls sufficient to maintain a ball to metal-oxide support weight ratio ranging from 50:1 to 150:1 for approximately 4 hours. In one example, a container at approximately 250 RPM is used. In another example, a ball to metal-oxide support weight ratio of 100:1 is obtained. In another example, the ball-milling process can be completed in approximately 2 to 6 hours.

STEP 320, IMPREGNATE THE METAL OXIDE SUPPORT WITH A NICKEL METAL PRECURSOR, includes impregnating the metal oxide support with a nickel metal precursor such as $Ni(NO_3)_2 \cdot 6H_2O$. The metal oxide can be in powder form and other nickel metal precursors could be utilized. In one example, a given amount of nickel metal precursor is used corresponding to a desired nominal Ni loading. For example, desired nominal Ni loading may be 1 wt % to 20 wt %. In another example, impregnating the metal oxide support includes using a given amount of nickel metal precursor corresponding to a nominal Ni loading of 5 wt %. Distilled de-ionized water can be used as a solvent. In one example, impregnating the metal oxide support is completed at a temperature range of approximately 30 to 150° C. In another example, impregnating the metal oxide support is completed at a temperature of 50° C.;

STEP 322, DRY AND HEAT IN AIR, includes drying and heating the obtained solid in air. In one example, the drying is completed at temperatures above 100° C. and the calcining process is completed at temperatures above 200° C. In one example, the drying is completed at 120° C. and the calcining process is completed at 500° C. The calcining process can be completed in approximately 1 to 4 hours. In one example, the calcining process is completed in approximately 2 hours. The supported Ni catalyst can be recalcined after STEP 120. In one example, the supported Ni catalyst can be recalcined at 750° C. for 2 hours. Further, the supported Ni catalyst can be in situ reduced in $H_2$. In one example, the supported Ni Catalyst can be in situ reduced in $H_2$ at 750° C. for 2 hours.

FIG. 4 shows a method 400 of making and post-processing a ceria-supported catalyst using wet ball milling (WBM), according to the following steps:

STEP 410, CONTACT ONE OR MORE METAL PRECURSOR WITH DISTILLED WATER SUFFICIENT TO OBTAIN A METAL SOLUTION, includes contacting one or more metal precursor such as a nitrate salt with distilled water sufficient to obtain a metal solution. Examples of a suitable metal precursor include $Ce(NO_3)_3 \cdot 6H_2O$, $Sm(NO_3)_3 \cdot 6H_2O$, $La(NO_3)_3 \cdot 6H_2O$, and $Cu(NO_3) \cdot 3H_2O$ salts. For example, a suitable metal precursor may include $Ce(NO_3)_3 \cdot 6H_2O$ (99.95%), $Sm(NO_3)_3 \cdot 6H_2O$ (99.95%), $La(NO_3)_3 19$ $6H_2O$ (99.95%), and $Cu(NO_3) \cdot 3H_2O$ (99.95%) salts. For example, contacting a metal precursor such as a nitrate salt with distilled water of the appropriate molar ratios may obtain Ce and Sm of about 45% atomic % each. In another example, contacting a metal precursor such as a nitrate salt with distilled water of the appropriate molar ratios may obtain Ce and La of about 45% atomic % each;

STEP 412, DISSOLVE A COMPLEXING AGENT IN DISTILLED WATER SUFFICIENT TO MAKE A COMPLEXING AGENT SOLUTION, includes dissolving a complexing agent such as ethylene glycol in distilled water sufficient to make a complexing agent solution. In one example, the complexing agent can be dissolved in distilled water while maintaining a volume ratio ranging from 0.1:1 to 20:1 of complexing agent to distilled water. In another example, the complexing agent can be dissolved in distilled water while maintaining a volume ratio ranging from 1:1 to 3:1 of complexing agent to distilled water. In another example, the complexing agent can be dissolved in distilled water while maintaining a 2:1 volume ratio of complexing agent to distilled water;

STEP 414, MIX THE METAL SOLUTION AND THE COMPLEXING AGENT SOLUTION AND EXPOSE TO HEAT SUFFICIENT TO FORM A FIRST SOLUTION, includes mixing the metal solution and the complexing agent solution such as ethylene glycol and exposing and exposing to heat sufficient to form a first solution. In one example, the metal solution and the complexing agent are mixed and exposed to microwave heating. The temperatures of microwave heating could range from about 50 to about 300° C. In another example, the metal solution and the complexing agent are mixed and exposed to microwave heating ranging from about 130° C. to about 170° C. Continuous stirring may be applied throughout the mixing and heating process;

STEP 416, SEPARATE THE FIRST SOLUTION AND HEAT AN OBTAINED SOLID IN AIR SUFFICIENT TO OBTAIN A METAL OXIDE SUPPORT, includes separating the first solution and heating an obtained solid in air sufficient to obtain a metal oxide support such as a ceria support. The process of separating the first solution could include centrifuging the solution. In one example, the heating process could include calcining the obtained solid at a temperature above 200° C. In another example, the heating process could include calcining the obtained solid at 500° C. In one example, the calcining process is completed in approximately 2 to 8 hours. In another example, the calcining process is completed in approximately 6 hours;

STEP 418, WET BALL-MILL THE METAL-OXIDE SUPPORT USING ZIRCONIUM BALLS SUFFICIENT TO MAINTAIN A BALL TO METAL-OXIDE SUPPORT WEIGHT RATIO RANGING FROM 50:1 TO 150:1. CONTACT THE METAL-OXIDE SUPPORT WITH DISTILLED WATER SUFFICIENT TO OBTAIN DISTILLED WATER TO METAL-OXIDE SUPPORT WEIGHT RATIO RANGING FROM 5:1 TO 20:1, includes wet ball-milling the metal-oxide support for approximately 4 hours using zirconium balls and/or stainless steel balls to maintain a ball to metal-oxide support weight ratio ranging from 50:1 to 150:1. In one example, a container at approximately 250 RPM is used. In another example, a ball to metal-oxide support weight ratio of 100:1 is obtained. In another example, the ball-milling process can be completed in approximately 2 to 6 hours. Step 418 can further include adding distilled water to the container with a distilled water to metal-oxide support weight ratio of approximately 12:1. In one example, distilled water can be added to the container with a distilled water to metal-oxide support weight ratio ranging from 2:1 to 20:1.

STEP 420, IMPREGNATE THE METAL OXIDE SUPPORT WITH A NICKEL METAL PRECURSOR, includes impregnating the metal oxide support with a nickel metal precursor such as $Ni(NO_3)_2 \cdot 6H_2O$. The metal oxide can be in powder form and other nickel metal precursors could be utilized. In one example, a given amount of nickel metal precursor is used corresponding to a desired nominal Ni loading. For example, desired nominal Ni loading may be 1 wt % to 20 wt %.

In another example, impregnating the metal oxide support includes using a given amount of nickel metal precursor corresponding to a nominal Ni loading of 5 wt %. Distilled de-ionized water can be used as a solvent. In one example, impregnating the metal oxide support is completed at a temperature range of approximately 30 to 150° C. In another example, impregnating the metal oxide support is completed at a temperature of 50° C.;

STEP 422, DRY AND HEAT IN AIR, includes drying and heating the obtained solid in air. In one example, the drying is completed at temperatures above 100° C. and the calcining process is completed at temperatures above 200° C. In one example, the drying is completed at 120° C. and the calcining process is completed at 500° C. The calcining process can be completed in approximately 1 to 4 hours. In one example, the calcining process is completed in approximately 2 hours. The supported Ni catalyst can be recalcined after STEP 120. In one example, the supported Ni catalyst can be recalcined at 750° C. for 2 hours. Further, the supported Ni catalyst can be in situ reduced in $H_2$. In one example, the supported Ni Catalyst can be in situ reduced in $H_2$ at 750° C. for 2 hours.

Figure 5:
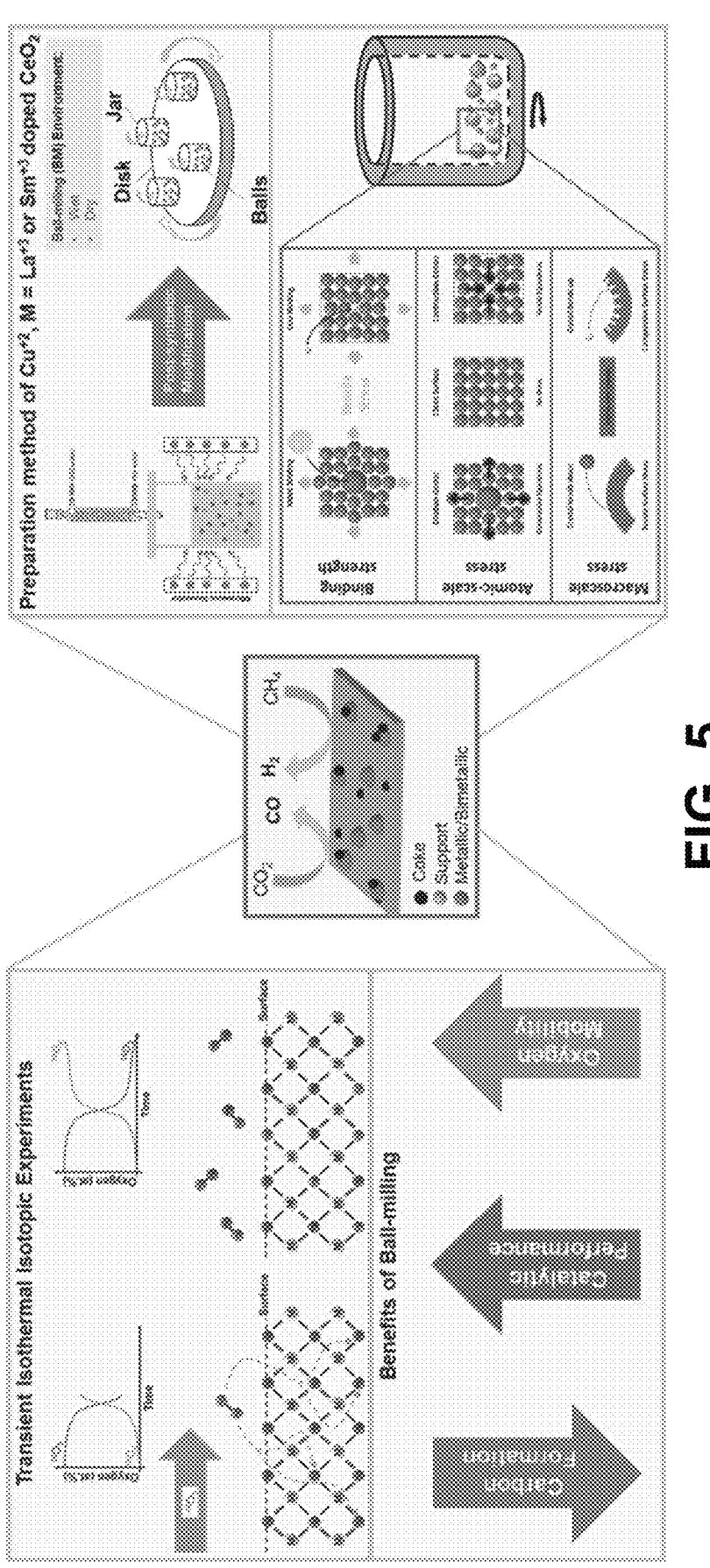
FIG. 5 illustrates a schematic illustration of the benefits of ball-milling a catalyst and the preparation method of ceria-supported catalysts, according to some embodiments.
Figure 6:
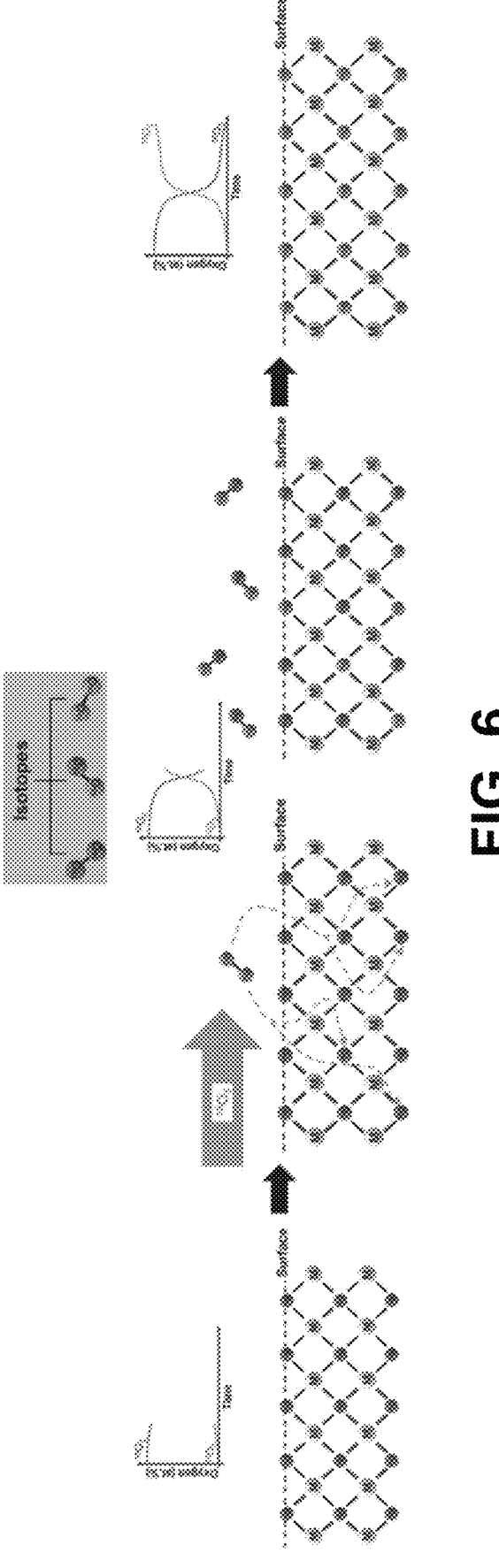
FIG. 6 illustrates a schematic illustration of the lattice oxygen $^{16}O$ are exchanged with $^{18}O$ for 10 min at 750° C., according to some embodiments.

FIG. 5 illustrates a schematic illustration of the benefits of ball-milling a catalyst and the preparation method of ceria-supported catalysts, according to some embodiments. FIG. 6 illustrates a schematic illustration of the lattice oxygen $^{16}O$ are exchanged with $^{18}O$ for 10 min at 750° C., according to some embodiments.

EXAMPLE 1

Figure 7:
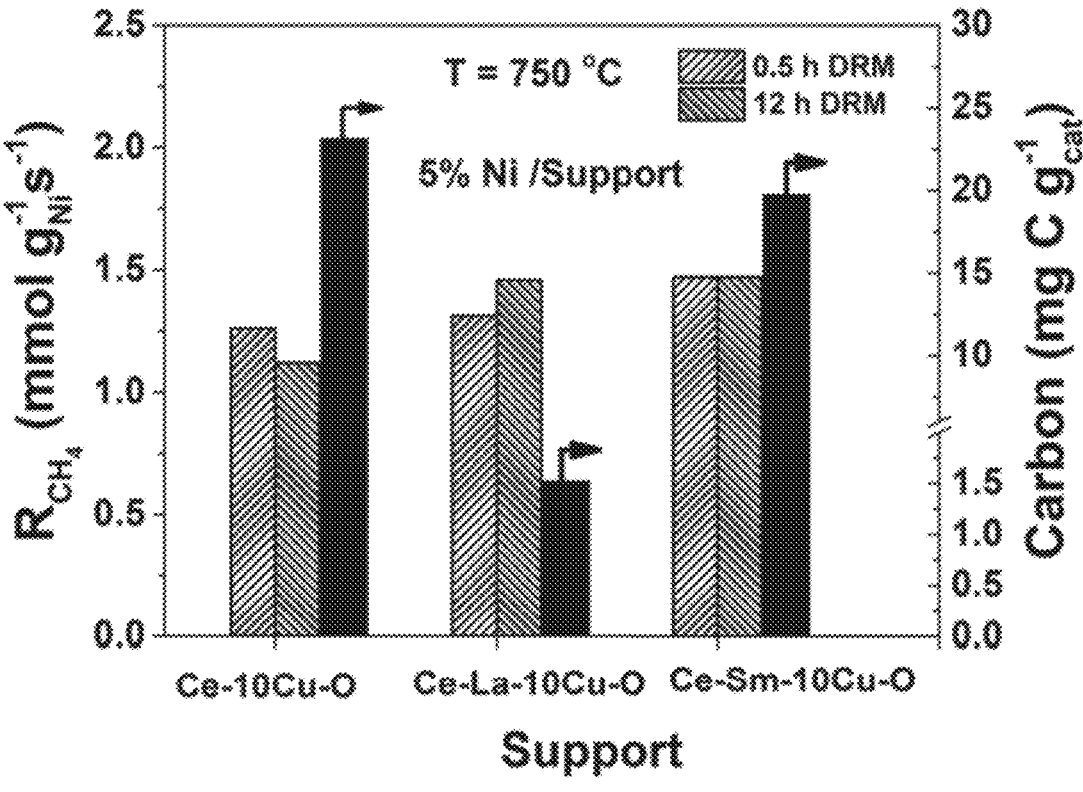
FIG. 7 illustrates the integral rates (mmol g–1Ni s–1) of $CH_4$ conversion after 0.5 h and 12 h of dry reforming of methane (20 vol % CH4/20% CO2/He) at 750° C., and the amount of carbon accumulated after 12 h DRM (Claims 1 & 2), according to some embodiments.
Figure 8:
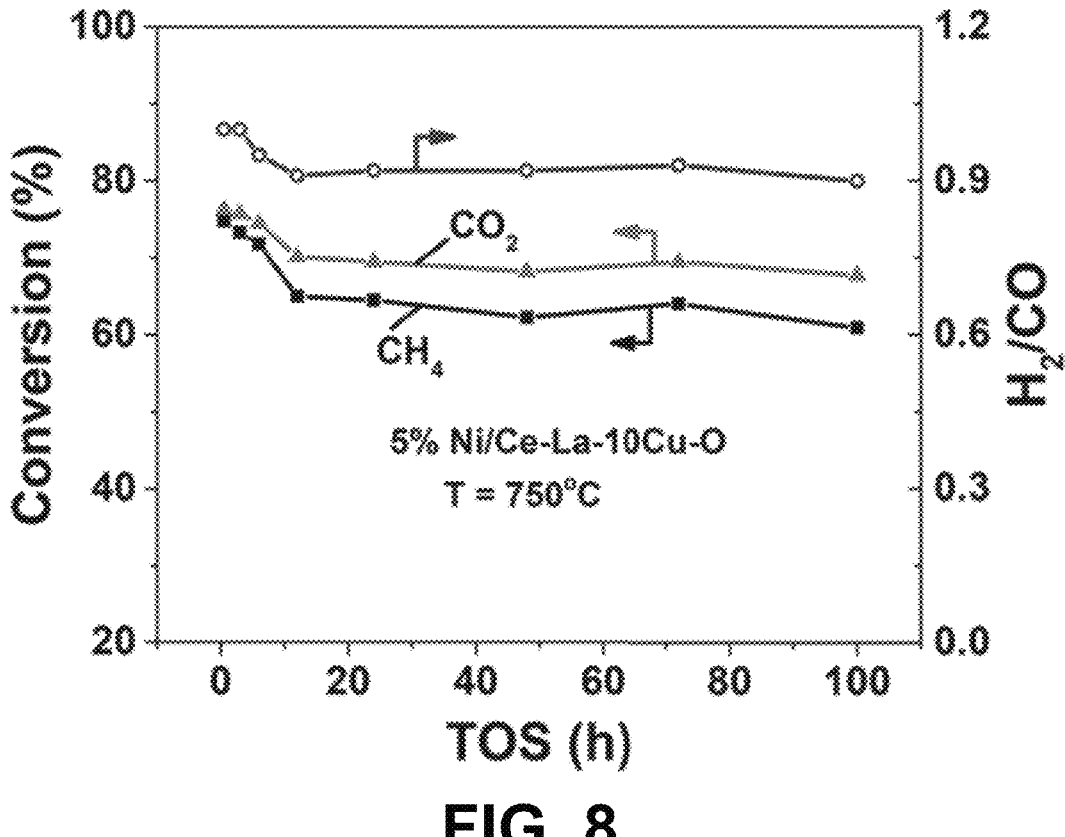
FIG. 8 illustrates a dry reforming of methane stability test (100 h) over the 5 wt % Ni/CeLa-10Cu—O catalyst. T=750° C., 40% CH4/40% CO2/20% He, GHSV~30,000 h–1, according to some embodiments.
Figure 9:
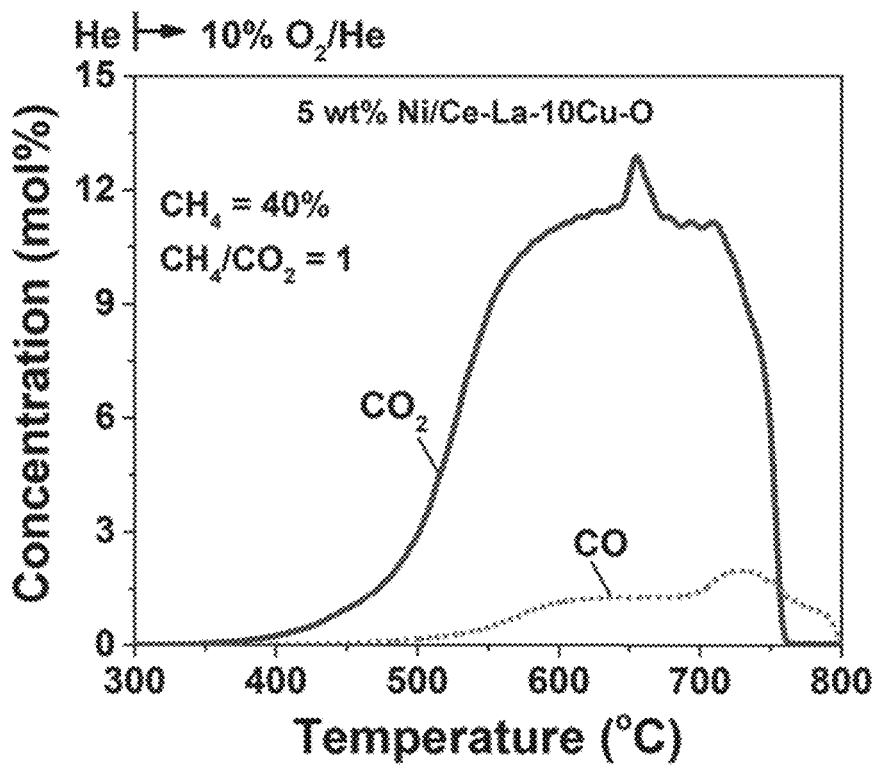
FIG. 9 illustrates CO2- and CO-TPO traces recorded over the 5 wt % Ni/Ce—La-10Cu—O catalyst after 100 h of DRM (40% CH4/40% CO2/20% He) at 750° C. and GHSV~30,000 h–1, according to some embodiments.

The Ni/CeLa10Cu exhibited the best coke inhibition amongst the catalysts examined, as shown in FIG. 7. Stability tests for 100 h TOS at 750° C. and GHSV of 30,000 h−1 were performed on 5% Ni/CeLa10Cu (Pristine), as shown in FIG. 8. Pristine may mean no WBM or DBM has been done. Initial conversion values for both $CH_4$ and $CO_2$ of ~76% were recorded (86% equilibrium values for DRM alone), which drop to 61% and 68%, respectively, after 100 h of DRM. However, most of the drop of DRM activity occurred within the first 10 h of reaction. A stable $H_2/CO$ gas product ratio of ~0.9 in the 20-100 h TOS period was observed. The amount of carbon accumulated after the 100-h stability test was determined by TPO, and results are presented in FIG. 9. An amount of 235 mg C $g^{-1}$ cat (or 23.5 wt %) corresponding to an average rate of 2.35 mg C $g^{-1}$ cat $h^{-1}$ for carbon deposition was estimated.

EXAMPLE 2

Figure 10A:
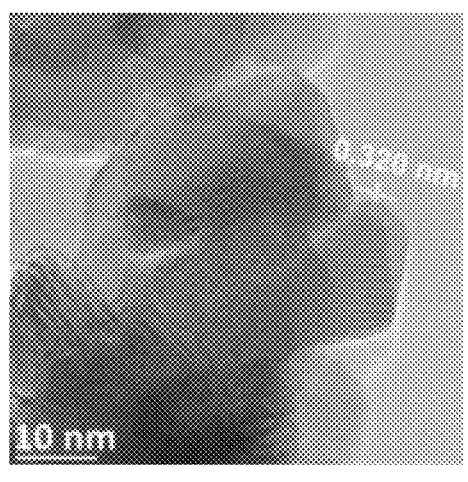
FIG. 10A illustrates a HRTEM image of the fresh 5 wt % Ni/Ce—La-10Cu—O catalyst, according to some embodiments.
Figure 10B:
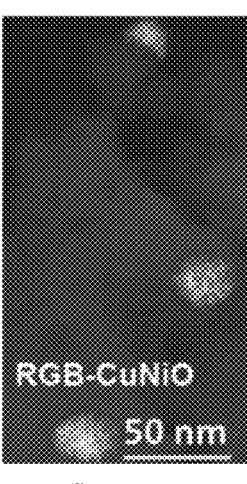
FIG. 10B illustrates a Red-Green-Blue (RGB) mapping analysis of the fresh 5 wt % Ni/Ce—La-10Cu—O catalyst. Red (R): Cu, Green (G): Ni, Blue (B): O, according to some embodiments.
Figure 10C:
FIG. 10C illustrates a RGB analysis of the Ce—La-10Cu—O support alone. Red (R): Ce, Green (G): La, Blue (B): Cu, according to some embodiments.

FIG. 10A-D show a HRTEM images of fresh Ni/Ce—La10Cu—O catalyst following calcination at 750° C./2 h and reduction at 750° C./2 h. The lattice fringes observed give an interplanar d-spacing of ~0.32 nm, which is very close to the d-spacing of (111) planes in CeO2 crystals (0.32 nm). Red-Green-Blue (RGB) mappings of Ni/Ce—La-10Cu—O and Ce—La-10Cu—O supports alone are depicted in FIGS. 10(B) and (C), respectively, at comparable magnifications. From the RGB analysis of the supported Ni catalyst, it can be stated that Cu species tend to diffuse towards the surface and agglomerate with Ni (FIG. 10B), in a rather homogeneous fashion, giving rise to the formation of NiCu alloy crystallites of 25-30 nm in size. This might be facilitated by the reducing gas environment ($H_2$ at 750° C.) applied prior to imaging, responsible for the creation of additional oxygen vacancies in the ceria matrix. The high temperature used during the pre-treatment step of Ni/Ce—La-10Cu—O increased the Ni—Cu interdiffusion rates, leading eventually to NiCu alloying (FIG. 3B). STEM-EDX analysis at different locations (FIG. 11A-E) demonstrated the co-presence of Ni and Cu in the particles.

Figure 10D:
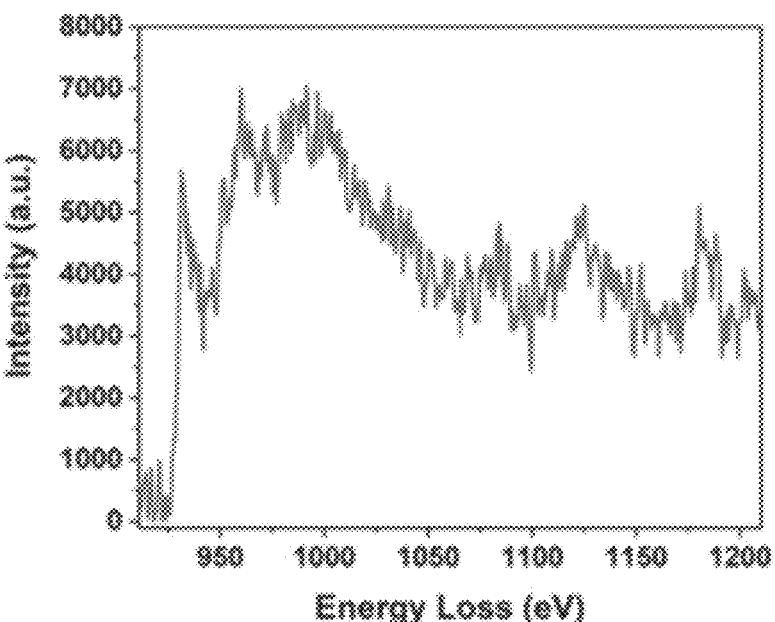
FIG. 10D illustrates Cu EELS for fresh 5 wt % Ni/Ce—La-10Cu—O, according to some embodiments.
Figure 12A:
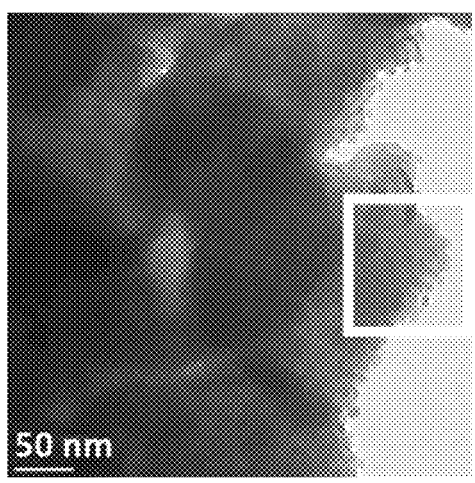
FIG. 12A illustrates a TEM image of the spent (100 h in DRM) Ni/Ce-La-10Cu—O catalyst, where the carbon-poor area (region 2) is marked, according to some embodiments.
Figure 12B:
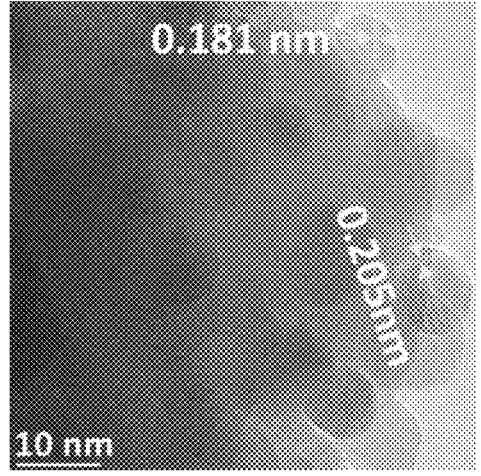
FIG. 12B illustrates a zoomed part of FIG. 12A with Cu d-spacings indicated (0.181 and 0.205 nm), according to some embodiments.

In the case of Ce—La-10Cu—O support alone (FIG. 10C), following calcination at 750° C. only, Cu is rather homogeneously embedded in the La-doped ceria lattice. The high temperature reduction in $H_2$ gas atmosphere for the formation of NiCu alloy is consistent with other reports, where XPS and Auger spectroscopic studies on NiCu alloys showed that at T>700° C., surface enrichment by Cu did occur. Similarly, in-situ reduction experiments performed at 300° C. under 20% $H_2/N_2$ gas atmosphere on NiCu bimetallic catalysts showed that Ni and Cu were uniformly alloyed, and only 13% segregated to form a Ni-rich surface. Cu EELS spectrum confirmed the metallic state of Cu (FIG. 10D)

stability of the two constituents in the alloy (fcc structure, similar electronegativity, and atomic radius) compared to the counterpart oxide environment. These areas did not experience coking (FIG. 12B).

EXAMPLE 3

Figure 15A:
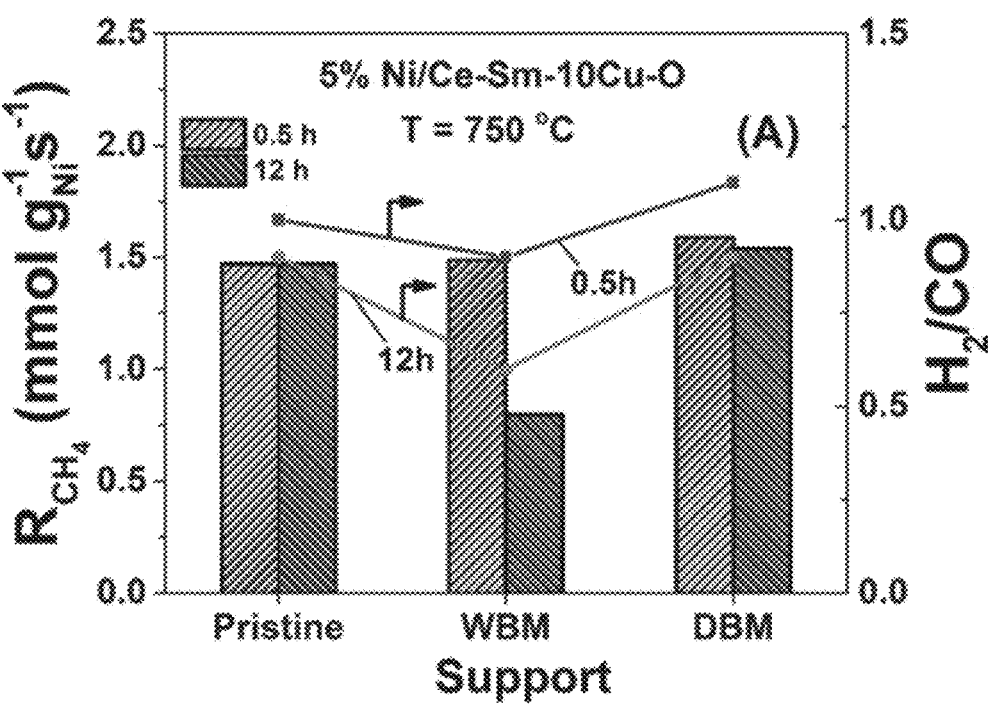
FIG. 15A illustrates integral rate of $CH_4$ conversion (mmol $g^{-1}_{Ni}s^{-1}$) and $H_2/CO$ gas product ratio obtained after 0.5 h and 12 h of DRM (20 vol % $CH_4$/20% $CO_2$/He) at 750° C. over 5 wt % Ni/Ce—Sm-10Cu—O catalysts as a function of support pre-treatment (Pristine, WBM and DBM), according to some embodiments.
Figure 15B:
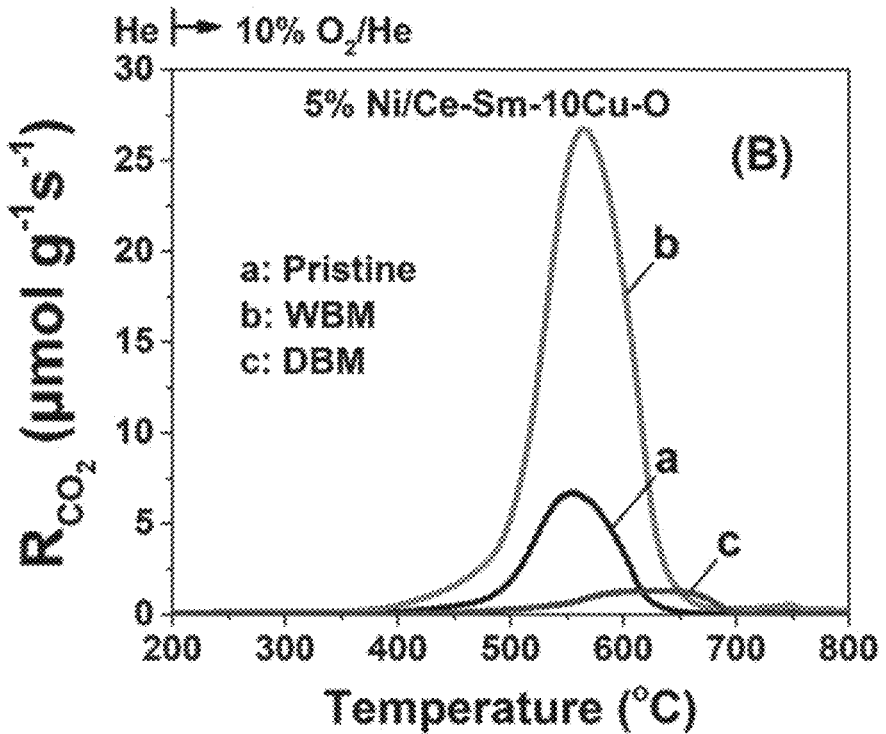
FIG. 15B illustrates transient response curves of $CO_2$ formation rate (μmol $g^{-1}_{Ni}s^{-1}$) obtained during TPO of carbon formed after 12 h of DRM (20 vol % $CH_4$/20 vol % $CO_2$/He) at 750° C. over 5 wt % Ni/Ce—Sm-10Cu—O catalysts: (a) Pristine, (b) WBM, and (c) DBM, according to some embodiments.

Post-synthetic modification of the Ce—Sm-10Cu—O support in environment decreased carbon formation (4.5 mgC $gcat^{-1}$). Post-synthetic modification of the ceria based supports improved oxygen mobility. The results are summarized in FIGS. 15A-B, where, P indicates the parent supports (unmilled), DBM and WBM denote the samples that were post-synthetically modified at different environments. Modification of the surface and hence of the deposited carbon has been achieved through the post-synthetic treatment. The improved oxygen mobility and defects engineering after post-synthetic modification led better carbon resistance after 12 h of DRM time on stream.

TABLE 1

Conversions of $CH_4$ and, $CO_2$, $H_2$ product yield ion (%), and H2/CO gas product ratio obtained after DRM at 750° C. (20% $CO_2$/20% $CH_4$/He) and for 0.5 h and 12 h (GHSV = 30,000 $h^{-1}$) on the 5 wt % Ni/supported on Ce—La—10Cu—O and 5 wt % Ni/Ce—Sm—10Cu.

| 5 wt % Ni/Ce—X—10Cu—O | Catalyst | Time (h) | $XCH_4$ (%) | $XCO_2$ (%) | $H_2$ yield (%) | $H_2$/CO | mg C $g_{cat}^{-1}$ |
|---|---|---|---|---|---|---|---|
| La | Pristine | 0.5 | 80.3 | 76.4 | 55.3 | 1.05 | — |
| | | | (86.6)a | (86.6)a | | (1.0)a | |
| | | | (83.6)b | (90.3)b | | (0.92)b | |
| | | 12 | 80.8 | 81.4 | 42.7 | 0.8 | 1.5 |
| | WBM | 0.5 | 91.5 | 93.5 | 71.7 | 1.1 | — |
| | | 12 | 88.7 | 91.7 | 57.9 | 1 | 70.7 |
| | DBM | 0.5 | 86.8 | 86.1 | 53.33 | 1.1 | — |
| | | 12 | 85.1 | 85.2 | 53.9 | 1.1 | 7.7 |
| Sm | Pristine | 0.5 | 81.2 | 89.7 | 60.5 | 1.0 | — |
| | | 12 | 81.4 | 89.6 | 58.2 | 1.0 | 19.8 |
| | WBM | 0.5 | 82.2 | 77.7 | 45.0 | 0.9 | — |
| | | 12 | 48.9 | 50.2 | 17.5 | 0.6 | 80.4 |
| | DBM | 0.5 | 86.7 | 85.4 | 54.3 | 1.1 | — |
| | | 12 | 84.3 | 84.4 | 44.5 | 0.9 | 4.5 |

Figure 11A:
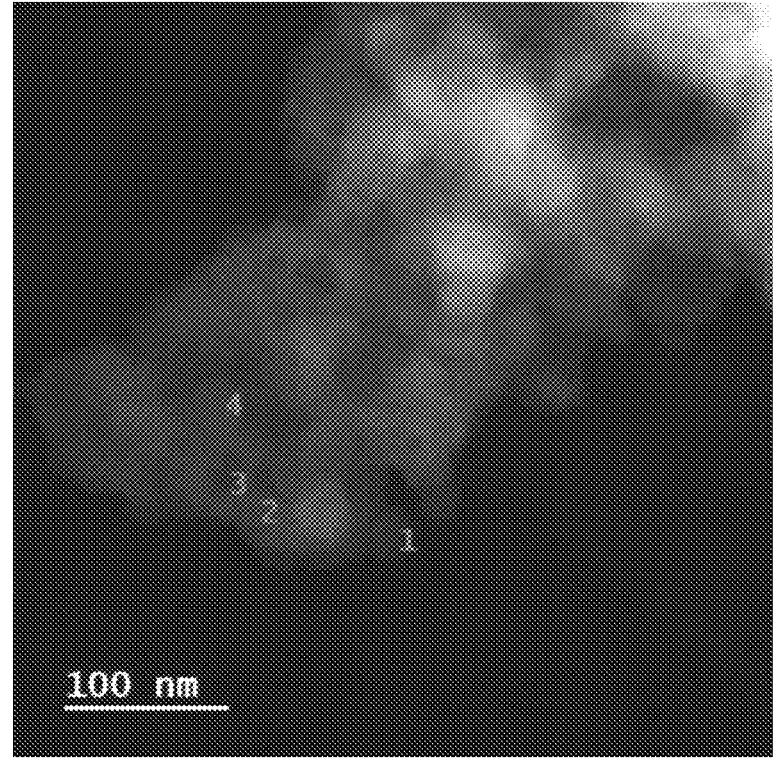
FIG. 11A illustrates STEM-EDX obtained over the 5 wt % Ni/Ce—La-10Cu—O catalyst, according to some embodiments.
Figure 11B:
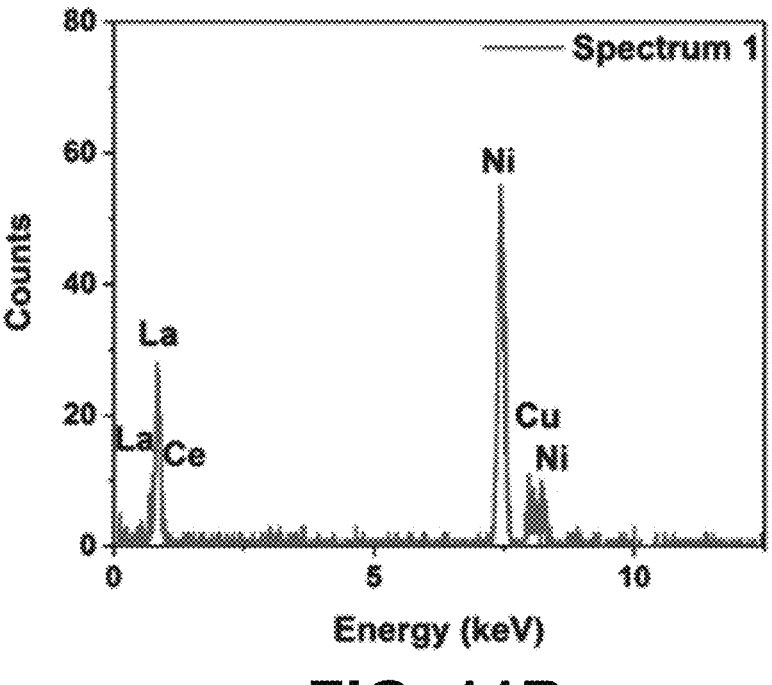
FIG. 11B illustrates STEM-EDX obtained over the 5 wt % Ni/Ce—La-10Cu—O catalyst, according to some embodiments.
Figure 11C:
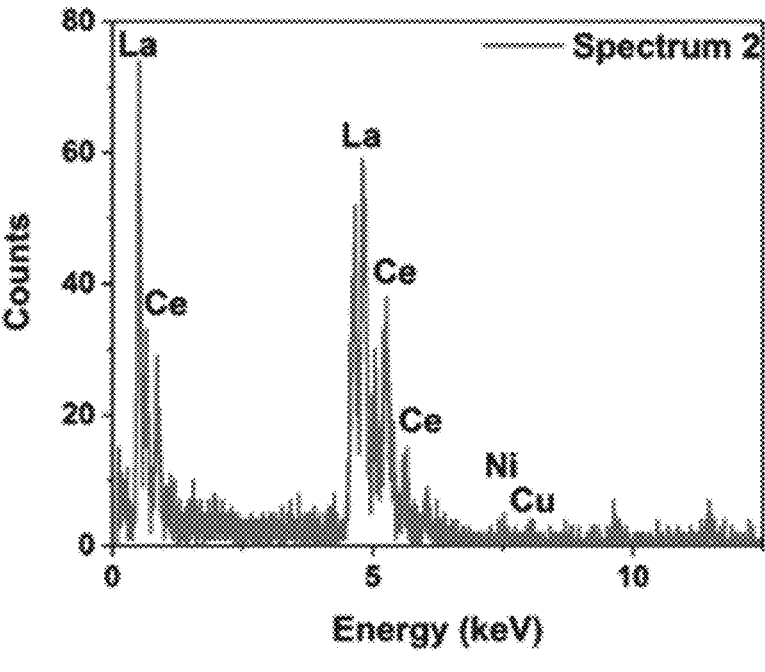
FIG. 11C illustrates STEM-EDX obtained over the 5 wt % Ni/Ce—La-10Cu—O catalyst, according to some embodiments.
Figure 11D:
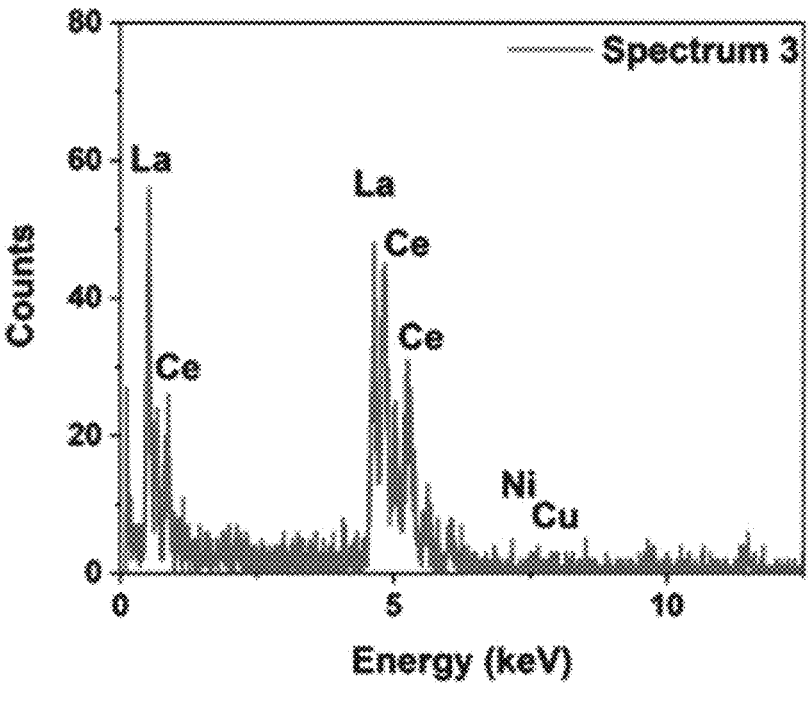
FIG. 11D illustrates STEM-EDX obtained over the 5 wt % Ni/Ce—La-10Cu—O catalyst, according to some embodiments.
Figure 11E:
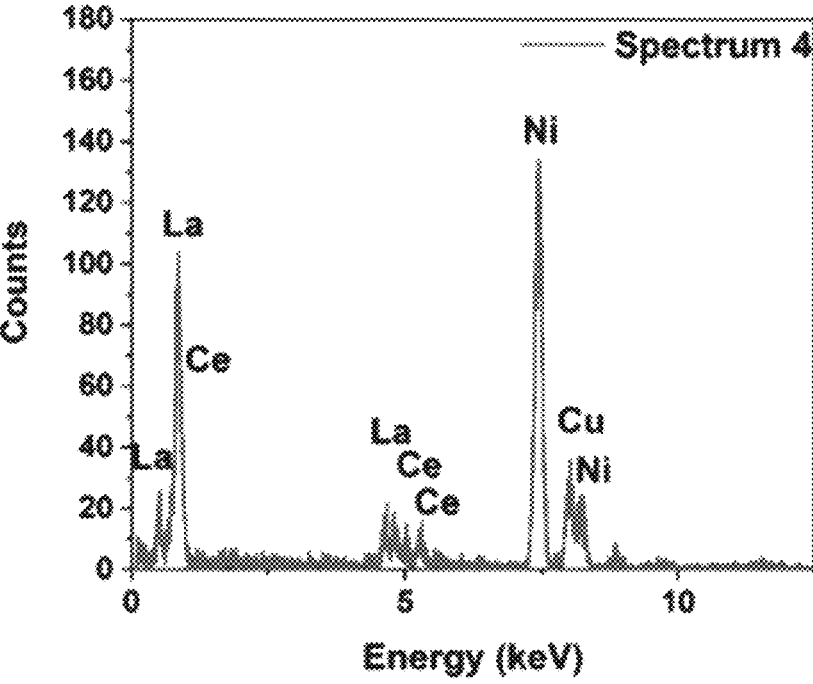
FIG. 11E illustrates STEM-EDX obtained over the 5 wt % Ni/Ce—La-10Cu—O catalyst, according to some embodiments.

HR-TEM images of the Ni/Ce—La-10Cu—O catalyst after 100 h in DRM are presented FIG. 10A, where carbon deposition can be clearly identified. The spent catalyst surface showed two regions, a carbon-poor one marked in FIG. 10A, and which is dominated by the formation of metallic Cu nanoparticles as shown in FIG. 12B, where fringes at 0.205 nm and 0.181 nm corresponding to metallic Cu (111) and (200), respectively, can be seen. FIG. 11A shows two marked locations illustrating encapsulation of the catalyst with carbon (carbon-rich, region 1), and carbon nanotubes (CNTs) formation (carbon-poor, region 2). FIG. 11B shows CNT of 0.56 nm diameter, which corresponds to a singlewall CNT grown on Cu particle. The fringes possibly correspond to Moire type fringes in Cu-SWCNT.

Figure 13A:
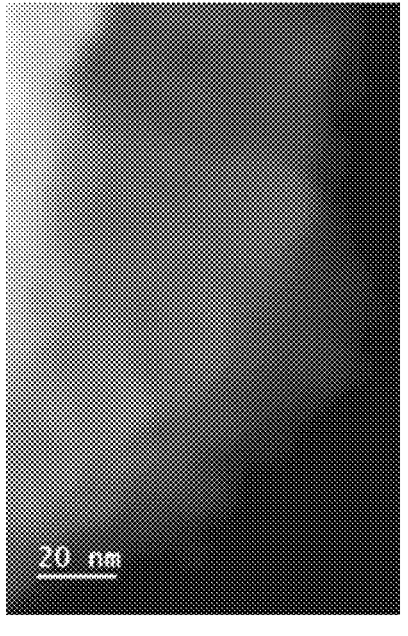
FIG. 13A illustrates STEM-RGB mapping of TEM image shown in FIG. 12A, where Red: La, Green: Cu, Blue: Ni, according to some embodiments.
Figure 13B:
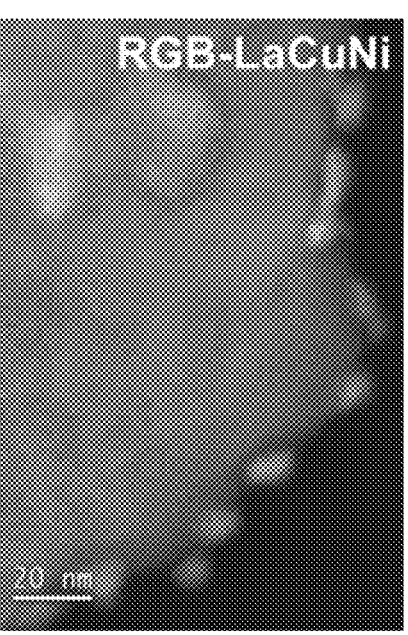
FIG. 13B illustrates STEM-RGB mapping of TEM image shown in FIG. 12A, where Red: La, Green: Cu, Blue: Ni, according to some embodiments.
Figure 13C:
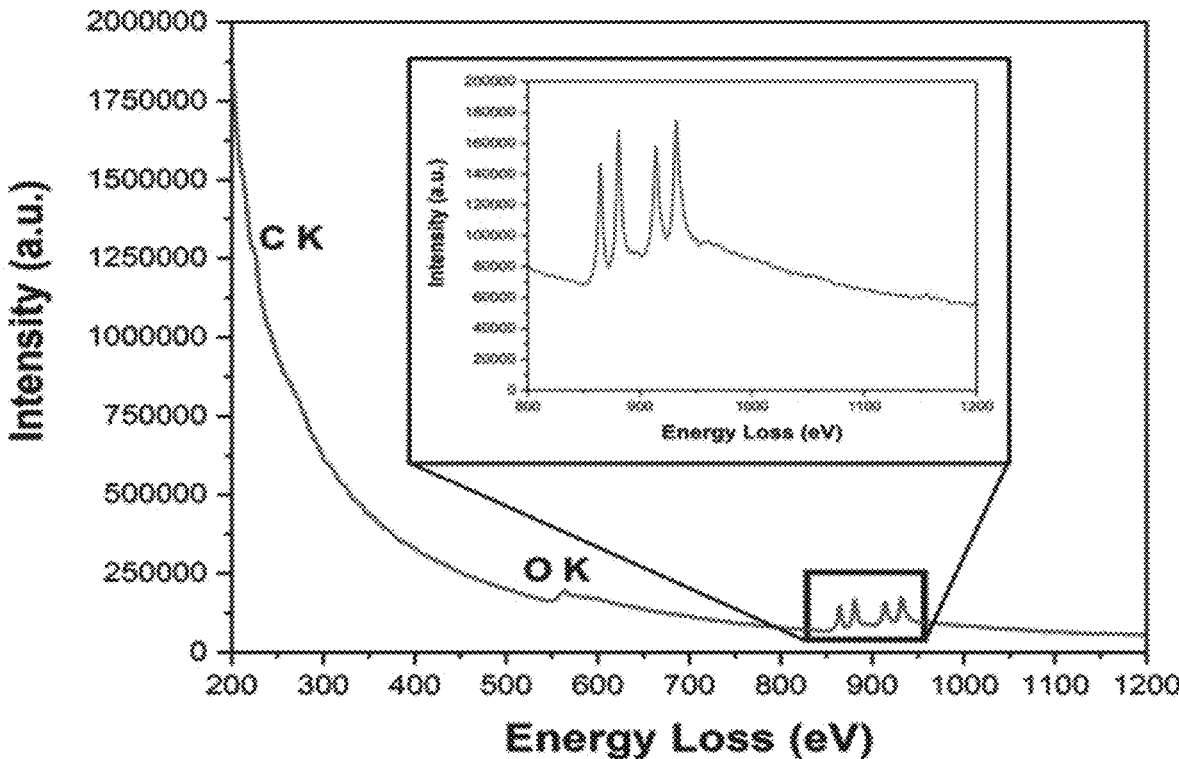
FIG. 13C illustrates EELS spectrum of the spent (after 100 h DRM at 750° C.) 5 wt % Ni/Ce—La-10Cu—O catalyst, according to some embodiments.
Figure 14A:
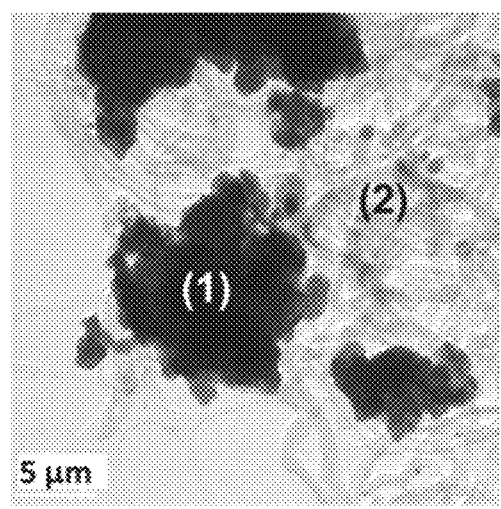
FIG. 14A illustrates Ni/Ce—La-10Cu—O (spots 1, 2) surrounded by carbon nanotube (CNT) formation (region 1), according to some embodiments.
Figure 14B:
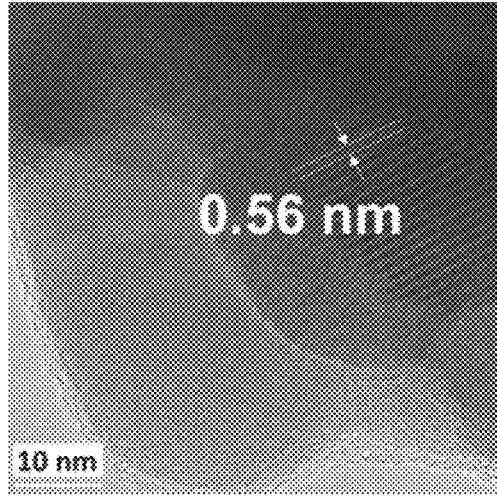
FIG. 14B illustrates carbon encapsulation and CNT growth direction over the 5 wt % Ni/Ce—La-10Cu—O after 100 h in DRM at 750° C., according to some embodiments.

HR-TEM images showed that carbon-poor area (region 2) is populated with NiCu bimetallic alloy particles. The bimetallic alloy formation was seen also in the fresh catalyst (following calcination and $H_2$ reduction at 750° C.), and reasons for its formation were previously discussed. The STEM-RGB mapping of the spent catalyst (FIG. 13A-B) and shows the presence of NiCu alloy (cyan particles as the result of thorough mixing of green (Cu) and blue (Ni)). It must be pointed out that Cu particles (see FIG. 12B and FIG. 13B) can also be formed through a NiCu de-alloying. This route however is highly unlike to occur due to the affinity/

EXAMPLE 4

Ni/Ce—Sm-10Cu—O Experimental

The $H_2$-TPD technique was used to investigate the hydrogen adsorption states over the supported Ni catalysts and estimate the size of Ni. 0.1 g of the calcined catalysts (750° C. for 4 h in air) were loaded in a microreactor and the temperature of the catalyst was increased to 750° C. under He. The catalyst was reduced by passing hydrogen gas flow (1 bar) at 750° C. for 2 h, then the microreactor was purged with He until the $H_2$ signal in the mass spectrometer reaches background. Then, the catalyst was cooled down to 30° C. with He flow. The $H_2$ adsorption stage (chemisorption) was performed by switching the gas from He→0.5 vol % $H_2$/He for 30 min at 30° C. The catalysts were purged with He after the $H_2$ chemisorption for 10 min and then the desorption stage was performed by increasing the temperature to 700° C. (ramp=30° C. $min^{-1}$), while continuously monitoring the $H_2$ signal (m/z=2) mass spectrometer (MS, Balzers, Omnistar 1-200 amu). A certified gas mixture (0.95 vol % $H_2$/He) was used to convert the $H_2$ signal to mol %. The rate of $H_2$ desorption was estimated using a material balance for an open-flow reactor. The mean particle size, ($d_{Ni}$, nm) was estimated using Equation 1 and compared to that obtained by PXRD studies. Structural and textural chacteristics of 5 wt % Ni/Ce—Sm-10Cu—O catalysts for pristine and the following ball-milling (DBM and WBM) supports are shown in Table 2.

$$d_{Ni}(\text{nm}) = 0.97_{d_{Ni}^{-1}} \qquad \text{Equation 1}$$

Powder XRD analysis was performed over the fresh catalysts using a Shimadzu 6000 Series diffractometer (CuKa radiation, λ=0.15418 nm). X-ray scans were recorded in the 2θ range of 20-80° with 0.02° increment, scan speed of 2° min$^{-1}$, and dwell time of 0.6 s. The Scherrer equation was used to estimate the mean primary crystallite size ($d_c$, nm) and the lattice constant α (Å) of the support's single-phase solid solution (ceria pseudo-cubic structure) and that of the NiO phase. Estimation of the $d_{Ni}$ (nm), was done based on the hypothesis of the same geometry for the NiO and Ni crystallites (after $H_2$ reduction) and using Equation 2.

$$d(\text{Ni, nm}) = d(\text{NiO, nm}) \times 0.847 \qquad \text{Equation 2}$$

TABLE 2

Structural and textural chacteristics of 5 wt % Ni/Ce—Sm—10Cu—O catalysts for pristine and the following ball-milling (DBM and WBM) supports.

| | 5% Ni/Ce—Sm—10Cu—O | | |
|---|---|---|---|
| | Pristine | DBM, 4 h | WBM, 4 h |
| SSA (m$^2$/g) | 24.6 ± 0.3 | 7.4 ± 0.1 | 15.6 ± 0.1 |
| Crystallite size (nm) d$_{CeO2}$ | 6.5$^b$ | 11.5$^b$ | 3.7$^b$ |
| D$_{Ni}$ (%) | 5.7$^a$ | 3.1$^a$ | 2.9$^a$ |
| d$_{ni}$ (nm) | 17$^c$ | 31.5$^c$ | 33$^c$ |

$^a$Based on H$_2$ chemisorption followed by TPD;
$^b$Estimated using powder XRD data and the Scherrer formula (K = 0.9);
$^c$Based on C-s + $^{18}$O$_L$ → C$^{18}$O(g) + s + Vo The reducibility of catalysts was evaluated using $H_2$ temperature-programmed reduction ($H_2$-TPR). For catalyst pre-treatment, 20% $O_2$/He gas was passed over 0.1 g of catalyst while raising the temperature to 700° C. (ramp=30° C./min). Then the temperature was maintained at 700° C. for 15 min. The catalyst was purged with He for 10 min and cooled down to 35° C. with 30° C./min ramp, whilst maintaining He flow. The gas flow was switched to 5.18 vol % $H_2$/Ar gas atmosphere (50 NmL min$^{31}$ $^1$) and the temperature was increased to 700° C. (ramp=30° C./min). An online mass spectrometer (Balzers, Oninistar 1-200 amu) was used to monitor and record the $H_2$ signal (m/z=2). The quantity of $H_2$ was converted in terms of mol % was converted using a certified $H_2$ gas mixture. The H2-TPR traces in terms of reduction rate (μmol $H_2$ g$_{cat}^{-1}$s$^{-1}$) vs temperature were obtained using the appropriate material balance. Then the $H_2$-TPR trace was integrated to quantify the amount of $H_2$ consumed (μmol $H_2$ g$_{cat}^{-1}$) or oxygen removed from the solid (μmol O g$_{cat}^{-1}$). The total amount of oxygen removed from the solids during $H_2$-TPR is shown in Table 3.

TABLE 3

Total amount of oxygen removed from the solids during H$_2$-TPR.

| Catalyst 5 wt % Ni/Ce—Sm—10Cu—O | | $^{16}$O Total (mmol g$^{-1}$) | Support alone (mmol g$^{-1}$) |
|---|---|---|---|
| Sm | Pristine | 1.85 | 1 |
| | WBM | 1.55 | 0.7 |
| | DBM | 2.24 | 1.39 |

$CO_2$ temperature-programmed desorption ($CO_2$-TPD) experiments were conducted on the calcined (750° C. for 2 h) catalysts to characterize the surface basic sites. Initially, 20% $O_2$/He gas mixture was passed over the catalyst (W=0.1 g), while increasing the temperature of the catalyst to 750° C. with of 30° C./min. The $O_2$/He flow was maintained for 30 min at 750° C. The gas feed was then switched to He while maintaining the temperature at 750° C. for 10 min The surface of the catalyst was then cooled down to 30° C. using continuous He flow for $CO_2$ adsorption. 5 vol % $CO_2$/He gas mixture was passed over the surface of the catalyst until saturation of basic sites. The point of saturation is verified by monitoring the consumption of $CO_2$ signal (m/z=44) in the online mass spectrometer. The desorption step was performed by switching the feed gas from $CO_2$/He→He (30 NmL min$^{-1}$), while increasing the temperature of catalyst to 700° C. with a ramp 30° C./min. The evolution of CO2 was monitored using an online mass spectrometer. The $CO_2$ signal was converted into mole fraction after calibration, and the $CO_2$-TPD trace is presented as desorption rate (μmol CO2 g$_{cat}$-1s-1) versus temperature. Integration of the $CO_2$-TPD trace and using the appropriate material balance provided the amount of $CO_2$ adsorbed (μmol $CO_2$ gcat-1). Finally, the number density of basic sites (μmol $CO_2$m$^{-2}$) was also calculated using the SSA (BET, m$^2$/g) of the solid. The total amount of $CO_2$-TPD over the 5 wt % Ni/Ce—Sm-10Cu—O catalysts is shown in Table 4.

TABLE 4

Total amount of CO$_2$ desorbed during CO$_2$-TPD over the 5 wt % Ni/Ce—Sm—10Cu—O catalysts.

| Catalyst 5 wt % Ni/Ce—Sm—10Cu—O | CO$_2$ (μmol g$^{-1}_{cat}$) |
|---|---|
| Pristine | 27.9 |
| WBM | 11.3 |
| DBM | 18 |

The DRM catalytic measurements were performed on finely grinded and sieved (p.s.<106 μm) fresh catalyst (W=0.1g) using a home-made gas flow system. Four thermal mass-flow control (MFC) valves (BRONKHORST) run by four separate controllers (TOHO TTM-120) were used to in situ prepare a given gas mixture. Good mixing of the gas streams was achieved by using a small mixing chamber. A six-port chromatographic switching valve (0.2 s response time) was used to bypass the reactor when necessary. All necessary components of the apparatus had been enclosed in a furnace (hot box) run by a programmable temperature controller (TOHO TTM-120). The temperature of the hot box was kept at 150° C. The microreactor used for catalytic measurements consisted of two 5.0 mm i.d. sections of quartz cylindrical tubes. These served as inlet and outlet to and from a quartz cell (cylindrical shape) of 10.0 mm i.d. (nominal volume 3 ml). A small furnace run by a programmable temperature controller (TOHO TTM-120) provided heating to the reactor. The temperature of the catalyst bed was measured by a 'K-type' thermocouple placed in the entrance of the bed. Quartz wool was placed at both sides of the catalyst bed to fix the solid sample in place.

The catalyst was exposed to 20 vol % $CH_4$/20 vol % $CO_2$/60 vol % He with a flow rate of 50 NmL min$^{-1}$ while continuously monitoring the effluent gas via an on-line Mass Spectrometer (MS) and an IR $CO/CO_2$ gas analyzer (Horiba, Model VA-3000) for $H_2$, $CH_4$, CO, and $CO_2$ (m/z=2, 15, 28, and 44, respectively). Standard calibration gas mixtures (ca. 1.06 vol % CO/1.02 vol % $CH_4$/0.95 vol % $H_2$/He and 2.55 vol % $CO_2$/He) were used to convert the signals to concentration (mol %). The catalytic performance of catalysts was evaluated based on the conversion of reactants ($X_{CH4}$ and $X_{CO2}$, %) and the yield of products, $Y_{H2}$ (%) and $Y_{CO3}$(%) using Equation 3, Equation 4, and Equation 5

$$X_i(\%) = \frac{F_i^{in} - F_i^{out}}{F_{Yi}^{in}} \times 100 \qquad \text{Equation 3}$$

$$Y_{H_2}(\%) = \frac{F_{H_2}^{out}}{2F_{CH_4}^{in}} \times 100 \qquad \text{Equation 4}$$

$$Y_{CO}(\%) = \frac{F_{CO}^{out}}{F_{CH_4}^{in} \mp F_{CO_2}^{in}} \times 100 \qquad \text{Equation 5}$$

where, $$F_i^{in}$$

and $$F_i^{out}$$

are the molar flow rates (mol s$^{-1}$) of reactant i ($CH_4$ and $CO_2$) at the inlet and outlet of the reactor, respectively. The $$F_i^{out}$$

it was estimated, in all cases, based on the total volume flow rate at the outlet of the reactor (1 bar, 25° C.), and the mole fraction of reactant or product measured by either the MS or IR gas analyzer.

TABLE 5

Conversions of $CH_4$ and $CO_2$, $H_2$-yield (%), and $H_2/CO$ gas product ratio after DRM at 750° C. (20% $CO_2$/20% $CH_4$/He) for 0.5 h and 12 h over the 5 wt % Ni supported on Ce—Sm—10Cu—O carriers (Pristine, WBM and DBM). The amount of carbon accumulated (mg C g$^{-1}_{cat}$) after 12 h of DRM is also presented.

| Catalyst 5 wt % Ni/ Ce—Sm—10Cu—O | Time (h) | $X_{CH4}$ (%) | $X_{CO2}$ (%) | $H_2$-yield (%) | $H_2/CO$ | mg C g$_{cat}^{-1}$ |
|---|---|---|---|---|---|---|
| Pristine | 0.5 | 81.2 | 89.7 | 60.5 | 1.0 | — |
| | | (86.6)[a] | (86.6)[a] | | (1.0)[a] | |
| | | (83.6)[b] | (90.3)[b] | | (0.92)[b] | |
| | 12 | 81.4 | 89.6 | 58.2 | 1.0 | 19.8 |
| WBM | 0.5 | 82.2 | 77.7 | 45.0 | 0.9 | — |
| | 12 | 48.9 | 50.2 | 17.5 | 0.6 | 80.4 |

TABLE 5-continued

Conversions of $CH_4$ and $CO_2$, $H_2$-yield (%), and $H_2/CO$ gas product ratio after DRM at 750° C. (20% $CO_2$/20% $CH_4$/He) for 0.5 h and 12 h over the 5 wt % Ni supported on Ce—Sm—10Cu—O carriers (Pristine, WBM and DBM). The amount of carbon accumulated (mg C g$^{-1}_{cat}$) after 12 h of DRM is also presented.

| Catalyst 5 wt % Ni/ Ce—Sm—10Cu—O | Time (h) | $X_{CH4}$ (%) | $X_{CO2}$ (%) | $H_2$-yield (%) | $H_2/CO$ | mg C g$_{cat}^{-1}$ |
|---|---|---|---|---|---|---|
| DBM | 0.5 | 86.7 | 85.4 | 54.3 | 1.1 | — |
| | 12 | 84.3 | 84.4 | 44.5 | 0.9 | 4.5 |

[a]Estimated equilibrium conversions of $CH_4$ and $CO_2$ and the $H_2/CO$ gas product ratio for the DRM only (20 vol % $CH_4$/20 vol % $CO_2$/60 vol % He; T = 750° C.).
[b]Estimated equilibrium conversions of $CH_4$ and $CO_2$ and the $H_2/CO$ gas product ratio when along the DRM the RWGS reaction (side reaction) also takes place (20 vol % $CH_4$/20 vol % $CO_2$/60 vol % He; T = 750° C.).

TABLE 6

Quantity of $CH_4$ converted, $H_2$ and CO formed (mmol g$^{-1}_{cat}$), and ratio of $CO/CH_4$ obtained after 30 min of $CH_4$ decomposition (20 vol % $CH_4$/He) at 750° C. The amount of carbon accumulated (mmol g$^{-1}_{cat}$) was measured by TPO.

| Catalyst 5 wt % Ni/ Ce—Sm—10Cu—O | $CH_4$ converted (mmol g$^{-1}_{cat}$) | $H_2$ (mmol g$^{-1}_{cat}$) | CO (mmol g$^{-1}_{cat}$) | $CO/CH_4$ | mmol C g$^{-1}_{cat}$ (mg C g$^{-1}_{cat}$) |
|---|---|---|---|---|---|
| Pristine | 33.0 | 68.6 | 0.3 | 0.01 | 37.0 (444) |
| WBM | 28.4 | 57.8 | 0.3 | 0.01 | 29.1 (349.2) |
| DBM | 8.2 | 15.6 | 0.8 | 0.07 | 7.9 (94.8) |

The amount of "carbon" (mg C g$_{cat}^{-1}$ or wt %) accumulated on the surface of catalysts after 12 h of DRM reaction (20 vol % $CH_4$/20 vol % $CO_2$/He) at 750° C. and its reactivity towards oxygen (gasification to $CO/CO_2$) were studied via temperature-programmed oxidation (TPO). Initially, after DRM the reactor was purged with He gas flow for 20-min at 750° C., and the temperature was then increased to 800° C. in He gas flow and kept at this temperature until no $CO/CO_2$ would be recorded. This step was performed to ensure that no $CO_2$ and CO could appear under TPO due to likely adsorbed carbonates formed under DRM at 750° C. The catalyst's temperature was then reduced to 100° C. and the feed gas stream was switched to 10 vol % $O_2$/He (50 NmL min$^{-1}$) to perform the TPO run. Simultaneously, the temperature of the reactor was increased to 800° C. ($\beta$=30° C. min$^{-1}$) while monitoring continuously the MS signals of CO and $CO_2$ (m/z=28 and 44, respectively). The conversion of these MS signals to CO and $CO_2$ concentration (mol % or ppm) was performed using certified calibration gas mixtures (ca. 1.06 vol % CO/He and 2.55 vol % $CO_2$/He). The amount of CO converted and $CO_2$ formed is shown in Table 7.

The other carbon pathway in the DRM, reverse Bouduard reaction (2 CO+s↔$C_{-s}$+$CO_2$) or disproportionation of CO(g), is investigated by the step-gas concentration switch He→20 vol % CO/He (750° C., t), where the initial rate of CO disproportionation and the dynamic evolution of carbon deposition were estimated. A TPO run (10 vol % $O_2$/He, $\beta$=30° C. min$^{-1}$) starting from 200 to 800° C. was performed after 30 min in CO/He gas treatment to characterize the "carbon" accumulated after 30 min of CO disproportionation reaction. An on-line mass spectrometer (MS) continuously monitored the transient evolution of the CO (m/z=28) conversion and $CO_2$ (m/z=44) formation.

TABLE 7

Amount of CO converted, and CO2 formed (mmol g$^{-1}_{cat}$) obtained after
30 min of CO disproportionation (20 vol % CO/He) at 750° C.
The amount of carbon accumulated (mmol g$^{-1}_{cat}$) was measured by TPO.

| Catalyst 5 wt % Ni/ Ce—Sm—10Cu—O | CO converted (mmol g$^{-1}_{cat}$) | Carbon mmol C g$^{-1}_{cat}$ (mg C g$^{-1}_{cat}$) |
|---|---|---|
| Pristine | 0.5 | 0.25 (3.0) |
| WBM | 0.9 | 0.5 (6.0) |
| DBM | 0.4 | 0.2 (4.7) |

The isotopic gas $^{18}O_2$(g) was used to probe the extent of support's lattice oxygen contribution in the oxidation of carbon derived during DRM to the CO formation. The lattice $^{16}O$ species of support were partly exchanged for $^{18}O$ during a 10-min treatment with 2 vol % $^{18}O_2$/2% Kr/Ar gas at 750° C., following the step-gas concentration switch Ar→2 vol % $^{18}O_2$/2% Kr/Ar (t). The Kr gas was used as tracer that allows to estimate the amount of $^{18}O$ consumed due to both the exchange of $^{16}O$ of support for $^{18}O$, and at the same time the oxidation of Ni to Ni$^{18}O$, according to the following material balance in Equation 6.

$$N^{16}O(mol\ g^{-1}) = \left(2\ F_T y_f^{18}O_2\right)\int_0^{\tau_{s,s}} \left[Z_{Kr}(t) - Z^{18}O_2(t)\right]dt \quad \text{Equation 6}$$

The surface of the freshly reduced catalyst ($W_{cat}$=0.02 g) was first exposed to 2 vol % $^{18}O_2$/2 vol % Kr/Ar for 10 min at 750° C., while monitoring with on-line MS the three gaseous oxygen isotopic species: $^{16}O_2$ (m/z=32), $^{16}O^{18}O$ (m/z=34), $^{18}O_2$ (m/z=36) and the tracer Kr (m/z=84) gas. The $^{18}O_2$ transient response curve and that of Kr were then normalized to the feed value to obtain a dimensionless concentration Z according to Equation 7

$$Z_i(t) = y_i(t)/y_i^f \quad \text{Equation 7}$$

where $y_i$ (t) is the concentration (mol %) of species i ($^{18}O_2$ or Kr) obtained during the transient, and $y_i^f$ is the feed concentration of species i in the feed gas stream ($y_i^f$=0.02 for both $^{18}O_2$ and Kr). If all $^{16}O$ in the solid support could exchange for $^{18}O$ after some time, then Z$^{18}O_2$=1.

Following $^{16}O/^{18}O$ isotopic exchange, the temperature of the catalyst was decreased to 400° C. under the $^{18}O_2$/Ar gas stream followed by a 10-min Ar purge. At 400° C., the feed gas was switched to pure H$_2$ (1 bar) for 1 h to ensure that Ni would be in metallic state (Ni)$^0$, and most of support's lattice oxygen would remain at its isotopic $^{18}O$ form; at 400° C., only about 5% of $^{18}O$ initially present in the support (after $^{18}O_2$/Ar gas treatment at 750° C.) was reduced to form H$_2^{18}O$ based on an independent experiment conducted. Finally, a 10-min Ar purge at 400° C. was performed until no H$_2$-MS signal was observed, and the catalyst temperature was increased to 750° C. in Ar gas flow followed by the step-gas switch Ar→20 vol % CH$_4$/20 vol % CO$_2$/2 vol % Kr/Ar/He. During the last switch to the DRM gas mixture, the carbon formed on the surface can be gasified by reacting with the lattice oxygen to form C$^{18}O$(g) according to Eq. (6), and at the same time to form C$^{16}O$(g). The latter is due to the normal formation of CO via the participation of $^{16}O$ present in the C$^{16}O_2$ of the DRM gas mixture. The quantity of $^{18}O$-exchanged (mmol g$^{-1}_{cat}$) under the flow of 2% $^{18}O_2$ for 10 min at 750° C., and C$^{18}O$ formed (mmol g$^{-1}_{cat}$) during 15 min of DRM (20% vol CH$_4$/20% vol CO$_2$/He) at 750° C. following $^{18}O$-exchange at 750° C. and H$_2$ reduction at 400° C. is shown in Table 8.

TABLE 8

Quantity of $^{18}O$-exchanged (mmol g$^{-1}_{cat}$) under the flow of 2% $^{18}O_2$
for 10 min at 750° C., and C$^{18}O$ formed (mmol g$^{-1}_{cat}$) during
15 min of DRM (20% vol CH$_4$/20% vol CO$_2$/He) at 750° C.
following $^{18}O$-exchange at 750° C. and H$_2$ reduction at 400° C.

| Catalyst 5 wt % Ni/Ce—Sm—10Cu—O | $^{18}O$-exchanged (mmol g$^{-1}_{cat}$) | C$^{18}O$ (mmol g$^{-1}$) |
|---|---|---|
| Pristine | 9.5 | 4.7 |
| WBM | 8.7 | 6.1 |
| DBM | 8.1 | 5.8 |

EXAMPLE 5

Figure 16A:
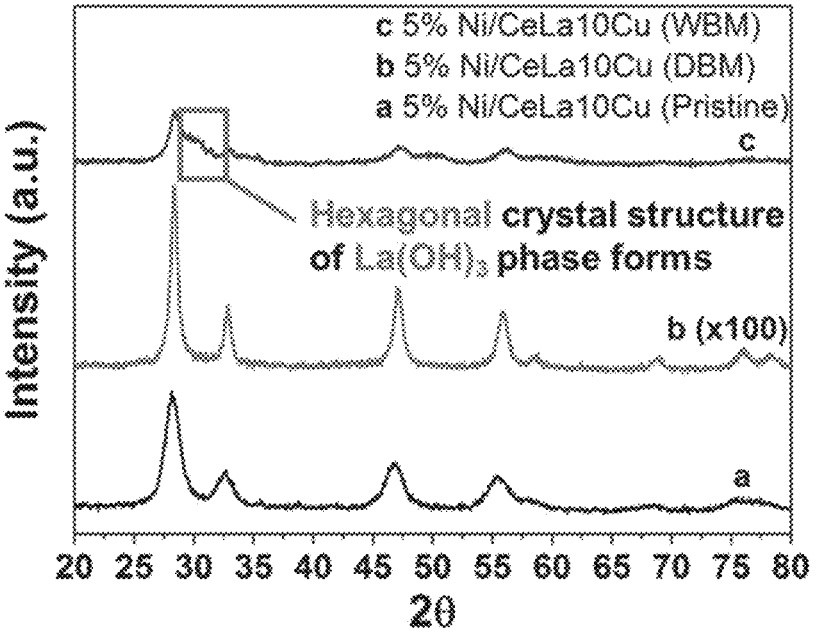
FIG. 16A illustrates powder XRD patterns of Ni supported on Ce—La-10% Cu—O carrier following calcination at 750° C. (a: Pristine; b: DBM: c: WBM), according to some embodiments.
Figure 16B:
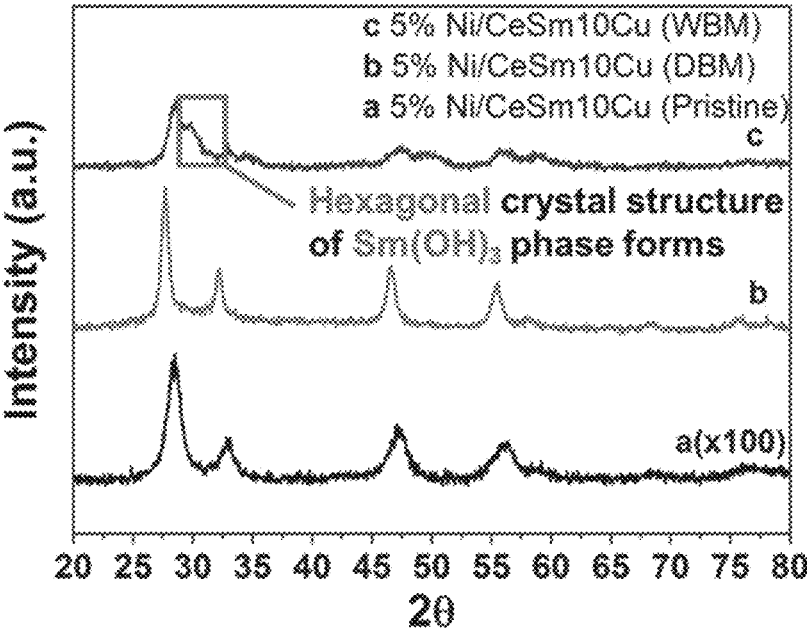
FIG. 16B illustrates powder XRD patterns of Ni supported Ce—Sm-10Cu—O carrier following calcination at 750° C. (a: Pristine; b: DBM: c: WBM), according to some embodiments.

The powder XRD patterns of all the supported Ni catalysts (pristine and ball-milled) following calcination at 750° C. are depicted in FIGS. 16A-B. The XRD patterns shown in FIGS. 16A-B correspond to the supported Ni catalysts using the pristine supports, namely, the ternary metal oxides for the La$^{3+}$(1.1 Å) and Sm$^{3+}$(1.02 Å) dopants, respectively. The diffraction peaks shown at ~28.5°, 33.1°, 47.5° and 56° 2 theta correspond to the reflections from the (111), (200), (220) and (311), respectively, facets of the cubic fluorite structure of CeO$_2$ (JCPDS 34-0394). Incorporation of larger cations (Sm$^{3+}$ and La$^{3+}$) and smaller cations (Cu$^{2+}$), compared to Ce$^{4+}$ leads to a small shift towards smaller diffraction angles when compared to the XRD patterns of Ce—La—O and Ce—Sm—O. Additionally, the absence of characteristic peaks of La$_2O_3$ and Sm$_2O_3$ in the XRD patterns of pristine (FIGS. 16A-B a, black line) and of the dry ball-milled samples (DBM) FIGS. 16A-B b, red line) rather indicates the formation of a homogeneous solid solution (single Ce-based phase), with Sm$^{3+}$ and La$^{3+}$ hetero-valent dopants to have substituted Ce$^{+4}$ cations in the ceria lattice. The latter led to the formation of oxygen vacant sites (O$_v$) and a strained structure. Additionally, hetero-phases of both copper oxide and cerium-copper oxide were not observed in the XRD diffractogram, which coincides with our findings in a previous study of the Ce—La—xCu—O (x=0-20 at. %) mixed metal oxides. It was shown that Cu content up to 10 at. % (present case) was homogenously incorporated in the ceria lattice (single phase), however, this was not the case once the Cu content was increased to 20 at. %. On the other hand, wet ball milling (WBM) led to the formation of a hexagonal crystal structure phase of Sm(OH)$_3$ and La(OH)$_3$, which is consistent to JCPDS 01-083-2036 (hetero-phases). This might be linked to a catalyst with deteriorated properties (e.g., lower oxygen mobility and inaccessibility of lattice oxygen), as will be discussed in the TIIE and Raman spectroscopy sections. The Scherrer equation was used to estimate the crystallite size of CeO$_2$ and/or CeO$_2$-related phase (d$_{CeO2}$) using the most intense peak from the powder XRD diffractogram, as shown in Table 2. The d$_{CeO2}$ in the synthesized catalysts was ranged between 3.7-13.3 nm. The DBM samples exhibited the largest mean crystallites in both the La- and Sm- doped catalysts. This could be attributed to the agglomeration of particles caused by the heat generation under the applied severe ball milling conditions.

EXAMPLE 6

Figure 21A:
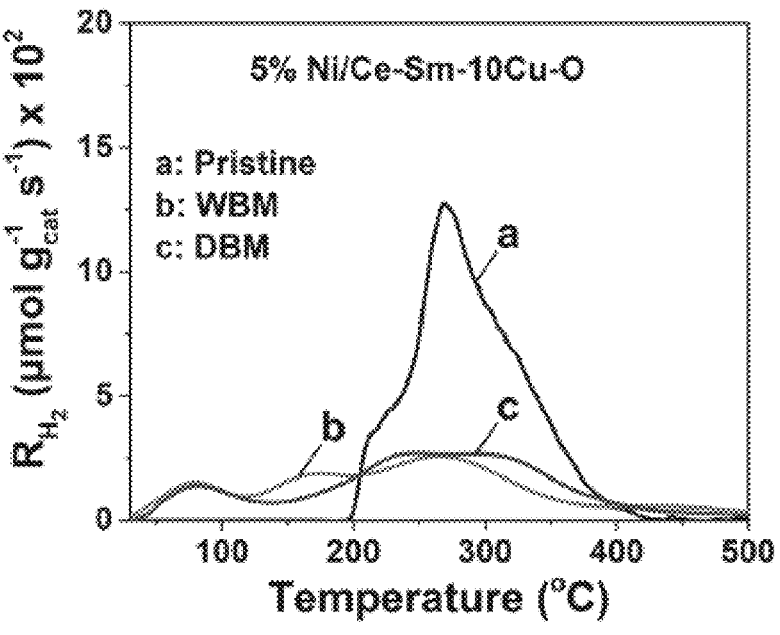
FIG. 21A illustrates $H_2$-TPD traces in terms of hydrogen desorption rate (pmol $g^{-1}_{cat}s^{-1}$) obtained on 5 wt % Ni/Ce—Sm-10Cu—O catalysts: (a) Pristine, (b) WBM and (c) DBM. $F_{He}$=50 NmL min$^{-1}$; β=30° C. min$^{-1}$; $W_{cat}$=0.1 g, according to some embodiments.
Figure 21B:
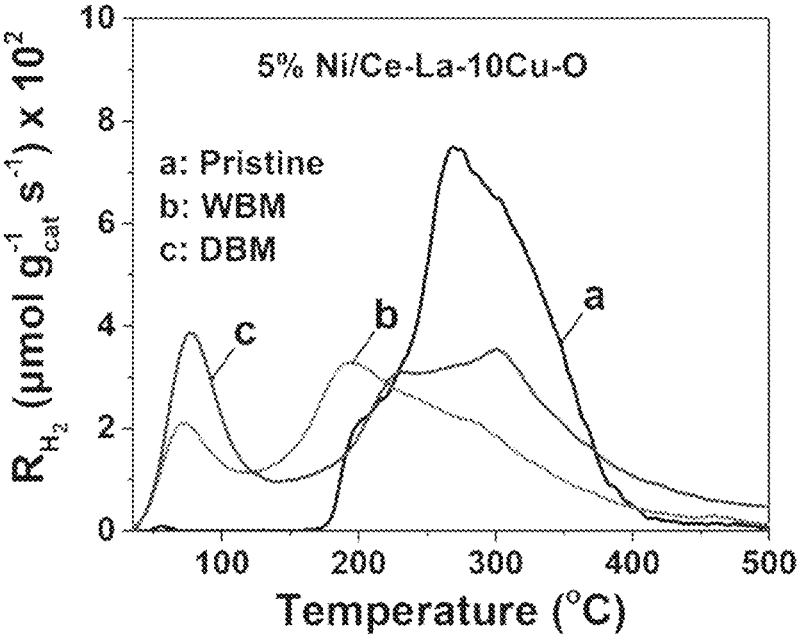
FIG. 21B illustrates $H_2$-TPD traces in terms of hydrogen desorption rate (μmol $g^{-1}_{cat}s^{-1}$) obtained on 5 wt % Ni/Ce—La-10Cu—O catalysts: (a) Pristine, (b) WBM and (c) DBM. $F_{He}$=50 NmL min$^{-1}$; β=30° C. min$^{-1}$; $W_{cat}$=0.1 g, according to some embodiments.

The N$_2$ adsorption-desorption isotherms (BET) of all the calcined supported Ni catalysts are shown in FIG. 21B. All isotherms were of type IV isotherm, with type H3 hysteresis, which reveals a meso-porous structure. The specific surface area (SSA, m²/g) values are summarized in Table 2. The present Ceria-based materials exhibited low surface areas, ca. 3.4-24.6 m²/g. The low surface areas of catalysts could be attributed to the rapid MW synthesis and the calcination followed the synthesis step, and they are in agreement with previous studies. As presumed, the ball-milled support materials exhibited an increase in SSA values. Higher SSA values (11.4 m²/g) were measured in the case of WBM Ce—La-10Cu—O support compared to the DBM one (8.8 m 2 /g). This could be linked to the harsher conditions applied in the case of DBM compared to WBM that resulted in the agglomeration of primary crystallites. However, in the case of Ce—Sm-10Cu—O supports, a different trend in the BET values was observed, namely: pristine (24.6 m²/g)>WBM (15.6 m²/g)>DBM (7.4 m²/g).

Raman spectroscopy provides complimentary structural information with the XRD; the latter is useful probes the formation/alteration of a new metal-oxygen bond environment (e.g. $MO_8$ coordination environment, such as $LaO_8$, $SmO_8$) in the case of doping followed by hetero-phase segregation of the impurity.

Figure 17A:
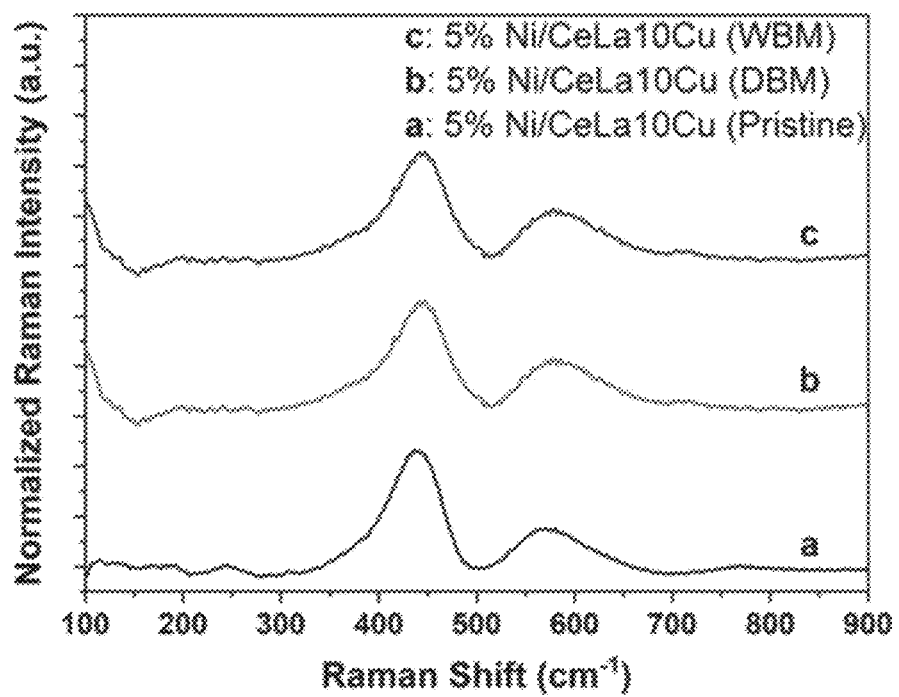
FIG. 17A illustrates Raman spectra recorded on 5% Ni/Ce—La-10% Cu—O catalysts (a: Pristine; b: DBM; and c: WBM), according to some embodiments.
Figure 17B:
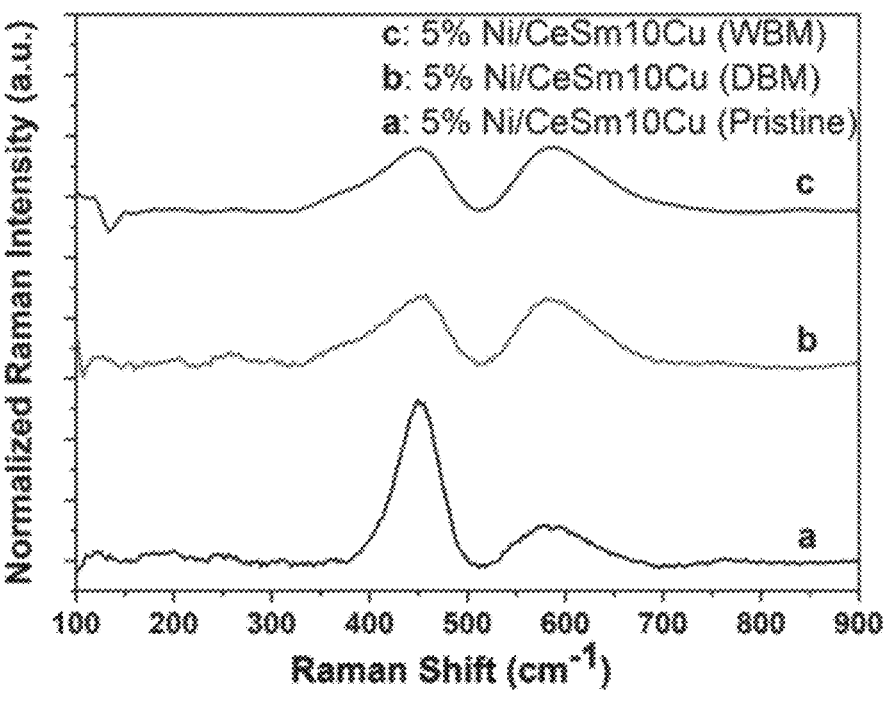
FIG. 17B illustrates Raman spectra recorded on 5% Ni/Ce—Sm-10Cu—O catalysts (a: Pristine; b: DBM; and c: WBM), according to some embodiments.
Figure 18A:
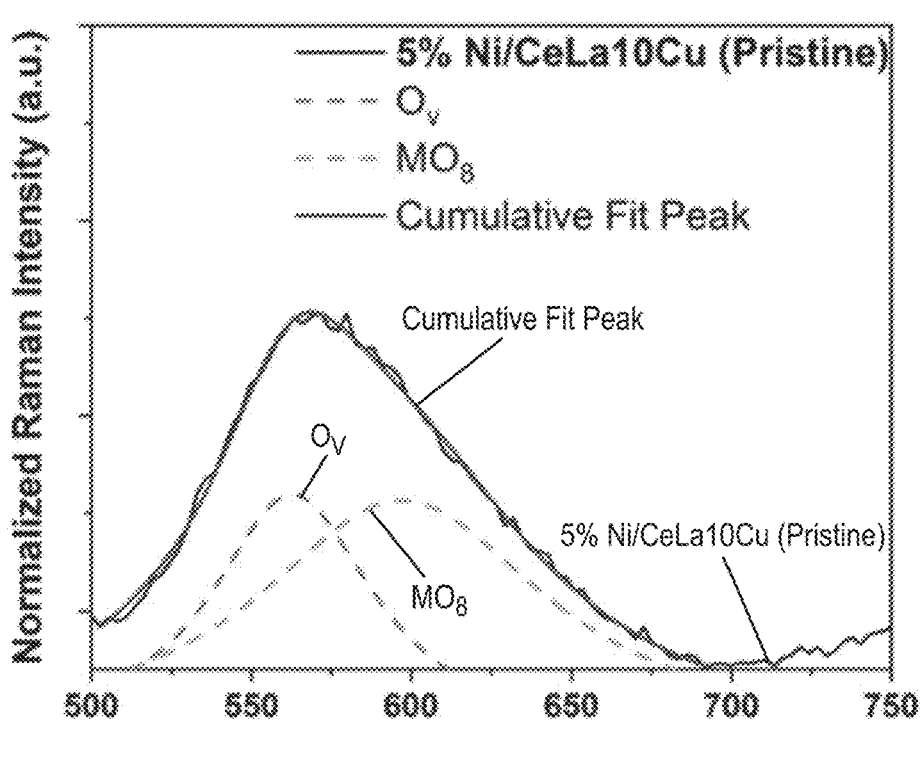
FIG. 18A illustrates deconvolution of Raman spectra in the 500-700 cm$^{-1}$ region for 5% Ni/Ce—La-10% Cu—O (pristine) catalysts, according to some embodiments.
Figure 18B:
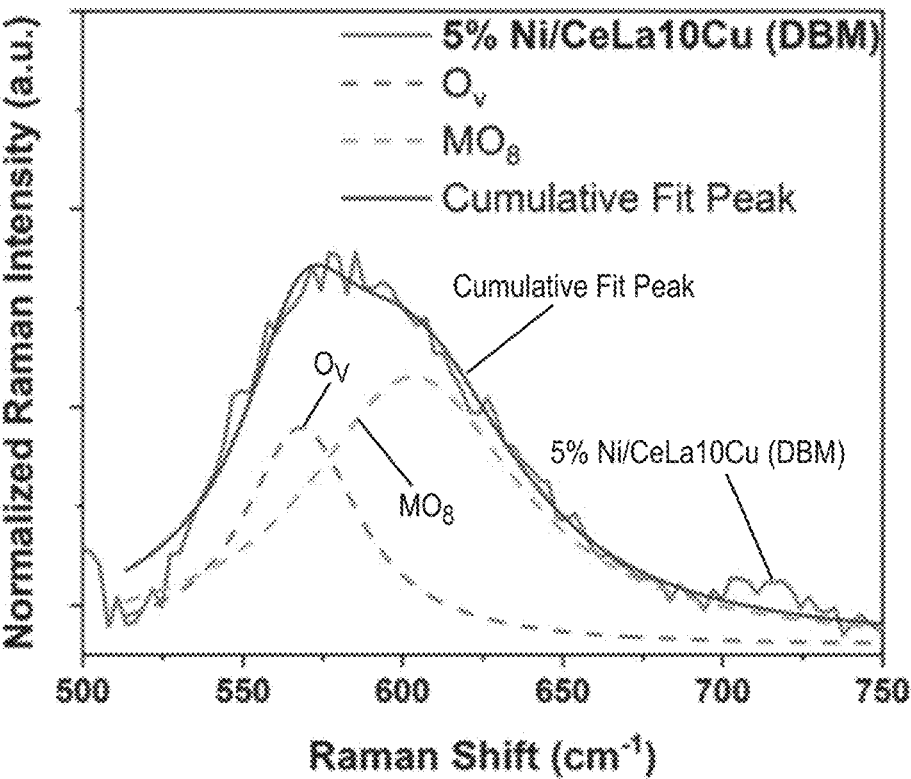
FIG. 18B illustrates deconvolution of Raman spectra in the 500-700 cm$^{-1}$ region for 5% Ni/Ce—La-10% Cu—O (DBM) catalysts, according to some embodiments.
Figure 18C:
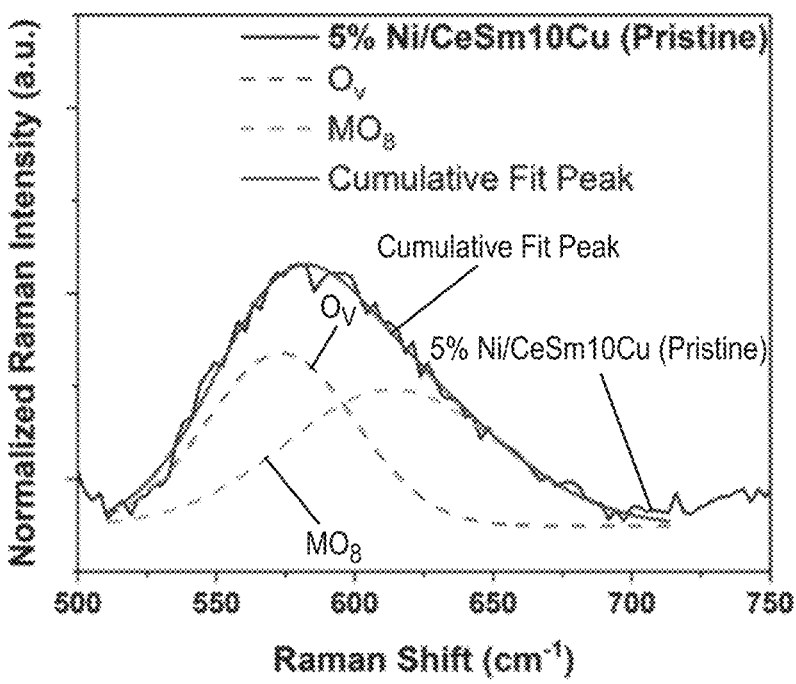
FIG. 18C illustrates deconvolution of Raman spectra in the 500-700 cm$^{-1}$ region for 5% Ni/Ce—Sm-10Cu—O (pristine) catalysts, according to some embodiments.
Figure 18D:
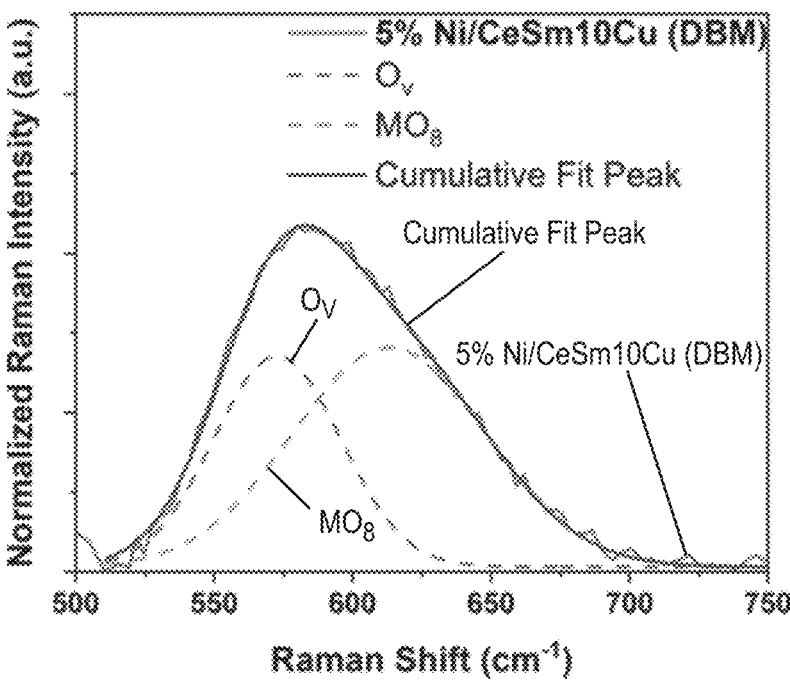
FIG. 18D illustrates deconvolution of Raman spectra in the 500-700 cm$^{-1}$ region for 5% Ni/Ce—Sm-10Cu—O (DBM) catalysts, according to some embodiments.

FIGS. 17A-B show the Raman spectra of the catalytic systems studied herein. The characteristic band at ~464 cm$^{-1}$ can be observed in the Ni/Ce—La-10Cu—O (FIG. 17A) and Ni/Ce—Sm-10Cu—O (FIG. 17B) solids which corresponds to the F-type cubic structure in agreement with the powder XRD results. The band at ~590 cm$^{-1}$, which usually emerges for doped-ceria lattice, can be deconvoluted (FIGS. 18A-D) to get a deeper insight on the defective bands; the latter ones appear at higher and lower wavenumbers than 590 cm$^{-1}$, which represent different types of defects, namely, Ov (coordinately unsaturated site) and hetero-phase impurities ($MO_8$), respectively. After deconvolution, the Raman intensity ratio of $I_{Ov}/I_{F2g}$ was calculated to probe the population of oxygen vacant sites in the ceria-based supports following doping and BM. In general, an increase in the intensity of defective band ($O_v$) is accompanied by a decrease in the intensity of the characteristic $F_{2g}$ band, implying the extensive lattice distortion. Ideally, for the reaction of interest, an increase in oxygen vacant sites ($O_v$) population can contribute to a decrease in carbon formation rates, since $O_v$ sites facilitate gasification of carbonaceous species to be discussed in a later section. Even though the higher the $I_{Ov}/I_{F2g}$ ratio is linked with higher oxygen vacant sites population, it should be taken into account that an increase in the population of oxygen vacancies does not always correspond to an increase in oxygen mobility, so it does not necessarily imply the decrease in carbon formation during DRM. Additionally, any loss in the Ov band indicates an increase of the $MO_8$ vibrational band corresponding to the formation of a hetero-phase. These changes can be observed by monitoring the band areas corresponding to $O_v$ ($A_1$) and $MO_8$ ($A_2$), as shown in FIG. 18A-D. These are a few key points to pay attention when analysing Raman spectra and which provide additional information on the changes that occur in the oxygen sublattice depending on the synthesis parameters and the following sample treatments.

When it comes to the ball milling effect, the $I_{Ov}/I_{F2g}$ ratio increases when the supports were ball-milled compared to the pristine supports; this is an important finding from technological point of view as it provides a window of operation for tuning the nature/concentration of defects in the catalysts' structure. In particular, for the pristine Sm-doped and La-doped support materials, the $I_{Ov}/I_{F2g}$ ratio is 0.133, and 0.184, respectively. Ball milling led to the loss of intensity of $F_{2g}$ band as the M—O bonds environment was disturbed due to the forces exerted. This is apparent in the case of Ni/Ce—Sm-10Cu—O (DBM and WBM) as shown in FIG. 17B, where the $F_{2g}$ band intensity is almost the same with the one of the defective band that forms at ~590 cm$^{-1}$. On the contrary, in the case of La-doped catalysts (FIG. 17B) there was no notable decrease in the intensity of the $F_{2g}$ band of the BM catalysts compared to the pristine one. This shows that the La-doped supported catalyst is more resistant to M—O bond environment changes. It was also found that under DBM, the Sm-doped and the La-doped catalyst had an $I_{Ov}/I_{F2g}$ ratio of 0.58, and 0.24, respectively. Though, it should be recalled that high population of $O_v$ does not necessarily imply an increase of the oxygen mobility since geometry/configuration and coordination environment of the $O_v$ are also critical factors.

A previous study from our group conducted over the pristine Ni/45Ce-45Sm-10Cu—O and Ni/45Ce-45La-10Cu—O catalysts, found that even though Sm-doped catalyst had a higher $I_{Ov}/F_{2g}$ ratio than the La-doped catalyst, the latter performed better in terms of activity and coke deposition during DRM at 750° C. due to its higher oxygen mobility that contributed to a higher gasification rate of carbon to CO(g). The higher oxygen mobility of the La and Cu co-doped ceria supports (Ce—La-xCu (x=3, 5, 7, 10 and 20 at. %) was related to the lower lattice strain mechanism. This can also be attributed to the ordered and unordered vacant site arrangements that exist in the crystal nano-domain of the doped-ceria lattice after examining the microstructure of ceria-doped with trivalent rare-earth metals ($Sm^{+3}$ and $La^{+3}$). Co-doping of ceria lattice results in ordered oxygen vacant sites, which also control the growth of large clusters and hinders the growth of nano-sized domains. Given that $A_1$ and $A_2$ are the band areas of the $O_v$ and $MO_8$ defects, the $A_1/A_2$ ratio found for the Sm-doped catalysts (pristine=0.99, DBM=0.63, WBM=0.87) offers additional information about the effect of mechanochemical treatment on the microstructure of catalysts that cannot be revealed using powder XRD. The decrease in the $A_1/A_2$ ($O_v/MO_8$) ratio implies that ball-milling introduced hetero-phase impurities in both milling environments (dry and wet) due to the presence of hot spots developed under the milling process. Moreover, a ball-milling assisted phase separation due to the forces exerted on the solid cannot be excluded.

EXAMPLE 7

Figure 19A:
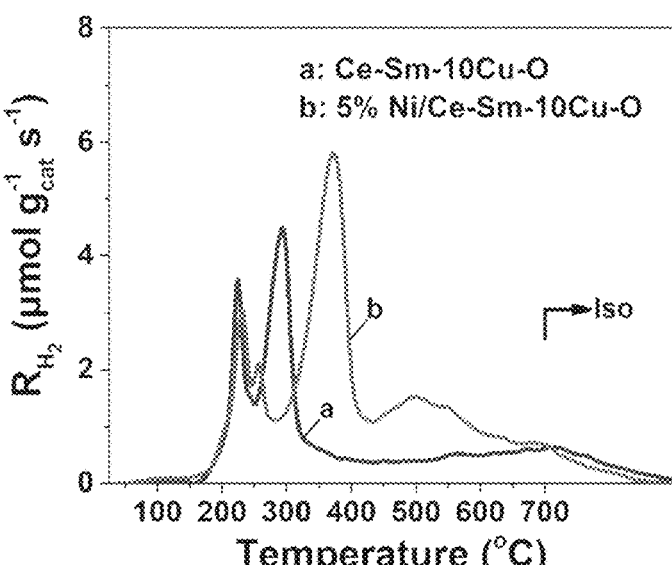
FIG. 19A illustrates $H_2$-TPR traces in terms of hydrogen reduction rate (μmol $g^{-1}_{cat}s^{-1}$) obtained over (a) Ce—Sm-10Cu—O support alone (pristine), and (b) Ni/Ce—Sm-10Cu—O supported catalyst. $F_T$=50 NmL min$^{-1}$ of 5.18 vol % $H_2$/He; β=30° C. min$^{-1}$; $W_{cat}$=0.1 g, according to some embodiments.
Figure 19B:
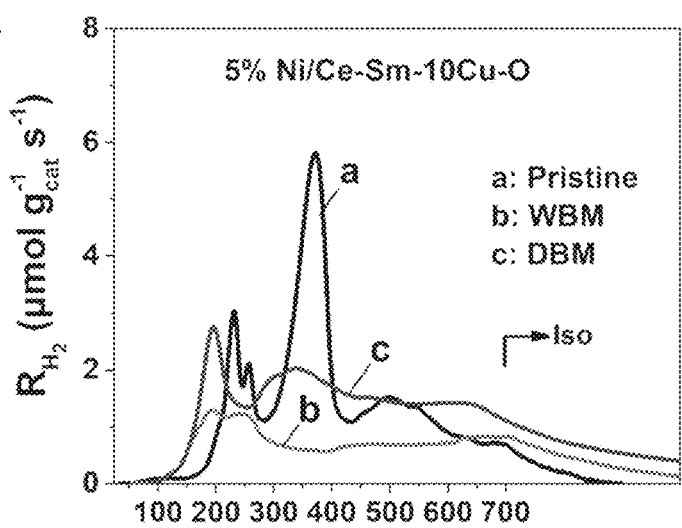
FIG. 19B illustrates $H_2$-TPR traces in terms of hydrogen reduction rate (μmol $g^{-1}_{cat}s^{-1}$) obtained over the 5 wt % Ni/Ce—Sm-10Cu—O catalysts: (a) Pristine, (b) WBM and (c) DBM. $F_T$=50 NmL min$^{-1}$ of 5.18 vol % $H_2$/He; β=30° C. min$^{-1}$; $W_{cat}$=0.1 g, according to some embodiments.

FIG. 19A shows the $H_2$-TPR profiles of the pristine support and the Ni catalysts. FIG. 19B, shows the $H_2$-TPR profiles of Ni catalysts before and after ball-milling treatment (P, DBM, WBM). In the present work, $H_2$-TPR provided vital information about the effect of dopant and ball-milling conditions on the redox behaviour of the catalysts. In brief, the three important temperature regions (i) T<300° C., (ii) 300-450° C. and (iii) T>450° C. correspond to the reduction of oxidized metal species on the surface, sub-surface and bulk, respectively. In particular, as it is well-established in the literature, the following remarks can be made for the above temperature regions: (a) reduction peaks at low temperatures represents the reduction of NiO to Ni° on the surface, (b) medium and high temperature TPR peaks represent the reduction of the support and the Ni metal in the metal-support interface (metal-support interactions), and (c) the possible presence of Ni—Cu bimetallic phase can also be tracked based on the particular peak maximum T appeared in the TPR trace.

EXAMPLE 8

Figure 19C:
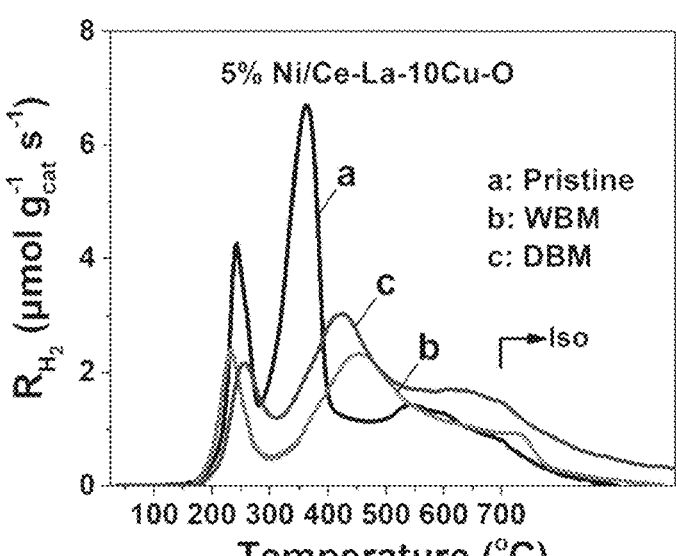
FIG. 19C illustrates $H_2$-TPR traces in terms of hydrogen reduction rate (μmol $g^{-1}_{cat}s^{-1}$) obtained over the 5 wt % Ni/Ce—La-10Cu—O catalysts: (a) Pristine, (b) WBM and (c) DBM. $F_T$=50 NmL min$^{-1}$ of 5.18 vol % $H_2$/He; β=30° C. min$^{-1}$; $W_{cat}$=0.1 g, according to some embodiments.

The as-synthesized (pristine) Ni/Ce—La-10Cu—O and Ni/Ce—Sm-10Cu—O catalysts exhibit three main reduction peaks, namely: a sharp peak at low temperature (La: 150-300° C.) and a doublet peaks (Sm: 150-275° C.), broad peaks in the medium (La: 300-400° C., Sm: 275-420° C.) and high-temperature regions (La: 400-700° C., Sm: 420-700° C.), as shown FIG. 19C and FIG. 19A, respectively. It is worth mentioning that the reduction peaks in the high-temperature region in the Sm-doped pristine catalyst FIG. 19A are shifted to higher temperatures compared to La-doped pristine catalyst. This indicates that La-doped catalyst is more easily reducible than the Sm-doped one in the operating temperature window that DRM usually operates. They showed that La dopant induced the highest amount of moderate CuO species that interacted with the surface oxygen vacancies of the ceria support when compared to the other dopants studied (Y, Nd and Sm). This may be due to lattice distortions and an increase in the concentration of oxygen vacancies formed which was caused by the substitutional incorporation of $Cu^{2+}$ and $La^{+3}$ ions into the ceria lattice, thus leading to more reducible lattice oxygen species.

The $H_2$-TPR pattern of the Ni/Ce—La-10Cu—O (pristine) has three well-defined reduction peaks (190-700° C.) with maxima at ~250, 350, 550° C., respectively. Yang et al. studied the $H_2$-TPR of $Cu_{0.10}Ce_{0.90}O_2$ and ascribed the reduction peaks recorded at 213° C. and 247° C. on the reduction of Cu species on the surface of ceria, which agrees with the reduction peak found in the present Ni/Ce—La-10Cu—O (pristine) catalyst composition. It is also noteworthy to mention that pure CuO is reduced at 330° C. Furthermore, Saw et al. studied $CeO_2$-supported bimetallic Ni—Cu and assigned the reduction peaks recorded at 200° C. and 240° C. to the reduction of highly dispersed nano-sized CuO at the surface of ceria, and of bulk CuO particles, respectively. Reduction peaks at higher temperatures (357° C. and 425-450° C.) were noticed on $10Ni/CeO_2$ catalyst which correspond to the reduction of $Ni^{2+}$ to metallic $Ni^0$ and the reduction of $Ni^{2+}$ that were incorporated into the fluorite ceria lattice (strong Ni—$CeO_2$ interaction). A broad reduction peak at ca. 600° C. in both pristine catalysts (Sm- and La-doped) corresponds to ceria bulk reduction. The latter reduction peak was also observed in the $H_2$-TPR traces of supported Ni catalysts of similar elemental support chemical composition (Ni/Ce—Sm-xCu (x=5, 7, 10 at. %)) and preparation method. It can be concluded, very similar reduction peaks can be noticed in the $H_2$-TPR traces of the La-doped and Sm-doped catalysts, as shown FIG. 19C and FIG. 19A, respectively. Higher temperature reduction peaks (c.a. 500 and 700° C.) correspond to the reduction of surface lattice oxygen and bulk oxygen in the ceria, respectively

EXAMPLE 9

Figures 29A, 29B:
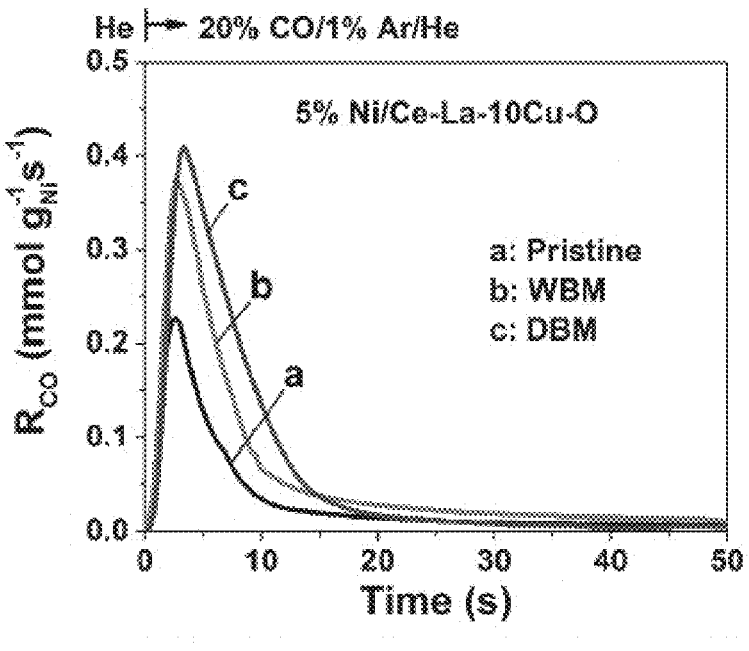
FIG. 29A illustrates dynamic evolution rates (mmol $g^{-1}_{Ni}s^{-1}$) of CO conversion after the step-gas concentration switch He→20 vol % CO/1 vol % Ar/He (t) at 750° C., according to some embodiments.
FIG. 29B illustrates $CO_2$-TPO traces in terms of rate of $CO_2$ formation ($\mu$mol $g^{-1}_{cat}s^{-1}$) after 30 min in 20 vol % CO/He reaction at 750° C. over the 5 wt % Ni/Ce—La-10Cu—O. $W_{cat\ bed}$=0.02 g catalyst+0.03 g SiC; $F_T$=50 mL $min^{-1}$ of 10 vol % $O_2$/He, according to some embodiments.

After ball-milling in both environments (wet and dry ball-milling), the intensity of the low temperature peak in the $H_2$-TPR peaks have decreased and the peaks have shifted towards lower temperatures, as shown in FIG. 19B (curve b and c). Additionally, the TPR profile of the BM samples have changed compared with the pristine catalyst (FIGS. 29A-C). The doublet peak at 220° C. and 250° C. seen in the pristine catalyst have disappeared in the case of DBM and shifted to 200° C. (FIG. 19B, curve c). This indicates alteration of electronic interaction between the metal species and the support. Whereas, in the case of the WBM the doublet peak was maintained but shifted from 220° C.→200° C. and 250° C. However, the intense peak at 360° C. in the pristine catalyst have disappeared (FIG. 19B, curve b). Only a broad peak at T>400° C. is observed. This indicates that DBM enhanced the reducibility of the catalysts while WBM had a counter effect on the catalyst's reducibility; the latter can be attributed to the emergence of phase heterogeneity after WBM (XRD studies).

The amount of $H_2$(g) consumed during the $H_2$-TPR studies was quantified for both the WBM and DBM post synthetic treatments. Amongst all the catalysts studied, the highest amount of $H_2$ consumption was observed in the case of Ni/Ce-Sm-10Cu—O (DBM) catalyst (2.24 mmol O $g^{-1}$). The increased amount of $H_2$ consumption coincides with a small improvement in the rate of $C^{18}O$ (g) formation (232 $\mu molg^{-1}_{cat}s^{-1}$ in DBM vs. 210 $\mu molg^{-1}_{cat}s^{-1}$ in pristine), which is formed by the isotopically labelled lattice ($^{18}O_2$), as shown in $^{18}O_2$ TIIE studies conducted. Whereas, the lowest amount of $H_2$ consumption was observed in the case of Ni/Ce—Sm-10Cu—O (WBM) catalyst (1.55 mmol $g^{-1}$), this was reflected on the rate of $C^{18}O$ (g) formation (176 $\mu molg^{-1}_{cat}s^{-1}$).

Figure 30A:
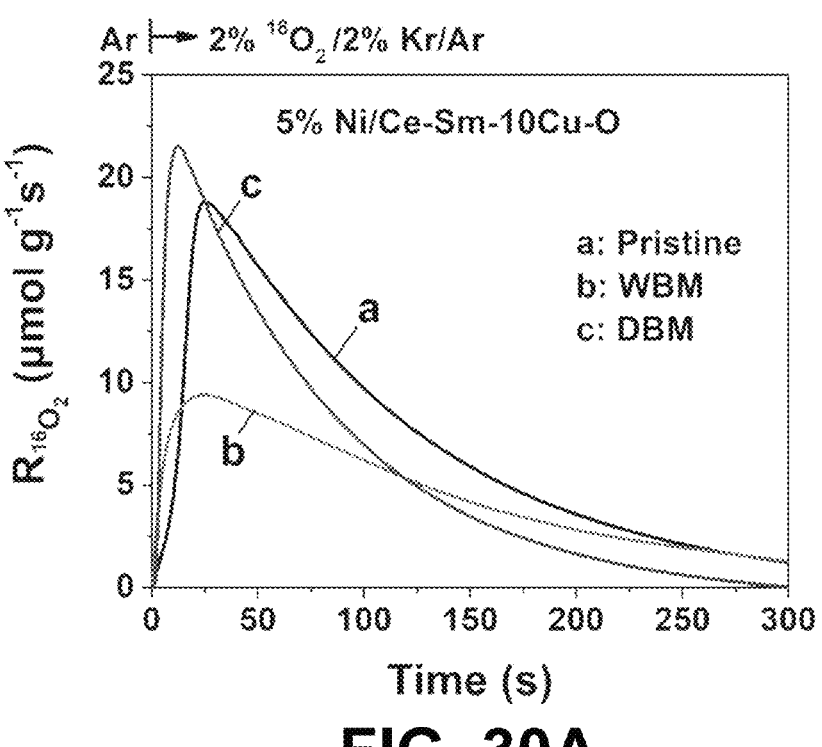
FIG. 30A illustrates transient rates ($\mu$mol $g_{cat}^{-1}s^{-1}$) of $^{16}O_2$ formation obtained during $16O/^{18}O$ oxygen isotopic exchange at 750° C. after the step-gas concentration switch: Ar→2 vol % $^{18}O_2$/2 vol % Kr/Ar (t) over 5 wt % Ni/Ce—Sm-10Cu—O catalysts: (a) Pristine, (b) WBM and (c) DBM. $W_{cat}$=20 mg (diluted with 30 mg SiC); $F_T$=50 NmL $min^{-1}$ of 2 vol % $^{18}O_2$/2% Kr/Ar gas mixture, according to some embodiments.
Figure 30B:
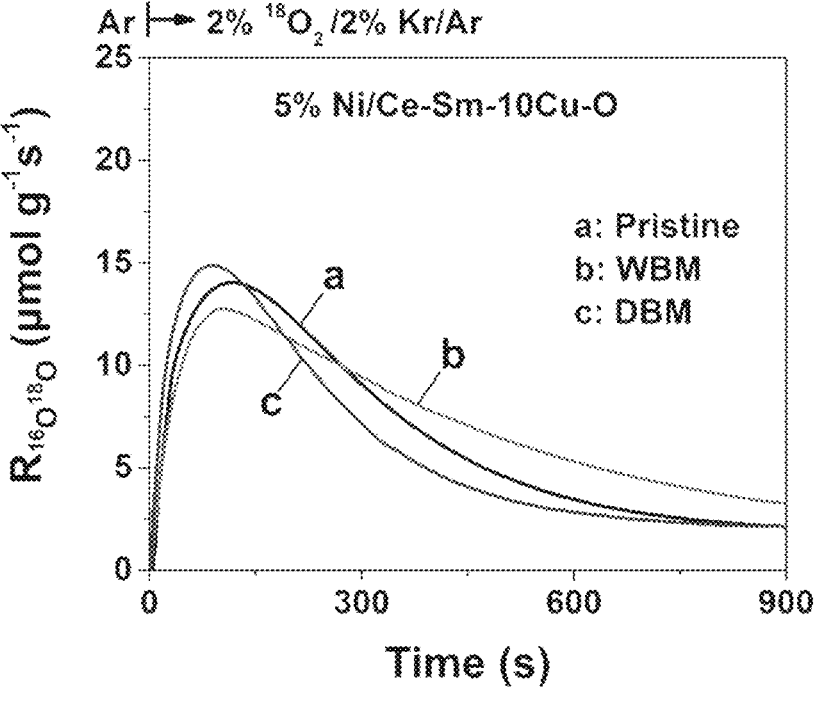
FIG. 30B illustrates transient rates ($\mu$mol $g_{cat}^{-1}s^{-1}$) of $^{16}O^{18}O$ formation obtained during $^{16}O/^{18}O$ oxygen isotopic exchange at 750° C. after the step-gas concentration switch: Ar→2 vol % $^{18}O_2$/2 vol % Kr/Ar (t) over 5 wt % Ni/Ce—Sm-10Cu—O catalysts: (a) Pristine, (b) WBM and (c) DBM. $W_{cat}$=20 mg (diluted with 30 mg SiC); $F_T$=50 NmL $min^{-1}$ of 2 vol % $^{18}O_2$/2% Kr/Ar gas mixture, according to some embodiments.
Figure 31A:
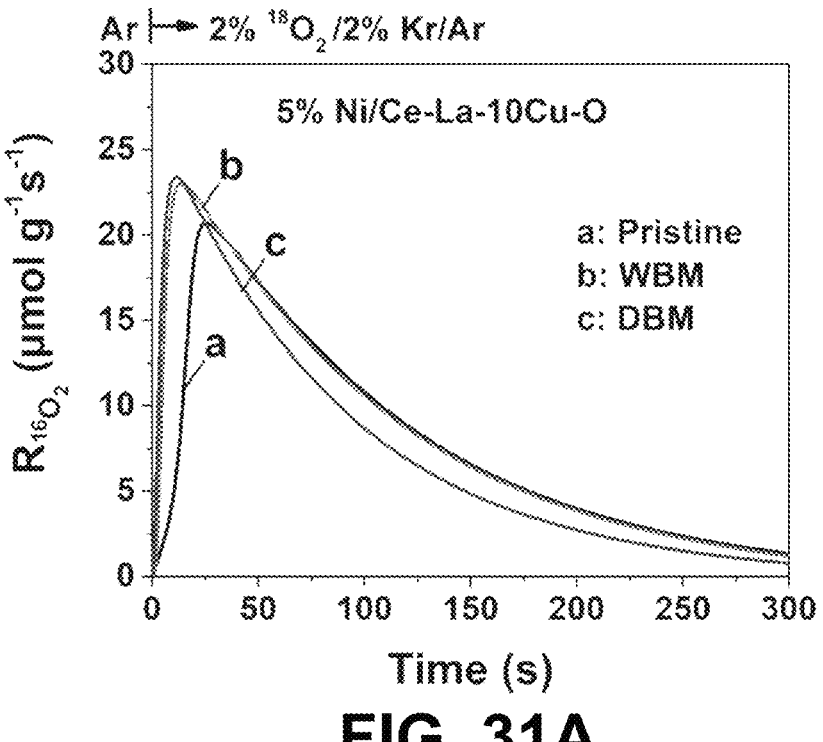
FIG. 31A illustrates transient rates ($\mu$mol $g_{cat}^{-1}s^{-1}$) of $^{16}O_2$ formation obtained during $^{16}O/^{18}O$ oxygen isotopic exchange at 750° C. after the step-gas concentration switch: Ar→2 vol % $^{18}O_2$/2 vol % Kr/Ar (t) over 5 wt % Ni/Ce—La-10Cu—O catalysts: (a) Pristine, (b) WBM and (c) DBM. $W_{cat}$=20 mg (diluted with 30 mg SiC); $F_T$=50 NmL $min^{-1}$ of 2 vol % $^{18}O_2$/2% Kr/Ar gas mixture, according to some embodiments.
Figure 31B:
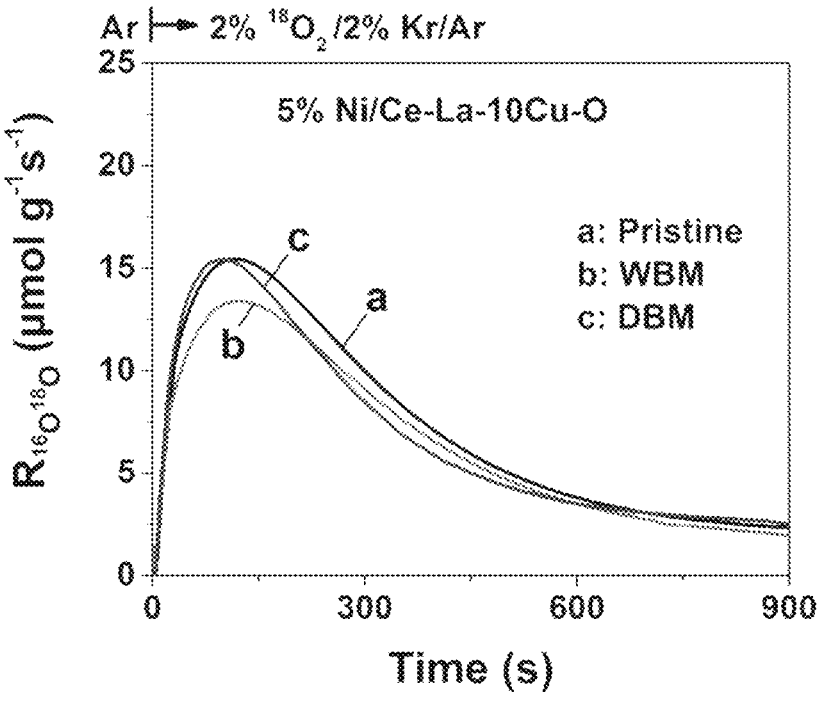
FIG. 31B illustrates transient rates ($\mu$mol $g_{cat}^{-1}s^{-1}$) of $^{16}O^{18}O$ formation obtained during $^{16}O/^{18}O$ oxygen isotopic exchange at 750° C. after the step-gas concentration switch: Ar→2 vol % $^{18}O_2$/2 vol % Kr/Ar (t) over 5 wt % Ni/Ce—La-10Cu—O catalysts: (a) Pristine, (b) WBM and (c) DBM. $W_{cat}$=20 mg (diluted with 30 mg SiC); $F_T$=50 NmL $min^{-1}$ of 2 vol % $^{18}O_2$/2% Kr/Ar gas mixture, according to some embodiments.

However, for the Ni/Ce—Sm—Cu—O catalyst-WBM, most of the $H_2$(g) consumed was at higher temperatures (a broad peak ~495° C.) which indicates the reduction of $MO_x$ species in the bulk of the solid. This explains the deterioration of performance of WBM catalysts during DRM and the large carbon formation as it will be discussed later. In the case of Sm-doped catalysts-DBM, an approximately 21% increase was noticed after DBM (1.85 in pristine vs. 2.24 mmol O $g^{-1}$ in DBM), as mentioned earlier. It is important to notice that most of the $H_2$ consumed was in lower temperatures (surface and subsurface) in the case of Sm-doped catalysts (after DBM) indicating the potential good mobility of lattice oxygen in this temperature range. This was reflected in the higher rate of exchange of $^{18}O$ ($R^{max}$) observed in the DBM catalyst compared to the pristine catalyst, as shown in FIG. 30A. On the other hand, there was a change in the amount of $H_{2(g)}$ consumed in DBM catalysts; namely an increase was noticed in the case of La-doped catalyst (2.14 in pristine vs. 2.24 mmol O $g^{-1}$ in DBM), as shown in Table 10.

TABLE 10

| Total amount of oxygen removed from the solids during $H_2$-TPR. | | | |
|---|---|---|---|
| | Catalyst 5 wt % Ni/Ce—La—10Cu—O | $^{16}O$ Total (mmol $g^{-1}$) | Support alone (mmol $g^{-1}$) |
| La | Pristine | 2.14 | 1.29 |
| | WBM | 1.15 | 0.3 |
| | DBM | 2.24 | 1.39 |

EXAMPLE 10

$CO_2$-TPD is a tool to assess the amount and strength distribution of the basic sites on a solid catalyst surface, through probing the interaction of surface basic sites with the acidic $CO_2$ molecule. In metal oxides, the lattice oxygen acts as Lewis basic site. Studies have shown that doping ceria with larger cations increases the number of oxygen vacancies resulting in an increase of surface basicity. There are three main types of basic sites: (i) weak (W, T<200° C.), (ii) moderate (M, 200° C.<T<450° C.), and (iii) strong (S, T>450). In principle, the temperature at which a maximum in the rate of $CO_2$ desorption occurs is related to the strength between the adsorbed $CO_2$ molecular species and the solid surface. There are three stable possible configurations, namely: (i) monodentate carbonate, (ii) bidentate carbonate, and (iii) linear adsorbed carbon dioxide species. In the first two configurations, the $CO_2$ bent structure is favoured, leading to a chemical bond between the carbon atom of the $CO_2$ molecule and the oxygen of the surface of ceria. Consequently, higher $CO_2$ desorption temperature is required to break the chemical bonding. However, in the latter configuration, a weaker interaction is formed between the surface and the $CO_2$ species, thus decreasing the desorption temperature.

The $CO_2$-TPD of Ni/Ce—La-10Cu—O (pristine) catalyst (FIG. 20A), two intense peaks are observed at 100° C. and 210° C., followed by shoulder peak at 318° C. and small broad peak 375-600° C. BM has largely affected the strength distribution of surface basic sites. For the La-doped supported Ni, FIG. 20B, the following remarks can be offered: (a) after ball-milling, the $CO_2$-TPD peaks appeared with higher intensity compared to the ones of the pristine sample, in the low- and medium-temperature regime; this result indicates a drop in the basicity in those regions; (b) DBM over the La-doped supported Ni catalyst resulted in a shift in the desorption temperatures related with the W (ca. 100° C.→63° C.), M (ca. 210° C.→174° C.), M (ca. 319° C.→309° C.) and S (ca. 520° C.→455° C.) basic sites towards higher temperatures; (c) following WBM, a notable peak shift was observed towards lower temperature regime compared to the peaks of the DBM and pristine catalysts, namely, W (100° C.→70° C.), M (210° C.→146° C.), and M (520° C.→263° C.). It is noteworthy to mention, that the WBM catalyst did not have strong basic sites, as shown in FIG. 20B The total basicity of the catalysts is reduced after BM, 13.3 µmol $g^{-1}_{cat}$→11.2 µmol $g^{-1}_{cat}$ and 13.3 µmol $g^{-1}_{cat}$→7.5 µmol $g^{-1}_{cat}$ in the case of DBM and WBM, respectively.

Figure 20A:
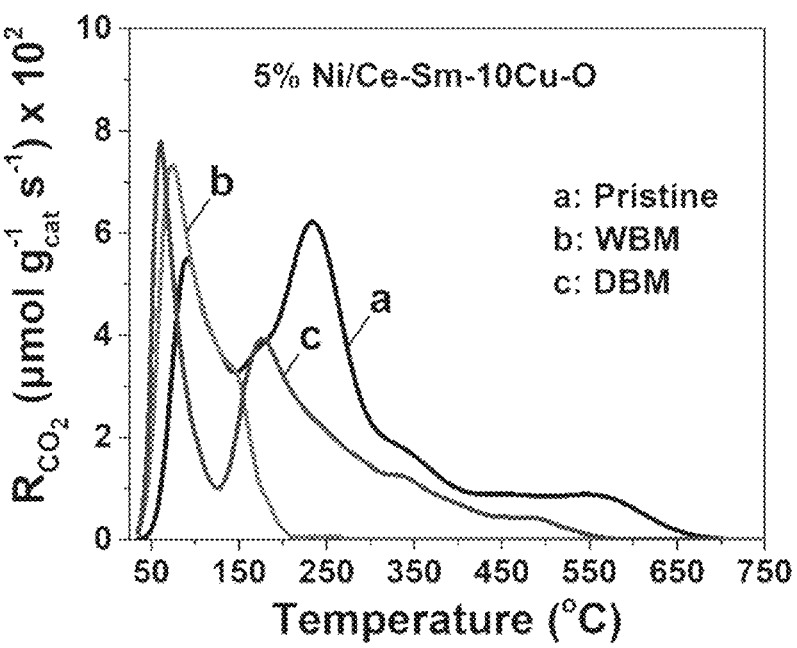
FIG. 20A illustrates $CO_2$-TPD traces in terms of desorption rate (μmol $g^{-1}_{cat}s^{-1}$) obtained over 5 wt % Ni/Ce—Sm-10Cu—O catalysts: (a) Pristine, (b) WBM, and (c) DBM. $F_{He}$=30 NmL min$^{-1}$, β=30° C. min$^{-1}$, $W_{cat}$=0.1 g, according to some embodiments.
Figure 20B:
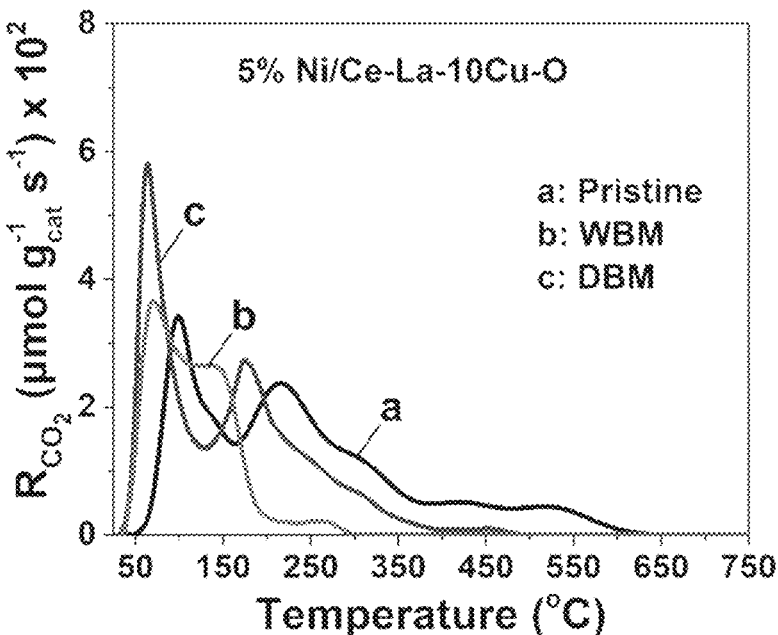
FIG. 20B illustrates $CO_2$-TPD traces in terms of desorption rate (μmol $g^{-1}_{cat}s^{-1}$) obtained over 5 wt % Ni/Ce—La-10Cu—O catalysts: (a) Pristine, (b) WBM, and (c) DBM. $F_{He}$=30 NmL min$^{-1}$, β=30° C. min$^{-1}$, $W_{cat}$=0.1 g, according to some embodiments.

FIG. 20A (curve a), shows the $CO_2$-TPD profile of the Ni/Ce—Sm-10Cu—O (pristine) catalyst which shows two main peaks at 92° C. and 234° C. followed by a shoulder peak on the high-T side. In the case of Sm-doped supported Ni catalysts, WBM resulted in an increase of the intensity of the $CO_2$-TPD peaks in the weak-temperature regime (76° C.). Additionally, the $CO_2$-TPD profile of the WBM catalyst (FIG. 20A, curve b) has changed compared to the $CO_2$-TPD profile profiles of the pristine (FIG. 20A, curve a) and DBM (FIG. 20A, curve c) catalysts. Similar to the previously discussed (La-doped catalysts), DBM decreased the total surface basicity (18 µmol/g) compared to the pristine sample (27.9 µmol/g), as shown in Table 4, whereas an increase in the population of weak basic sites was observed since the desorption $CO_2$ peaks shifted towards lower temperatures after DBM (92° C.→60° C., 234° C.→182° C.). Following WBM treatment, an even more significant decrease in the total surface basicity was observed (11.3 µmol/g), accompanied by a peak shift towards lower temperatures, and the disappearance moderate and strong basic sites. The DBM resulted in more weak basic sites compared to the pristine, this enhanced the oxygen mobility rates because the strength of the basic sites depends on the binding strength between oxygen anions and metal cations.

The surface area of the catalysts presented earlier in this section was used to calculate the density of basic sites on the surface. It was noticed that DBM increased drastically the amount of basic site per unit area, by almost two folds (1.13

µmol/$m^2$→2.43 µmol/$m^2$). Whereas, WBM decreased the total density of basic sites by 36% (1.13 µmol/$m^2$→0.724 µmol/$m^2$). The higher density of basic sites resulted in the enhancement of coke resistance during DRM conditions, as discussed in a later section.

EXAMPLE 11

FIG. 21A shows $H_2$-TPD traces (in terms of $H_2$ desorption) of the Sm-doped ceria supported Ni following WBM (curve b) and DBM (curve c) of the carriers before Ni deposition. The $H_2$-TPD of the profile of the pristine catalyst showed an intense peak at 278° C. and a shoulder peak at low-T (230° C.), as shown in FIG. 21A (curve a). After BM the intensity of the peak is decreased and the emergence of peaks at lower temperatures. In the case of WBM, peaks at 80° C. and 163° C. emerged FIG. 21A (curve b). Whereas, only a peak at 80° C. appeared after DBM. The peaks at lower temperatures (T<100° C.) represents the $H_2$ desorbed from the $O_{vac}$ sites on the surface of $CeO_{2-\delta}$. This indicates that BM increases $O_{vac}$ sites on the surface of the Ce—Sm-10Cu—O support. While, the peaks at 100-250° C. are correlated to $H_2$ desorbed on the surface of metal species. The peak at 163° C. represents $H_2$ desorbed from highly dispersed metal species. Whereas, the peak at 278° C. is correlated to $H_2$ desorbed on isolated metal clusters.

Based on the amount of desorbed hydrogen, and assuming H/$Ni_s$=1:1, a Ni dispersion of 16.7% and 6.4%, respectively, was measured for the 5 wt % Ni/Ce—La-10Cu—O following the DBM and WBM. A mean Ni particle size ($d_{Ni}$, nm) of ~22.5 and 18.6 nm was estimated, respectively. In the case of Sm-doped catalysts, a Ni dispersion of 3.1% and 2.9%, was estimated for the DBM and WBM catalysts, respectively. A mean Ni particle size of 33.0 nm and 31.5 nm was estimated for the Sm-doped supported Ni after DBM and WBM, respectively, as shown Table 2. Although, the mean Ni particle size of the BM catalysts estimated via $H_2$-TPD is greater than the mean Ni particle size of the pristine catalyst ($d_{Ni}$=17 nm). The peaks at lower temperatures (T<100° C.) represents the $H_2$ desorbed from the Ovac sites on the surface of $CeO_{2-\delta}$. This indicates that BM increases $O_{vac}$ sites on the surface of the Ce—Sm-10Cu—O support. While, the peaks at 100-250° C. are correlated to $H_2$ desorbed on the surface of metal species. The peak at 163° C. represents $H_2$ desorbed from highly dispersed metal species. Whereas, the peak at 278° C. is correlated to $H_2$ desorbed on isolated metal clusters.

In the case of pristine catalysts, a Ni dispersion of 5.9%, respectively, was measured for the 5 wt % Ni/Ce—Sm-10Cu—O catalytic systems. A mean Ni particle size ($d_{Ni}$, nm) of 17 nm, was estimated. These results corroborate for a substantial Ni particle size reduction following ball-milling treatment. This can be understood on the basis of formation of defects, and dangling bonds on the supports upon their milling; this new surface entities play the role of anchoring sites for Ni contributing to its higher dispersion. The fact that the shape and position of the peaks in the $H_2$-TPD profiles of the pristine catalysts (FIG. 21A and FIG. 21B) is the same, suggests that the support chemical composition did not practically influence the electronic structure of Ni surface sites but most likely those at the Ni-support interface, as this is evident by the shoulder appeared at the low-T side of the desorption peak. On the contrary, the ball-milling process has a different effect on the electronic structure of the Ni sites, as the shape of the profiles differ for the La- and Sm-doped ceria supported Ni catalysts following DBM and WBM. In both cases of post-synthetic treatment, DBM and WBM, the Ni dispersion has increased significantly, especially in the case of DBM, which is linked with more severe conditions of milling. After comparing the $H_2$-TPD traces of both catalysts, it appears that NiCu alloy particles identified by HR-TEM in the Ni/Ce—La-10Cu—O system are either of low number density compared to Ni, or they possess similar $H_2$ desorption characteristics. NiCu alloy formation was also observed on the HR-TEM of Ni/Ce—Sm-10Cu—O system. Hence, the same conclusion can be surmised.

Figure 22A:
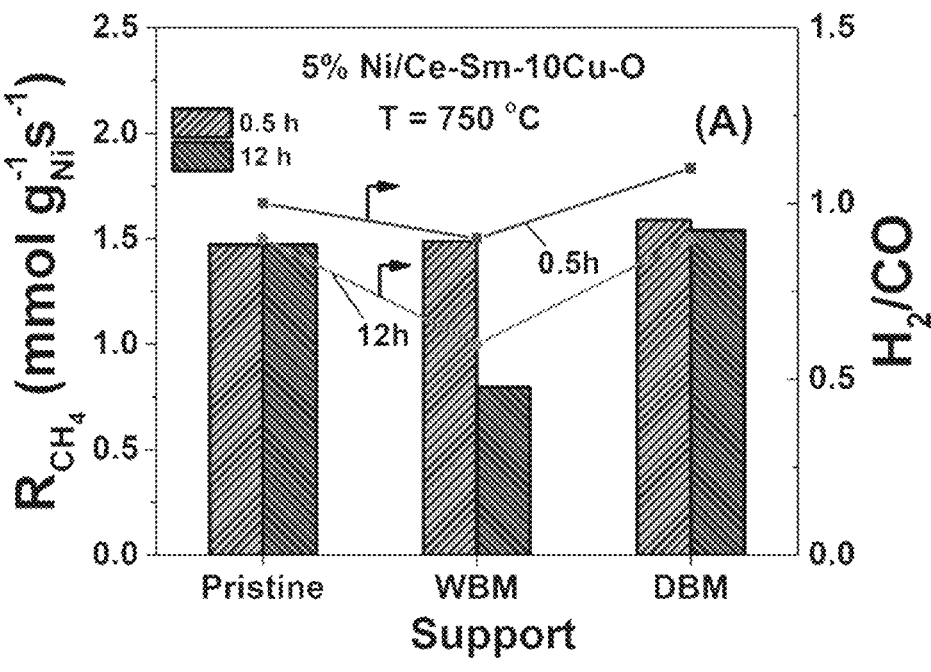
FIG. 22A illustrates integral rate of $CH_4$ conversion (mmol $g^{-1}_{Ni}s^{-1}$) and $H_2/CO$ gas product ratio obtained after 0.5 h and 12 h of DRM (20 vol % $CH_4$/20% $CO_2$/He) at 750° C. over 5 wt % Ni/Ce—Sm-10Cu—O catalysts as a function of support pre-treatment (Pristine, WBM and DBM), according to some embodiments.
Figure 22B:
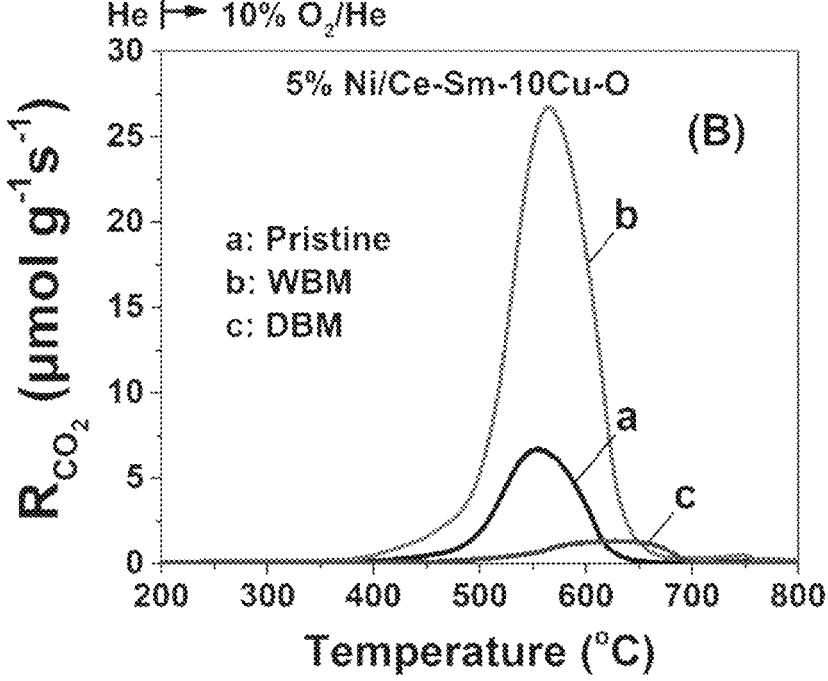
FIG. 22B illustrates transient response curves of $CO_2$ formation rate (μmol $g^{-1}_{Ni}s^{-1}$) obtained during TPO of carbon formed after 12 h of DRM (20 vol % $CH_4$/20vol % $CO_2$/He) at 750° C. over 5 wt % Ni/Ce—Sm-10Cu—O catalysts: (a) Pristine, (b) WBM, and (c) DBM, according to some embodiments.

The catalytic performance of the Ni-based catalysts towards DRM using a feed gas stream of 20% $CO_2$/20% $CH_4$/He for 0.5 h and 12 h (GHSV=30,000 $h^{-1}$) at 750° C. is summarized in 5 and FIG. 22A for Sm-doped catalysts. Whereas, the catalytic results La-doped catalyst, performed at the same conditions, are presented in Table 4 and FIG. 23A. Specifically, the integral rate of CH4 conversion (mmol $g^{-1}_{Ni\ s}$-1) and $H_2$/CO gas product ratio obtained after 0.5 h and 12 h of DRM (20 vol % CH4/20% CO2/He) at 750° C. over 5 wt % Ni/Ce-Sm-10Cu-O catalysts as a function of support pre-treatment (Pristine, WBM and DBM) are presented. FIG. 22B, shows the transient response curves of $CO_2$ formation rate (µmol $g^{31\ 1}_{Ni\ S-1}$) obtained during TPO of carbon formed after 12 h of DRM (20 vol % CH4/20 vol % $CO_2$/He) at 750° C. over 5 wt % Ni/Ce-Sm-10Cu-O catalysts: (a) Pristine, (b) WBM, and (c) DBM. In the case of Sm-doped catalysts, the DBM catalyst exhibited the lowest $CO_2$ formation rate (1.32 µmol $g^{-1}_{Ni}s^{-1}$), while, the WBM resulted in a significant increase in the $CO_2$ formation rate (26.8 µmol $g^{-1}_{Ni}s^{-1}$). All the catalysts exhibited high reactant conversions (>80%) and no deactivation after 12 h of DRM, except for the Ni/Ce—Sm-10Cu—O (WBM) catalyst, which showed a drastic drop in the $CH_4$ conversion ($X_{CH4}$, %) and $CO_2$ conversion ($X_{CO2}$, %) on DRM gas stream. The deterioration of the catalyst's performance is attributed to the formation of large amounts of carbon measured (80.4 mg C $g_{cat}^{-1}$) on the surface of the catalyst, as shown in Table 5. The catalyst' deactivation is likely linked to the formation of a hetero-phase (XRD findings), and the decrease in its reducibility (TPR findings) after WBM. Apart from the conversion, the $H_2$/CO gas product ratio determination allows to examine the presence of side reactions. The main side reactions reported are the RWGS ($CO_2$+$H_2$⇆CO+$H_2O$) and the methanation reaction (CO+3$H_2$⇆$CH_4$+$H_2O$), the former increasing the $X_{CO2}$ (%) and reducing the $H_2$/CO gas ratio, while the latter decreases the $X_{CH4}$ (%) and reduces the $H_2$/CO gas product ratio. It is worth recalling that syngas with a $H_2$/CO gas ratio close to unity is best suited for Fisher-Tropsch process.

The experimentally measured $CO_2$ conversion values for Ni/Ce—Sm-10Cu (pristine) was close to equilibrium values of DRM/RWGS reaction network. In our previous work, it was found that the decrease of carbon deposition in the La-doped (pristine) supported Ni catalyst compared to the Sm-doped catalyst (pristine) was due to the continuous carbon oxidation (or gasification) to CO by labile lattice oxygen, where $CO_2$ reoxidizes the reduced ceria-based support. Additionally, RWGS explains the drop in the $H_2$/CO gas ratio, the increase of $X_{CO2}$, and the drop in the $H_2$-yield after 12 h TOS, as shown in Table 5. In the case of DBM, the $X_{CO2}$ (84.4%) and $X_{CH4}$ (84.3%) after 12 h DRM were quite close to the equilibrium values ($X_{CO2}$=86.6% and $X_{CH4}$=86.6) and the H2/CO ratio was close to unity (0.9). This indicates that there is almost no competing side reactions are taking place with DRM. However, the $H_2$ yield decreased (58.2%→44.5%) compared to the Ni/Ce—Sm-10Cu (pristine) catalyst. Furthermore, DBM was found to reduce the amount of carbon formation by almost 4.4 folds, as shown in Table. This can be correlated to the highly dispersed Ni on the surface of the Ce—Sm-10Cu—O (DBM) support as concluded from the $H_2$-TPD profiles (FIG. 21A). In the case of Ni/Ce—Sm-10Cu—O (WBM) catalyst, the conversions of $CH_4$ and $CO_2$, and the $H_2$/CO gas product ratio were lower than both the equilibrium values for DRM only and DRM/RWGS reaction network. After increasing the TOS to 12 h, the values of $X_{CH4}$, $X_{CO2}$, $H_2$ yield, and $H_2$/CO were further lowered by 40.5%, 30.2%, 61.1% and 33.3%, respectively, as a result of the carbon formation, which was drastically increased in the WBM Sm-doped supported Ni catalyst (catalyst deactivation). This corroborates for the presence of side reactions taking place.

On the other hand, in the case of Ni/Ce—La-10Cu—O (WBM) catalyst, there was only a very small drop in the $X_{CH4}$ (%) and $X_{CO2}$ (%) when the TOS was increased from 0.5 h to 12 h. However, the $H_2$-yield dropped by 18.6% (71.7%→57.9%), as shown in Table 12, yet there was a large amount of carbon formation; only 12.1% less than the carbon quantified on the Sm-doped (WBM) counterpart catalyst.

TABLE 12

Conversions of $CH_4$ and $CO_2$, $H_2$-yield (%), and $H_2$/CO gas product ratio after DRM at 750° C. (20% $CO_2$/20% $CH_4$/He) for 0.5 h and 12 h over the 5 wt % Ni supported on Ce—La—10Cu—O carriers (Pristine, WBM and DBM). The amount of carbon accumulated (mg C $g^{-1}_{cat}$) after 12 h of DRM is also presented.

| Catalyst 5 wt % Ni/Ce—La—10Cu—O | Time (h) | $X_{CH4}$ (%) | $X_{CO2}$ (%) | $H_2$-yield (%) | $H_2$/CO | mg C $g_{cat}^{-1}$ |
|---|---|---|---|---|---|---|
| Pristine | 0.5 | 80.3 | 76.4 | 55.3 | 1.05 | — |
|  | 12 | 80.8 | 81.4 | 42.7 | 0.8 | 1.5 |
| WBM | 0.5 | 91.5 | 93.5 | 71.7 | 1.1 | — |
|  | 12 | 88.7 | 91.7 | 57.9 | 1 | 70.7 |
| DBM | 0.5 | 86.8 | 86.1 | 53.33 | 1.1 | — |
|  | 12 | 85.1 | 85.2 | 53.9 | 1.1 | 7.7 |

Looking at catalytic performance of the case of Ni/Ce—La-10Cu—O (DBM) catalyst, the $X_{CO2}$ (85.2%) and $X_{CH4}$ (85.1%) conversion rates are almost equivalent and close to the equilibrium conversions (86.6%) for DRM only. While, the $H_2$/CO is 1.1 is slightly higher than the equilibrium value calculated ($H_2$/CO=1). This indicates the yield of CO is lightly higher than $H_2$ yield, this might be correlated to the increase in oxygen vacant sites as observed in the $H_2$-TPD (FIG. 21B (curve c)), which showed an emergence of a temperature peak at lower temperatures (T<100° C.). This promoted the gasification of carbon to CO. However, the rate of formation of carbon is higher than the rate of carbon gasification. As a result, DBM increased the carbon formed during DRM (1.5 mg C $g^{-1}_{cat}$→7.7 mg C $g^{-1}_{cat}$) compared to Ni/Ce—La-10Cu—O (pristine) catalyst, as shown in Table 12. The increase in oxygen vacant sites does not necessarily result in coke inhibition because it depends on several other factors like the oxygen mobility which slightly decreased after BM. Ball milling (either WBM or DBM) may increase the oxygen vacant sites by more than about 5%.

EXAMPLE 12

Figure 24:
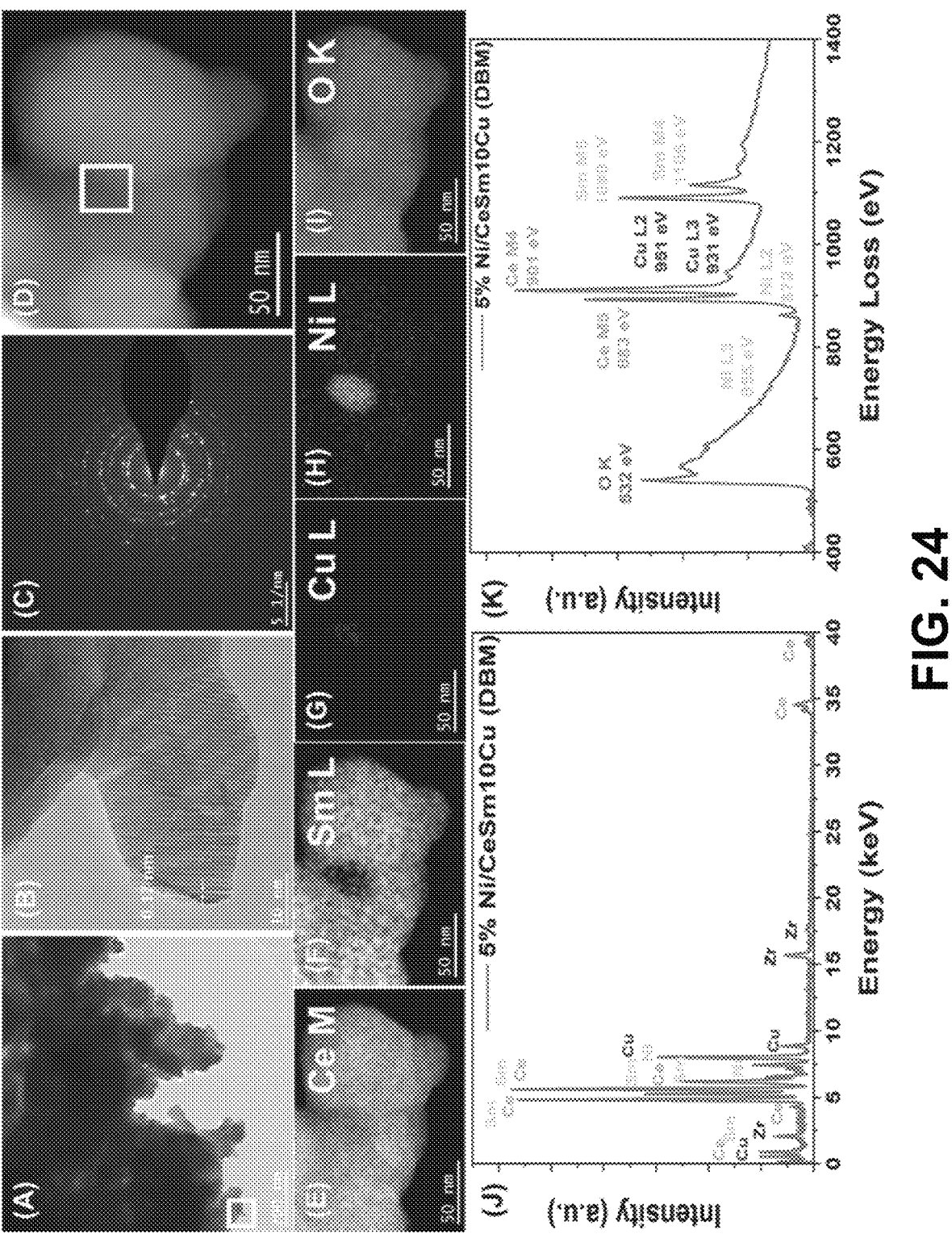
FIG. 24 illustrates (A) Low-magnification and (B) High-magnification HRTEM image of fresh 5 wt % Ni/Ce—Sm-10Cu—O (DBM) catalyst, where lattice fringes with d-spacing of 0.17 nm are observed. (C) Selected Area Electron Diffraction (SAED) pattern, (D) HAADF-STEM micrograph, (E-I) EELS elemental maps of cerium (Ce), samarium (Sm), copper (Cu), nickel (Ni), and oxygen (O), respectively, (J) EDX spectrum. (K) EELS spectrum indicating the white edges of Ni, Cu, Ce, Sm, and O, according to some embodiments.
Figure 25:
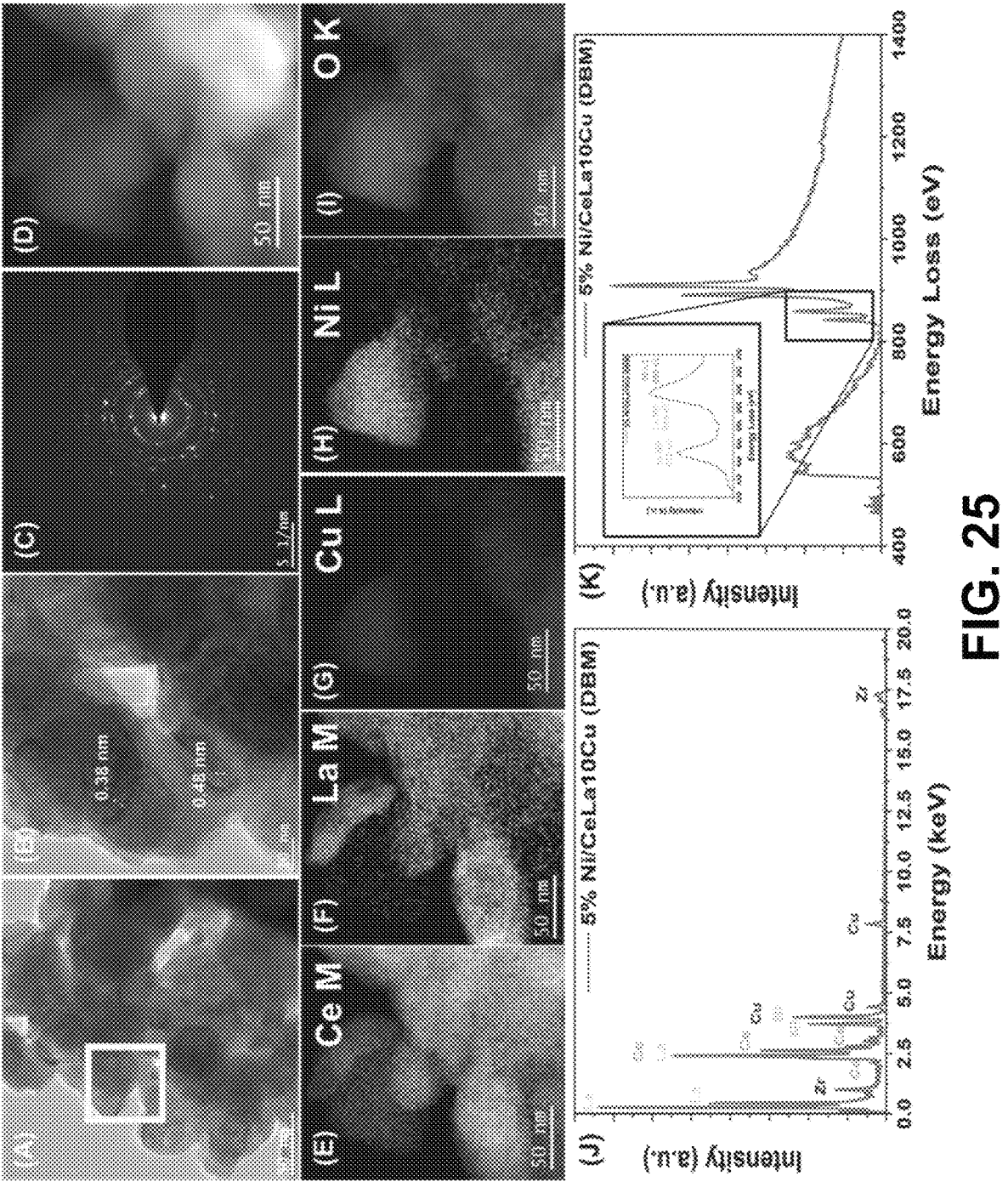
FIG. 25 illustrates (A) Low-magnification HRTEM image, and (B) High-magnification HRTEM image of fresh 5 wt % Ni/Ce—La-10Cu—O (DBM) catalyst, where lattice fringes with d-spacings of 0.38 and 0.48 nm are observed. (C) Selected Area Electron Diffraction (SAED) pattern, (D) HAADF-STEM micrograph, (E-I) EELS elemental maps of cerium (Ce), Lanthanum (La), copper (Cu), nickel (Ni), and oxygen (O), respectively, (J) EDX spectrum. (K) EELS spectrum indicating the white edges of Ni, Cu, Ce and La (the inset shows the EELS spectra of Ni and La), according to some embodiments.

The FFT patterns of HAADF-STEM images (SAED patterns) of Ni/Ce-Sm-10Cu—O (DBM) catalysts are depicted in FIG. 24. It can be inferred that the Ni/Ce—Sm- 10Cu—O (DBM) catalyst is polycrystalline with interplanar d-spacings of 0.31 nm which correspond to $CeO_2$ (111) and (220) crystal facets, respectively [56]. The Ni/Ce—Sm-10Cu—O (DBM) catalyst showed similar elemental distribution as the Ni/Ce—La-10Cu—O (DBM) one (FIG. 25); the profiles are illustrated in the EELS elemental maps of cerium (Ce), samarium (Sm), copper (Cu), nickel (Ni) and oxygen (O) shown in FIG. 24. It is suggested that the pre-treatment conditions (high temperature and reducing environment, 10% $H_2$/Ar at 750° C.) contributed to the exsolution of Cu atoms to the surface, where this phenomenon has been reported in detail in the case of perovskite-type materials. The high temperatures led to the increase of Ni—Cu interdiffusion rates. Naghash et al. used XPS and Auger spectroscopy techniques to study Ni—Cu interactions in a Ni—Cu alloy and the subsequent enrichment of the surface with Cu, which was observed at high temperatures (T>700° C.). Other have reported the formation of homogenous Ni—Cu bimetallic with low segregation (only 13% segregated with Ni-rich surface) under a reducing gas atmosphere (20% $H_2$/$N_2$ at 300° C.). This is attributed to the lower Tamman temperatures of Cu (405° C.) and CuO (586° C.) compared to Ni (590° C.) and NiO (841° C.), which leads to faster diffusion of Cu species Tamman temperatures is a key factor in Ni—Cu alloying as it shows the reactivity and mobility of atoms in the bulk of a solid, as well as the rapid reduction of Cu precursors compared to Ni precursors and the formation of Cu crystals. It is noteworthy that Ni—Cu alloying regions were observed in Ni/Ce—Sm-10Cu—O DBM catalyst with the simultaneous presence of monometallic Ni and Cu areas. The EDX spectrum of both catalysts showed traces of zirconium, which is a contamination during the post-synthesis treatment (DBM) using zirconium balls and container, as depicted in FIG. 24 and FIG. 25.

EELS can provide information about the microstructure of the catalysts and their chemical environments (oxidation states) since it is equipped with high spatial (sub-Angstrom) and energy resolution (sub-eV). Typically, the EEL spectra are fitted using the multiple-linear-least squares (MLLS) method, which accurately detects unknown spectra by using linear combination of known peaks to identify the unknown ones. In the case of Ni/Ce—Sm-10Cu—O (DBM) catalyst, the $M_{4,5}$ edges of Sm appear at 1080 and 1106 eV, as shown in FIG. 24. Ni and Cu white edges $L_{23}$ appeared due to the excitation of $p_{1/2}$ and $P_{3/2}$ electrons to the empty valence states. The Cu $L_{2,3}$ edges at ~931 eV and 951 eV shown in the EEL spectrum, is a result of the excitation of electrons in the 2p core shell to the unoccupied shell. These white edges can be clearly seen in the EEL spectra of Ni/Ce—Sm-10Cu—O (DBM) catalysts, as shown in FIG. 24, respectively. Additionally, the M4,5 white edges of Ce at 883 and 901 eV are clearly visible in the EEL spectra.

EXAMPLE 13

Temperature-programmed oxidation (TPO) was performed at 800° C. using 10% $O_2$/He (30° C. $min^{-1}$) following DRM reaction (T=750° C., 20% $CO_2$/20% $CH_4$/He) for a given TOS to measure the amount of carbon accumulation and obtain qualitative information on likely different types of carbon over the Sm-doped supported Ni (FIG. 22B) catalysts. It can be discerned that the TPO-$CO_2$ traces of pristine (black curve, a), WBM (red curve, b), and DBM (blue curve, c) have different shapes and appear in a different temperature range. These features probe the different kinetics of carbon oxidation to $CO_2$ largely due to the different structure of carbon formed.

Figure 23A:
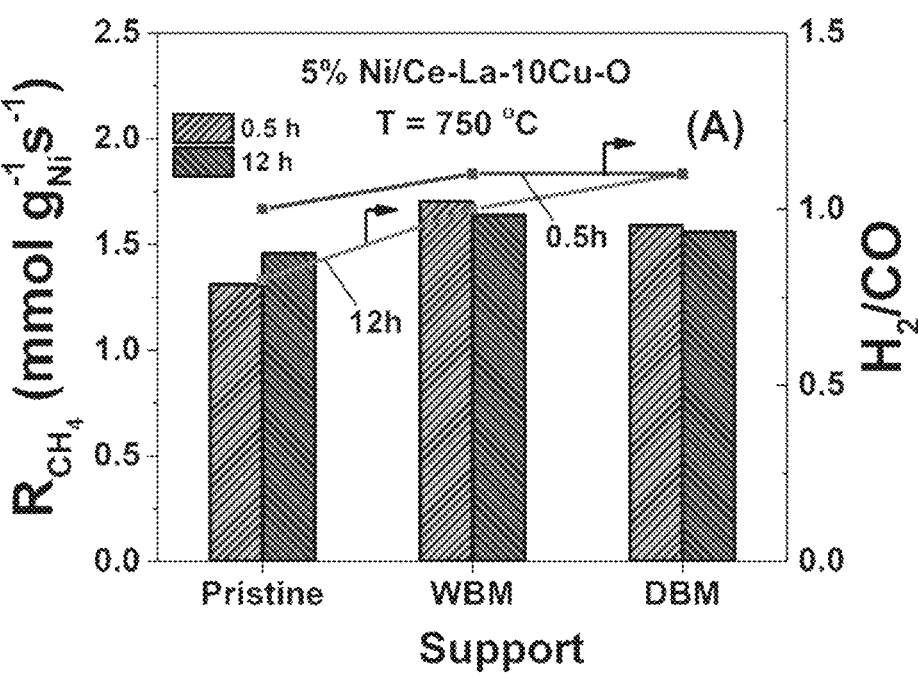
FIG. 23A illustrates integral rate of $CH_4$ conversion (mmol $g^{-1}_{Ni}s^{-1}$) and $H_2/CO$ gas product ratio obtained after 0.5 h and 12 h of DRM (20 vol % $CH_4$/20% $CO_2$/He) at 750° C. over 5 wt % Ni/Ce—La-10Cu—O catalysts as a function of support pre-treatment (Pristine, WBM and DBM), according to some embodiments.
Figure 23B:
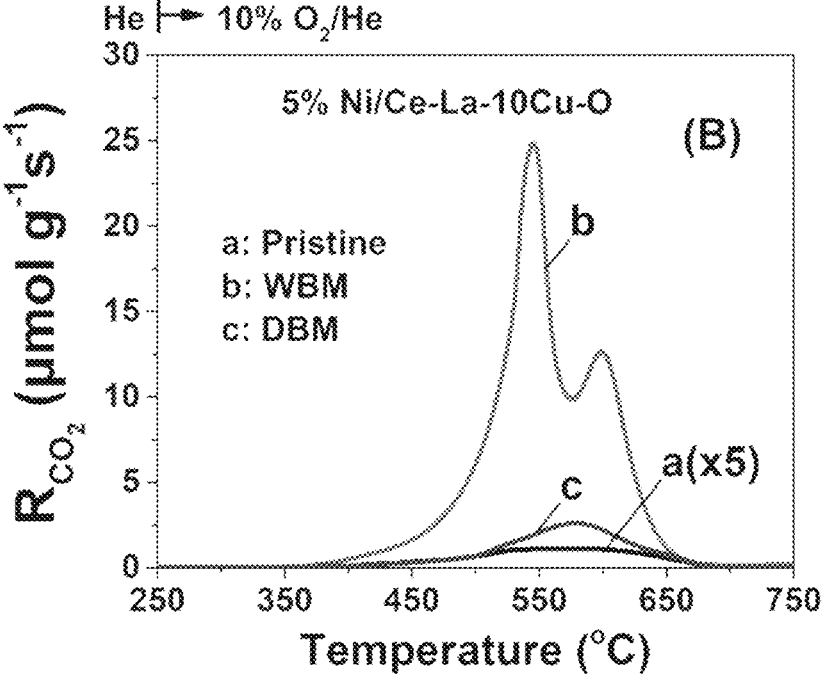
FIG. 23B illustrates transient response curves of $CO_2$ formation rate (μmol $g^{-1}_{Ni}s^{-1}$) obtained during TPO of carbon formed after 12 h of DRM (20 vol % $CH_4$/20 vol % $CO_2$/He) at 750° C. over 5 wt % Ni/Ce—La-10Cu—O catalysts: (a) Pristine, (b) WBM, and (c) DBM, according to some embodiments.

In the case of La-doped supported Ni catalysts, the pristine catalyst exhibited a very small amount of accumulated carbon during DRM compared to the ball-milled ones (see Table 12). This is attributed to the high basicity and oxygen mobility exhibited by the pristine surface. It is extensively reported in the literature that basic supports and very labile support's lattice oxygen (reducible surfaces) largely reduce carbon accumulation and facilitate the gasification of it during DRM. The Ni/Ce—La-10Cu—O (WBM) catalyst has a very different $CO_2$-trace with two peaks at 545° C. and 600° C., while it exhibits a much larger amount of carbon accumulation compared to the pristine sample (~47 times), as shown in FIG. 23A-B. This can be associated to the changes on the metal-support interface caused by the impurity phase (according to the XRD studies over the WBM catalysts) but also to larger Ni particle size of WBM compared to the pristine case. It is well-established in the literature that the Ni particle size has a drastic effect on the rate of carbon deposition. The interface changes may alter the accessibility of labile active oxygen to diffuse towards the Ni-support interface aiming to oxidize carbon formed on the Ni surface during DRM. A similar effect can be noticed in the TPO trace (intense peak at ~550° C.) of Ni/Ce—Sm-10Cu—O (WBM) catalyst. On the other hand, Ni/Ce—La-10Cu—O (DBM) sample resulted in a different coke profile (more symmetric peak) compared to that obtained on the Sm-doped counterpart (trace c in FIG. 22 and FIG. 23). In the latter case, the small asymmetric peak at ~650° C. of the TPO-$CO_2$ trace of Sm-doped DBM sample has a different shape than the $CO_2$-traces (symmetric peak at ~580° C.) obtained on the Ni/Ce—La-10Cu—O (DBM) and (pristine) catalyst samples. This result again means that the kinetics of carbon oxidation to $CO_2$ is different on the surface of DBM catalysts depending on the support chemical composition (La vs Sm). At this point it should be also stated that both DBM samples possess lower mean Ni particle size compared to the corresponding ones of WBM (e.g., 23.5 nm→22.5 nm vs18.6 nm for the Ni/Ce—La-10Cu—O DBM and WBM catalyst sample, respectively).

EXAMPLE 14

Transient $CH_4$ decomposition was designed to probe the dynamic evolution of the carbon formed during methane decomposition reaction ($CH_4$/He) after the step gas switch He→20 vol % $CH_4$/1% Ar/He (t) was made at 750° C. over the catalysts by following the evolution of gaseous $H_2$ and CO/$CO_2$ formed. The possible formation of CO/$CO_2$ would be the result of carbon oxidation by labile oxygen of the support as the only O-source in the reaction. After 30 min on stream in $CH_4$/He, a TPO run was conducted to characterize the deposited carbon during the $CH_4$/He reaction.

FIGS. 26A-C show the dynamic evolution of the $CH_4$ decomposition rates per gram of Ni metal (mmol $g_{Ni}s^{-1}$) and rate of CO formation (pmol $g^{-1}_{Ni}S^{-1}$) after the step-gas switch He→20 vol % $CH_4$/1 vol % Ar/He at 750° C. for the Sm-doped supported Ni catalysts, respectively. Very similar transient response curves for the $H_2$ evolution rates were obtained (not shown), where practically the hydrogen formation rate was twice as large as the $CH_4$ consumption rate in full agreement with the stoichiometry of $CH_4$ decomposition reaction (Eq. (2)). This can be observed from the $H_2$ formation values reported in Table 7. All the kinetic $CH_4$ decomposition rates profiles show a steep increase at the beginning of the switch, which corresponds to the initial rate of $CH_4$ decomposition on carbon-free Ni. After the sharp initial rate of $CH_4$ decomposition (at ~8 s), the rate of $CH_4$ decomposition decays with reaction time to reach a plateau after ca. 6.6 min, 5.6 min, and 3.3 min in the case of pristine, WBM, and DBM, respectively. The largest amount of $CH_4$ conversion was observed by pristine catalyst, while the lowest $CH_4$ conversion, as shown in Table 7. Damaskinos et al. correlated the increase in $CH_4$ conversion with the increase in size of Ni on the surface of the $Ceo_{0.8}Ti_{0.2}O_{2\delta}$ methane decomposition ($CH_4$/He) at 750° C. over the Sm-doped supported Ni catalysts (pristine and milled ones). The $CO$/$CH_4$ ratio shows the extent of the oxygen lattice participation towards CO formation. This is because the only source of oxygen is the lattice oxygen from the support ($O_L$). The higher this ratio the more labile oxygen is taking place in carbon gasification. The $CO$/$CH_4$ ratio was much higher in the case of use of DBM supports. It can be noted that this ratio was drastically increased (ca. 70%) in the Sm-doped supported Ni catalysts after DBM, while there was no change after WBM. A similar trend is observed in La-doped supported (DBM) Ni catalyst, as shown Table 13.

TABLE 13

Quantity of $CH_4$ converted, $H_2$ and CO formed (mmol $g^{-1}_{cat}$), and ratio of $CO$/$CH_4$ obtained after 30 min of $CH_4$ decomposition (20 vol % $CH_4$/He) at 750° C. The amount of carbon accumulated (mmol $g^{-1}_{cat}$) was measured by TPO.

| Catalyst 5 wt % Ni/ Ce—La—10Cu—O | $CH_4$ converted (mmol $g^{-1}_{cat}$) | $H_2$ (mmol $g^{-1}_{cat}$) | CO (mmol $g^{-1}_{cat}$) | $CO$/$CH_4$ | mmol C $g^{-1}_{cat}$ (mg C $g^{-1}_{cat}$) |
|---|---|---|---|---|---|
| Pristine | 18.0 | 39.4 | 1.0 | 0.04 | 19.0 (228) |
| WBM | 15.6 | 29.0 | 0.3 | 0.02 | 14.9 (178.8) |
| DBM | 10.1 | 20.1 | 0.7 | 0.07 | 9.4 (112.8) |

[64]. This is consistent with the $H_2$-TPD results that showed an increase in Ni size after WBM (17 nm→33 nm). Additionally, the profile of the pristine (trace a) and the WBM (trace b) catalysts are the same, however, the profile of the DBM (trace c) catalyst is slightly different (FIG. 26A). This indicates the carbon deposition on the surface of DBM catalyst is different from the other two catalysts. According to similar experiments previously reported and discussed, the dynamic rate of $CH_4$ dissociation and thus $H_2$ formation is strongly influenced by the initial clean surface structure of supported Ni particles and by the dynamics of carbon formation on the metal surface (Ni) and its removal by the lattice oxygen of support. The latter is associated by the transient evolution of $CO_{(g)}$ formation as depicted in FIG. 26B. In the case of La-doped supported Ni catalysts, the highest rates of $CH_4$ decomposition (FIG. 21A and $CO_{(g)}$ formation (FIG. 21B) was observed by the catalyst pristine catalyst, as shown in Table 11.

TABLE 11

Total amount of $CO_2$ desorbed during $CO_2$-TPD over the 5 wt % Ni/Ce—La—10Cu—O catalysts.

| Catalyst 5 wt % Ni/Ce—La—10Cu—O | $CO_2$ (μmol $g^{-1}_{cat}$) |
|---|---|
| Pristine | 13.3 |
| WBM | 7.5 |
| DBM | 11.2 |

An opposite trend was observed in the dynamic evolution of the CO formation FIG. 26B, where DBM exhibited higher rates than the pristine and WBM catalytic samples. As will be discussed in more detail later, the formation of CO(g) during $CH_4$/He reaction is the result of oxidation of carbon formed on the Ni surface by the lattice oxygen of support, a reaction process likely taking place at the Ni-support interface, where both diffusion of carbon and oxygen atoms at the interface will dictate the dynamic rate of CO formation as observed in FIG. 26B.

Table, summarizes the quantities of $CH_4$ consumption, $H_2$ and CO formation, and $CO$/$CH_4$ ratio after 30 min of Additionally, a small peak appears after ca. 6 min in the case of the Ni/Ce—Sm-10Cu—O (DBM), as shown in FIG. 26B. A similar peak was observed in 5 wt % Ni/$Ce_{0.8}Ti_{0.2}O_{2-\delta}$[64] and 5 wt % Ni/CeLa10Cu (Pristine and DBM) catalysts for the same transient experiments, which is correlated to favorable conditions for carbon gasification such as lattice oxygen diffusion towards the Ni-support interface.

FIG. 26C presents TPO-$CO_2$ and TPO-CO traces obtained following the 30-min 20% $CH_4$/He decomposition reaction at 750° C. The purpose of the TPO experiment was to characterize the carbon accumulated after the $CH_4$/He reaction in terms of quantity (mg C $g^{-1}$) and types of carbon formed. Table 7 provides the amounts of carbon (mg C $g^{-1}_{cat}$) estimated for all catalytic samples investigated. In the case of Ni/Ce—Sm-10Cu—O catalysts, CO is also formed in addition to $CO_2$ except in the case of DBM sample. It appears also that oxidation of carbon to CO largely appears at higher temperatures (ca. 550-800° C.). Depending of the type of carbon formed (e.g. amorphous, whiskers, CNTs) and its location on the catalyst surface, the concentration of surface oxygen around the carbon seems not to be sufficient for its complete gasification to $CO_2$. Thus, the mobility of lattice oxygen as one of the source of oxygen in this reaction becomes important. In the case of Ni/Ce—Sm-10Cu—O catalysts, only $CO_2$ was formed and the carbon gasified seems to be oxidized at lower temperatures than the pristine catalyst, as shown in FIGS. 27A-B.

As shown in

Table 7 and Table 13, the DBM samples in both catalyst compositions provided the least amount of accumulated carbon after 30-min of $CH_4$ decomposition at 750° C., confirming the many reported works that supported small Ni particles (ca. lower than 10 nm) result in lower rates of carbon accumulation during DRM, where carbon deposition being controlled by the $CH_4$ activation route.

EXAMPLE 15

Inactive carbon can also be formed via the CO dissociation step (reverse Boudouard reaction) during DRM as mentioned earlier. The comparison of the dynamics of this carbon formation route with that of $CH_4$ dissociation presented and discussed previously was also of interest in this work. The catalysts after in situ reduction in $H_2$ were purged with He and then exposed to the 20% CO/1% Ar/He via a step-gas switch performed at 750° C. for 30 min The carbon accumulated on the catalyst's surface was characterized via TPO (10% $O_2$/He, 30° C. min$^{-1}$) as described for the case of $CH_4$/He reaction.

Figures 28A, 28B:
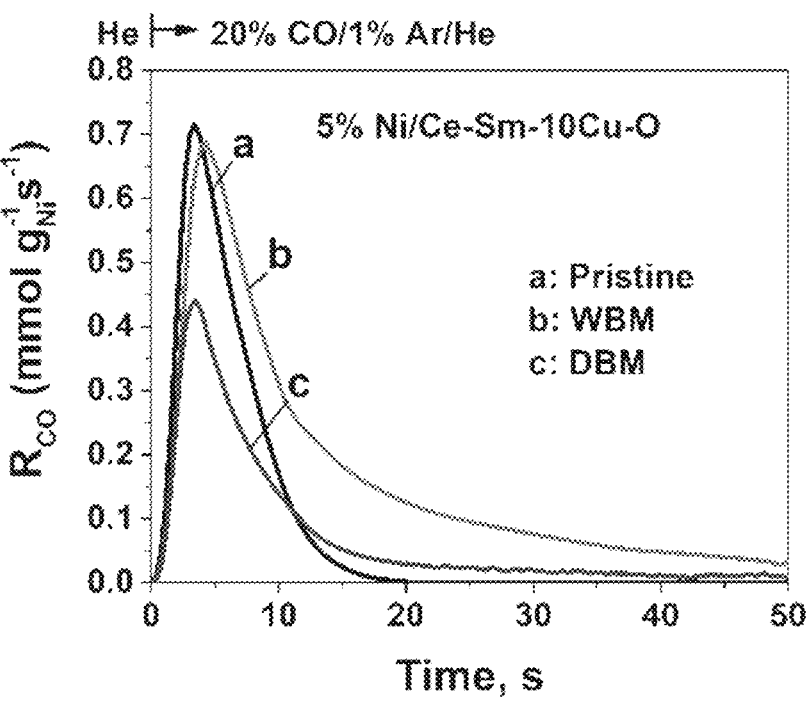
FIG. 28A illustrates dynamic evolution rates (mmol $g^{-1}_{Ni}s^{-1}$) of CO conversion after the step-gas concentration switch He→20 vol % CO/1 vol % Ar/He (t) at 750 ° C., according to some embodiments.
FIG. 28B illustrates $CO_2$-TPO traces in terms of rate of $CO_2$ formation ($\mu$mol $g^-_{cat}s^{-1}$) after 30 min in 20 vol % CO/He reaction at 750 ° C. over the 5 wt % Ni/Ce—Sm-10Cu—O. $W_{cat\ bed}$=0.02 g catalyst+0.03 g SiC; $F_T$=50 mL $min^{-1}$ of 10 vol % $O_2$/He, according to some embodiments.

The transient evolution of the rates ($\mu$mol $g^{-1}{}_{Ni}s^{-1}$) of CO(g) conversion obtained during the step-gas switch He→20 vol % CP/1 vol % Ar/He (750° C., 30 min) over the Sm-doped supported Ni catalysts are presented in FIG. 28A, respectively. The transient rates of CO conversion have similar profiles, a sharp increase with a t max ranging between 3-5 s. Then the profiles decays and reaches zero at different reaction times (20 s, 50 s, and 40 s), in the case pristine, DBM, and WBM catalysts. It was observed that among the Ni catalysts FIG. 28A (trace a), the pristine support had the largest initial CO conversion rate followed by the WBM and the DBM sample. The low initial rate of CO dissociation is associated with low amount of carbon formation after 30 min in 20 vol % CO/1 vol % Ar/He, as depicted in the specific rates of $CO_2$ obtained in the TPO run FIG. 28B (trace c). The amounts of carbon estimated by TPO are provided in in Table 7. The DBM exhibited the lowest carbon formation amongst the Sm-doped supported Ni catalysts. It is noteworthy that 5 wt % Ni/Ce—La-10Cu—O (Pristine) exhibited the lowest amount of carbon deposition (0.1 mmol C $g^{-1}{}_{cat}$) amongst all the catalysts, as shown in Table 14.

TABLE 14

Amount of CO converted, and CO2 formed (mmol $g^{-1}{}_{cat}$) obtained after 30 min of CO disproportionation (20 vol % CO/He) at 750° C. The amount of carbon accumulated (mmol $g^{-1}{}_{cat}$) was measured by TPO.

| Catalyst 5 wt % Ni/ Ce—La—10Cu—O | CO converted (mmol $g^{-1}{}_{cat}$) | Carbon mmol C $g^{-1}{}_{cat}$ (mg C $g^{-1}{}_{cat}$) |
|---|---|---|
| Pristine | 0.2 | 0.1 (1.2) |
| WBM | 0.5 | 0.26 (3.1) |
| DBM | 0.5 | 0.27 (3.2) |

As a general remark, the carbon deposition over La-doped supported Ni catalysts provided much lower amounts than their Sm-doped counterparts except in the case of DBM. Furthermore, carbon deposition via $CH_4$ decomposition dominates that of CO dissociation (reverse Boudouard reaction), as demonstrated in Tables 6 and 7. This is evident in the significantly larger initial kinetic of $CH_4$ decomposition compared to the CO conversion. Different profiles of $CO_2$-TPO can be seen in from FIG. 28B, this corresponds to the different types of carbon formed via CO disproportionation reaction. The pristine (trace a) catalyst shows 3 peaks at 373° C., 463° C. and 526° C. In the case of WBM (trace b), one large asymmetric peak at 553° C. is observed. Whereas in the case of DBM (trace c), some peaks emerged at lower temperature range were observed at 330° C. and 390° C. Also, the peak at lower temperature slightly shifted towards higher temperatures compared to the pristine and WBM catalysts ca. 526° C.→580° C. Previous isotopic studies ($^{13}$C) performed of Ni based catalysts supported on ceria supports, showed that the origin of carbon accumulation route ($CH_4$ vs $CO_2$ activation) depends mainly on the chemical composition of the support rather than the size of the of Ni (22-45 nm).

EXAMPLE 16

This experiment aims to study the degree of lattice oxygen participation in the gasification of carbonaceous species formed by carbon routes. The samples are exposed to $^{18}O_2$ at 750° C. for 10 min to undergo for $^{16}O/^{18}O$ isotopic exchange. This leads to the exchange of catalysts' lattice oxygen ($^{16}O$) with $^{18}O$. The m/z ratios ratios of oxygen isotopic species $^{16}O_2$, $^{16}O^{18}O$, $^{18}O_2$ and Kr (m/z=32, 34, 36, and 84, respectively) are continuously monitored via an online mass spectrometer (MS).

FIGS. 31A-B and FIGS. 30A-B represents the transient rates ($\mu$mol $g^{-1}s^{-1}$) of $^{18}O_2$ consumption during $^{16}O/^{18}O$ exchange at 750° C. after the gas switch: Ar→2 vol % $^{18}O_2$/2 vol % Kr/Ar in the La-doped and Sm-doped catalysts (pristine (a), WBM (b), and DBM (c)), respectively. The 10 min labelled oxygen ($^{18}O_2$) gas treatment results in the partial exchange of $^{16}O$ in the support's surface and bulk with $^{18}O$ and the oxidation of Ni$^0$ to Ni$^{18}O$ as mentioned earlier. It can be noticed that the initial rates of $^{18}O_2$ consumption are similar in all the catalysts in the first 200s. However, the decay of the transient response differs which depends on the surface and bulk mobility of the exchangeable $^{16}O$; the latter depends largely on the chemical composition of the support, the oxygen sub-lattice and the phase impurities present. The immediate consumption of $^{18}O_2$ is attributed to the oxidation of Ni to Ni$^{18}O$. The pristine catalysts exhibited the largest labile oxygen exchange 10.6 mmolg$^{-1}{}_{cat}$ and 9.5 mmolg$^{-1}{}_{cat}$ in the case Ni/Ce—La-10Cu—O (Table 15) and Ni/Ce—Sm-10Cu—O (Table 8), respectively.

TABLE 15

Quantity of $^{18}O$-exchanged (mmol $g^{-1}{}_{cat}$) under the flow of 2% $^{18}O_2$ for 10 min at 750° C., and C$^{18}O$ formed (mmol $g^{-1}{}_{cat}$) during 15 min of DRM (20% vol $CH_4$/20% vol $CO_2$/He) at 750° C. following $^{18}O$-exchange at 750° C. and $H_2$ reduction at 400° C.

| Catalyst 5 wt % Ni/ Ce—La—10Cu—O | $^{18}O$-exchanged (mmol $g^{-1}{}_{cat}$) | C$^{18}O$ (mmol $g^{-1}$) |
|---|---|---|
| Pristine | 10.6 | 5.0 |
| WBM | 10.1 | 5.6 |
| DBM | 9.9 | 5.7 |

BM slightly decreased the liable oxygen in both cases. In the case of DBM, the liable oxygen exchanged decreased from 9.5 mmolg$^{-1}{}_{cat}$→8.1 mmolg$^{-1}{}_{cat}$ and 10.6 mmolg$^{-1}{}_{cat}$→9.9 mmolg$^{-1}{}_{cat}$, in the case of Ni/Ce-Sm-10Cu—O and Ni/Ce—La-10Cu—O catalysts, respectively. A lower decrease is observed after WBM, where a 0.4 mmolg$^{-1}{}_{cat}$ (10.6 mmolg$^{-1}{}_{cat}$→10.2 mmolg$^{-1}{}_{cat}$) and 0.8 mmolg$^{-1}{}_{cat}$ (9.5 mmolg$^{-1}{}_{cat}$→8.7 mmolg$^{-1}{}_{cat}$) decrease was observed in the case of Ni/Ce—La-10Cu—O and Ni/Ce-Sm-10Cu—O catalysts, respectively. The ball milling environment (wet or dry) introduces a change in the oxygen mobility as shown by the labile oxygen exchange rates; though more changes are induced in the Sm-based catalysts, as shown in Table 15 and Table 8. The shape and features of the transient curves of $^{16}O_2$ (FIG. 30A) and $^{16}O^{18}O$ (FIG. 30B) formation were similar in all catalysts. This suggests similar kinetics of surface and bulk oxygen diffusion and exchange. The highest ($R_{max}$) of $^{16}O_2$ and $^{16}O^{18}O$ transient rates at the lowest times were exhibited by Ni/CeSm10Cu—O (DBM) catalyst, which affects the participation of surface/subsurface lattice 16O of support, and the diffusion of bulk $^{16}O$ within the lattice towards the surface, respectively.

Figure 32A:
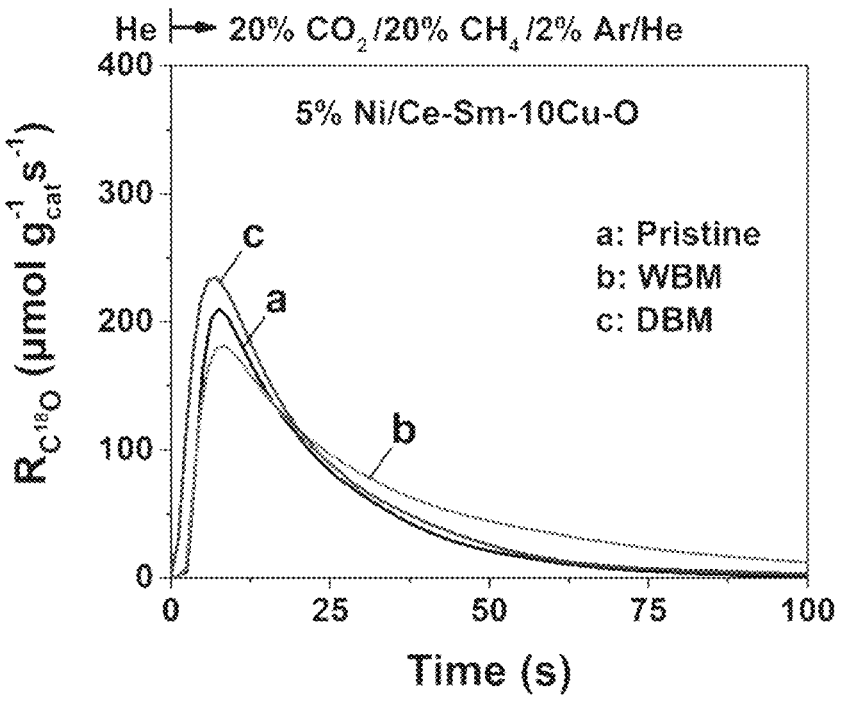
FIG. 32A illustrates dynamic evolution rates ($\mu$mol $g_{cat}s^-_{1}s^{-1}$) of $C^{18}O$(g) obtained during the step-gas concentration switch He→20% $CH_4$/20 % $CO_2$/2% Ar/He (t) following 10-min $^{18}O/^{16}O$ isotopic exchange at 750° C., He purge, and $H_2$ reduction at 400° C. over the 5 wt % Ni/Ce—Sm-10Cu—O catalysts: (a) Pristine, (b) WBM and (c) DBM. $W_{cat}$=0.02 g (diluted with 0.03 g SiC); $F_T$=50 mL $min^{-1}$, according to some embodiments.
Figure 32B:
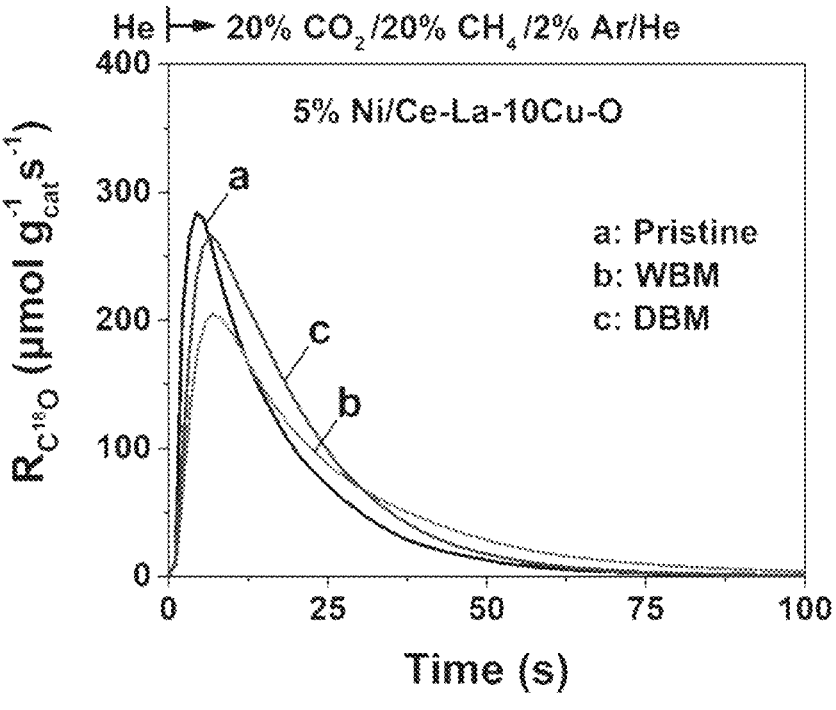
FIG. 32B illustrates dynamic evolution rates ($\mu$mol $g_{cat}^{-1}s^{-1}$) of $C^{18}O$(g) obtained during the step-gas concentration switch He→20% $CH_4$/20% $CO_2$/2% Ar/He (t) following 10-min $^{18}O/^{16}O$ isotopic exchange at 750° C., He purge, and $H_2$ reduction at 400° C. over the 5 wt % Ni/Ce—La-10Cu—O catalysts: (a) Pristine, (b) WBM and (c) DBM. $W_{cat}$=0.02 g (diluted with 0.03 g SiC); $F_T$=50 mL $min^{-1}$, according to some embodiments.
Figure 33A:
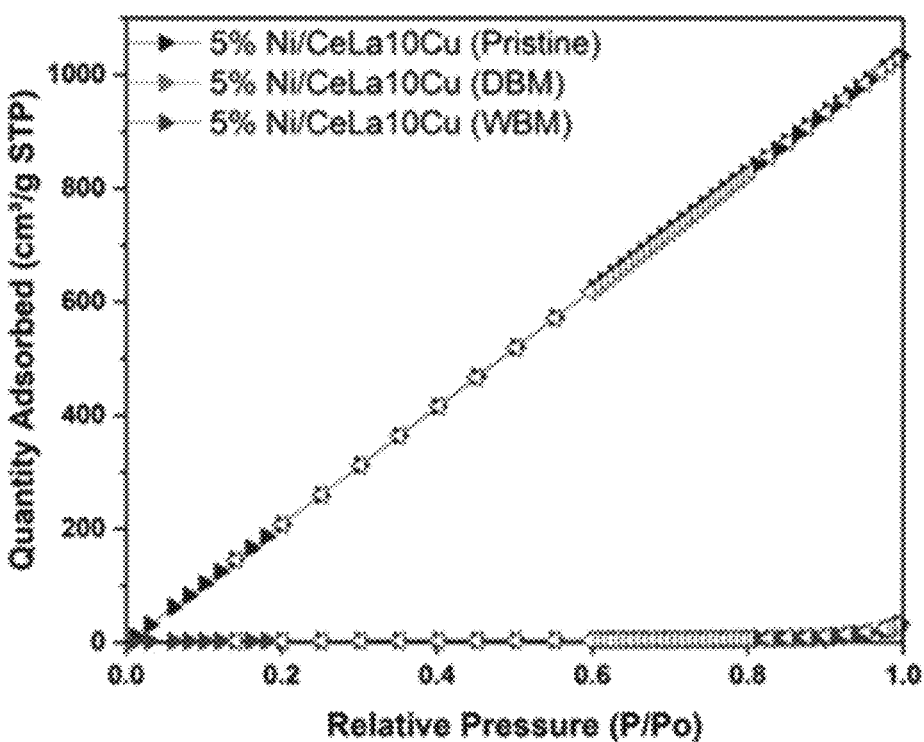
FIG. 33A illustrates $N_2$ adsorption-desorption isotherms (BET) obtained at 77 K 5% Ni/Ce—La-10Cu—O catalysts (a. Pristine, b. DBM, and c. WBM), according to some embodiments.
Figure 33B:
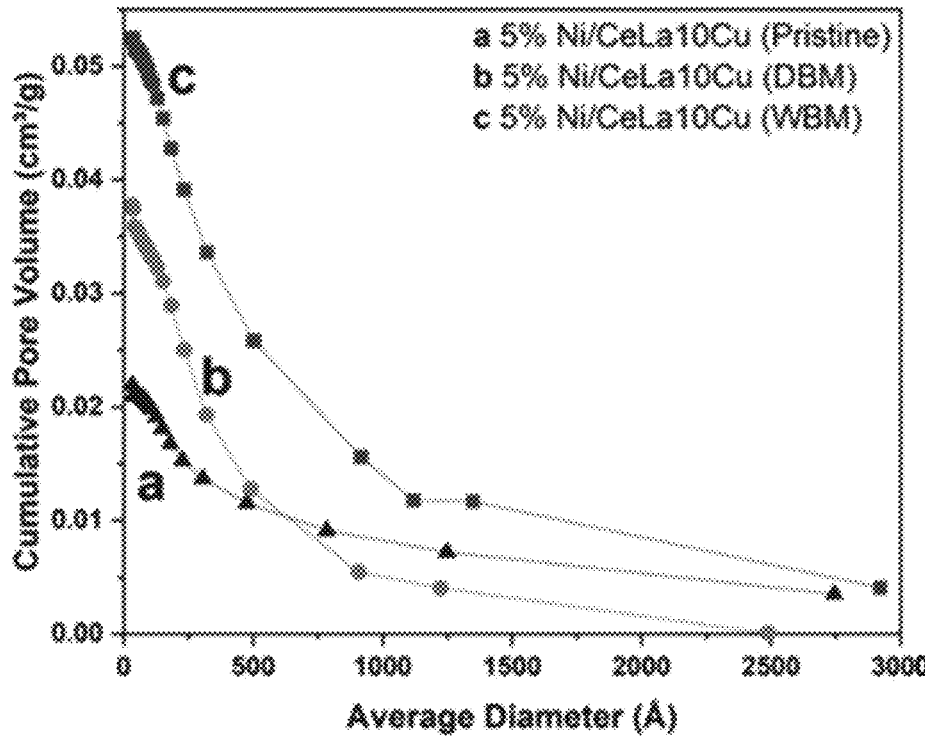
FIG. 33B illustrates the cumulative pore volume ($cm^3$/g) of 5% Ni/Ce—La-10Cu—O catalysts (a. Pristine, b. DBM, and c. WBM), according to some embodiments.
Figure 33C:
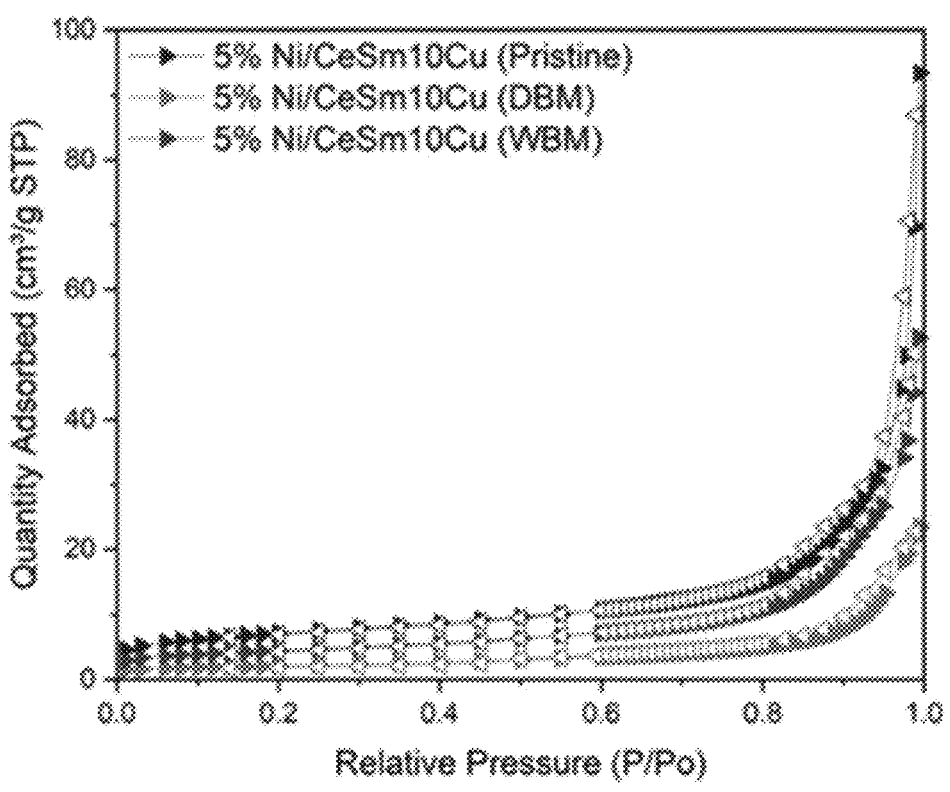
FIG. 33C illustrates $N_2$ adsorption-desorption isotherms (BET) obtained at 77 K 5% Ni/Ce—Sm-10Cu—O catalysts (a. Pristine, b. DBM, and c. WBM), according to some embodiments.
Figure 33D:
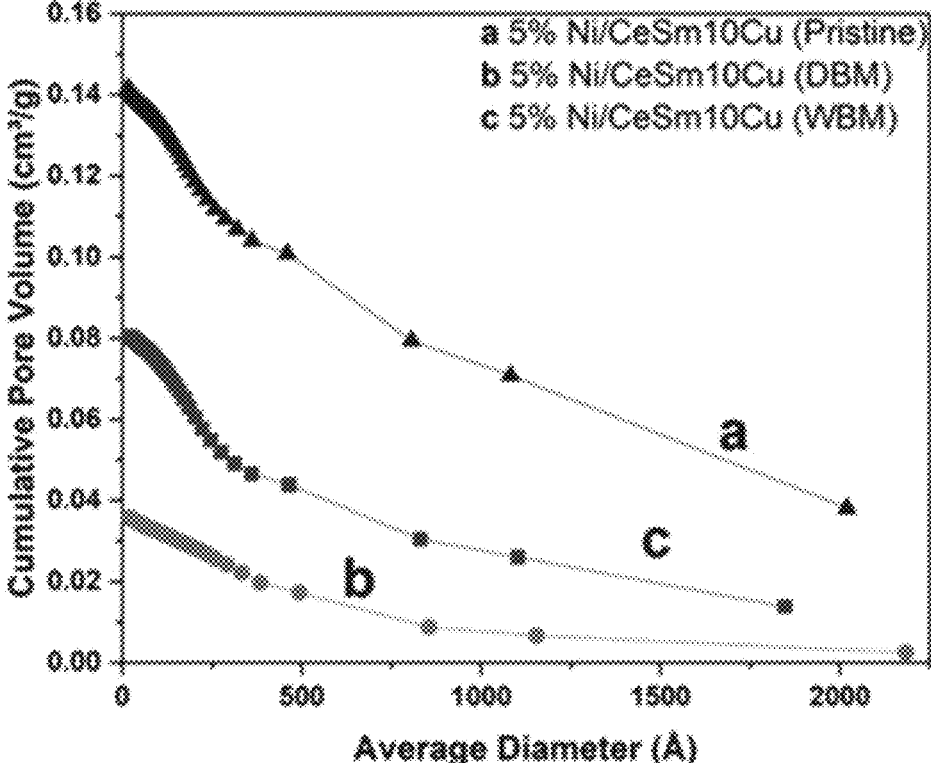
FIG. 33D illustrates the cumulative pore volume ($cm^3$/g) of 5% Ni/Ce—Sm-10Cu—O catalysts (a. Pristine, b. DBM, and c. WBM), according to some embodiments.

FIGS. 32A-B present the transient rates of $C^{18}O$ formed during DRM (Ar→20 vol % $CH_4$/20 vol % $CO_2$/2 vol % Kr/Ar/He (t)) after the 10-min $^{18}O_2$ isotopic exchange on the La-doped and Sm-doped catalysts (pristine (a), WBM (b), and DBM (c)), respectively. The transient response rates that are depicted in FIGS. 32A-B are due to the $^{18}O$ in the oxidized Ni and the support lattice that reacts with $^{12}C$ from the feed gas, as indicated in Eq. (10). All the responses follow the same profile and there was no noticeable time delay in the formation of $^{18}O$-labelled CO gas. The amount of $C^{18}O$ ($\text{mmolg}^{-1}_{cat}$) formed over all catalyst is given in Table 15 (La-doped catalysts) and Table 8 (Sm-doped catalysts). The pristine catalysts (La-doped: 5.0 $\text{mmolg}^{-1}_{cat}$ and case of transient methane decomposition and reverse Boudouard reaction. This means that DBM enhances the rate constant (k) of the catalyst most likely due to the exposure of more defects (e.g. $O_v$ that actively participate to the oxygen exchange.

EXAMPLE 17

Figure 34:
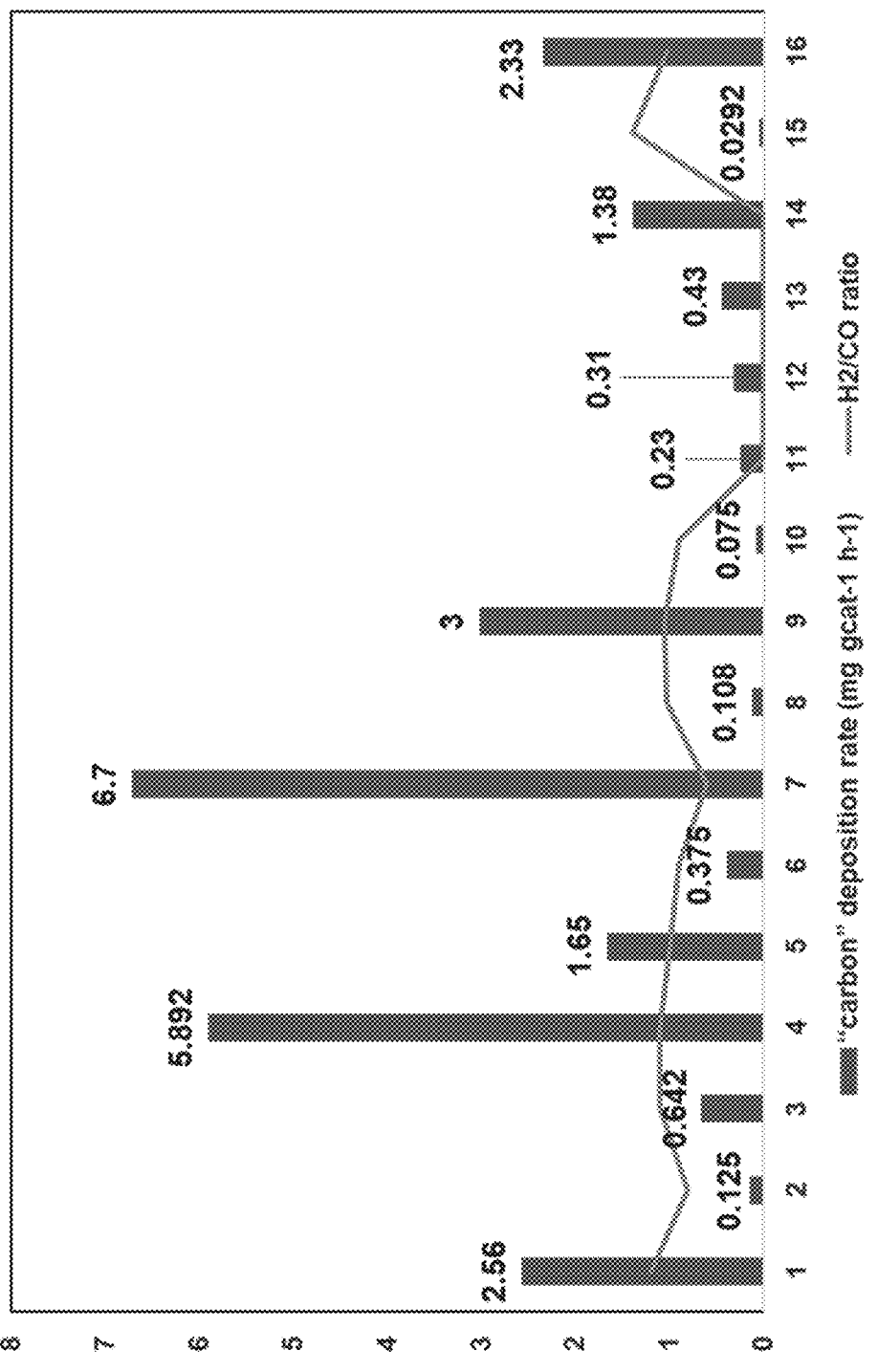
FIG. 34 illustrates a comparative graph of the carbon deposition rate and H2/CO ration after different DRM for different catalysts reported in the literature, according to some embodiments.

The Ni catalysts that were post-synthetically modified via BM were compared with state-of-the-art Ni based catalytic systems with monometallic and bimetallic active sites, to access their stability in terms of carbon accumulation as summarized in Table 16 and FIG. 34.

TABLE 16

Conversions of $CH_4$ and, $CO_2$, $H_2$ product yield ion (%), and H2/CO gas product ratio obtained after DRM at 750° C. (20% $CO_2$/20% $CH_4$/He) and for 0.5 h and 12 h (GHSV = 30,000 $h^{-1}$) on the 5 wt % Ni/supported on Ce—La—10Cu—O and 5 wt % Ni/Ce—Sm—10Cu.

| Catalyst 5 wt % Ni/Ce—X—10Cu—O | | Time (h) | XCH$_4$ (%) | XCO$_2$ (%) | H$_2$ yield (%) | H$_2$/CO | mg C g$_{cat}^{-1}$ |
|---|---|---|---|---|---|---|---|
| La | Pristine | 0.5 | 80.3 | 76.4 | 55.3 | 1.05 | — |
| | | | (86.6)a | (86.6)a | | (1.0)a | |
| | | | (83.6)b | (90.3)b | | (0.92)b | |
| | | 12 | 80.8 | 81.4 | 42.7 | 0.8 | 1.5 |
| | WBM | 0.5 | 91.5 | 93.5 | 71.7 | 1.1 | — |
| | | 12 | 88.7 | 91.7 | 57.9 | 1 | 70.7 |
| | DBM | 0.5 | 86.8 | 86.1 | 53.33 | 1.1 | — |
| | | 12 | 85.1 | 85.2 | 53.9 | 1.1 | 7.7 |
| Sm | Pristine | 0.5 | 81.2 | 89.7 | 60.5 | 1.0 | — |
| | | 12 | 81.4 | 89.6 | 58.2 | 1.0 | 19.8 |
| | WBM | 0.5 | 82.2 | 77.7 | 45.0 | 0.9 | — |
| | | 12 | 48.9 | 50.2 | 17.5 | 0.6 | 80.4 |
| | DBM | 0.5 | 86.7 | 85.4 | 54.3 | 1.1 | — |
| | | 12 | 84.3 | 84.4 | 44.5 | 0.9 | 4.5 |

Sm-doped: 4.7 $\text{mmolg}^{-1}_{cat}$) formed the lowest amount of $C^{18}O$. While, the WBM produced 1.12 and 1.30 times higher amounts of $C^{18}O$ than their pristine counterparts in the case of La- and Sm-doped catalysts, respectively. In order to understand the low carbon formation during DRM and gasification of carbon, a first degree approximation relationship ($R_{C18O}(t)=k\theta_{OL}(t)\theta_C(t)$ is used to describe the transient rate of $C^{18}O$ formation, where k indicates the effective rate constant of the gasification of carbon (more than one kind of carbon) on labile oxygen on the catalyst's surface to form oxygen vacant site and CO(g), as shown in Eq. (6). Whereas, $\theta_{OL}$ and $\theta_C$ represents the surface coverage of lattice oxygen participating in carbon gasification (determined by rate of diffusion of lattice oxygen towards carbon) and carbon formed during DRM. Hence, k and $\theta_{OL}$ depend on the composition of the support. Consequently, the catalysts that resulted in lower $^{16}O/^{18}O$ isotopic exchange rates had also lower transient rates of $C^{18}O(g)$ formation; this is justified by the fact that Ni/Ce—La-10Cu (pristine) catalyst accumulated lower amounts of carbon during DRM compared to its BM counterpart catalyst with the same chemical composition. This suggests that the rate constant (k) of Ni/Ce—La-10Cu (pristine) catalyst is larger than the BM catalysts. In the case of the Sm-doped catalysts, the DBM exhibited lower carbon accumulation during DRM (4.4) than the pristine support. Similar conclusions can be deduced in the The rate of carbon accumulation that was measured via TPO is the key parameter used to evaluate the catalysts' coke resistance during DRM in various conditions. The 5 wt. % $Ni/Ce_{0.8}T_{0.2}O_{2-\delta}$ catalyst synthesized via modified citrate sol-gel method showed the lowest carbon accumulation rate (0.029 mg $\text{gcat}^{-1}h^{-1}$) and $H_2/CO$ ratio of 1.4 followed by 2.5% Co-2.5% $Ni/ZrO_2$ catalyst (0.075 mg $\text{gcat}^{-1}h^{-1}$, $H_2/CO$=0.9) synthesized via by HDP method followed by 5 wt % Ni-0.5 wt % $Pt/Ce_{0.8}Pr0.2O_{2-\delta}$ synthesized via modified citrate sol-gel method (0.108 mg $\text{gcat}^{-1}$ $h^{-1}$, $H_2/CO$=1.03) followed by the catalyst prepared in this study Ni/Ce—La-10Cu—O (Pristine) (0.125 mg $\text{gcat}^{-1}$ $h^{-1}$, $H_2/CO$=0.8). The WBM catalysts (Ni/Ce—M-10Cu, M=La and Sm) showed the highest carbon accumulation rate amongst the catalysts 5.89 mg $\text{gcat}^{-1}h^{-1}$ and 6.70 mg $\text{g}_{cat}^{-1}$ $h^{-1}$, respectively. The superior carbon resistance exhibited by 5 wt. % $Ni/Ce_{0.8}Ti_{0.2}O_{2-\delta}$ catalyst compared to our best coke resistant catalyst Ni/Ce—La-10Cu—O (Pristine) can be attributed to the smaller Ni particle size ($d_{Ni}$=22 nm) in 5 wt % $Ni/Ce_{0.8}Ti_{0.2}O_{2-\delta}$. On the other hand, the 5 wt. % $Ni/Ce_{0.8}Ti_{0.2}O_{2-\delta}$ resulted in high $H_2/CO$ ratio (1.4) which is not favored in FT synthesis, which favors $H_2/CO$ ratio equivalent to 1, whereas the Ni/Ce—La-10Cu—O (Pristine) catalyst generates $H_2/CO$ ratio of 0.8. Meanwhile, the synergistic interaction between the bimetallic active sites and incorporation of noble metal (Pt) which is known to hinder carbon formation enhanced coke resistance of 5 wt % Ni-0.5 wt % $Pt/Ce_{0.8}Pr0.2O_{2-\delta}$ and 2.5% Co-2.5% $Ni/ZrO_2$ catalysts. Keeping that in mind, other strategies for enhancement of Ce—La-10Cu (pristine) support can be implemented, such as use of bimetallic active sites.

Ball milling of Ni based catalysts Ce—M-10Cu—O (M=La and Sm) in different environments (wet and dry) altered the intrinsic properties of catalysts. According to the XRD findings DBM maintained the cubic fluorite structure, whereas WBM resulted in phase heterogeneity. The latter is evident in the emergence of hexagonal phase of Sm(OH)$_3$ and La(OH)$_3$ peaks in the XRD patterns of Ni/Ce—Sm-10Cu—O and Ni/Ce—La-10Cu—O, respectively. The H$_2$-TPR showed that DBM improved the reducibility of catalysts compared to WBM. The catalytic performance in DRM showed high conversion rates (~80%) in all the catalysts except for Ni/Ce—Sm-10Cu (WBM) which showed low conversion rates (~50%) after 12h DRM. The amount of carbon accumulated during DRM, methane decomposition and Boudouard reaction was measured via TPO. In the La-doped catalysts, the pristine support showed the lowest carbon deposition during DRM (1.5 mg C g$_{cat}$$^{-1}$), whereas, in the Sm-doped catalysts the DBM catalyst (4.5 mg C g$_{cat}$$^{-1}$) showed the lowest carbon accumulation. It was noticed that the WBM increased the carbon deposition rate. The TIIE used to quantify the carbon deposition showed that methane decomposition is the main source of carbon formation, due to CH$_4$ activation on Ni surface. While, the CO disproportionation route had a minor contribution on carbon accumulation.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A ceria-supported catalyst, the catalyst comprising the formula:

Ni/Ce—X-10Cu—O wherein X is one or more dopants, wherein "10Cu" denotes the catalyst comprises 10 atomic % Cu, wherein the amount of Ce, X, and Cu add to 100 atomic %, and wherein y is a number greater than 0.

2. The catalyst of claim 1, wherein X is one or more dopants selected from La and Sm.

3. The catalyst of claim 1, wherein the catalyst is a cubic fluorite structure.

4. The catalyst of claim 1 which catalyzes dry reforming of methane.

5. The catalyst of claim 1 further comprising oxygen vacant sites on a surface of the catalyst.

6. The catalyst of claim 1, wherein the catalyst is post-synthetically modified by a ball milling process sufficient to increase oxygen vacant sites by at least about 5% on a surface of the ceria-supported catalyst.

7. The catalyst of claim 6, wherein the ball milling process includes wet ball milling.

8. The catalyst of claim 6, wherein the ball milling process includes dry ball milling.

9. The catalyst of claim 1 which catalyzes a reaction selected from one or more of reforming of methane, partial oxidation of methane, and autothermal reforming.

\* \* \* \* \*